United States Patent
Hua et al.

(10) Patent No.: US 12,507,233 B2
(45) Date of Patent: Dec. 23, 2025

(54) COMMUNICATION METHOD AND APPARATUS

(71) Applicant: HUAWEI TECHNOLOGIES CO., LTD., Guangdong (CN)

(72) Inventors: Meng Hua, Shanghai (CN); Fei Gao, Shanghai (CN); Jinlin Peng, Shanghai (CN); Yi Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 466 days.

(21) Appl. No.: 18/147,811

(22) Filed: Dec. 29, 2022

(65) Prior Publication Data

US 2023/0137424 A1    May 4, 2023

Related U.S. Application Data

(63) Continuation of application No. PCT/CN2021/099843, filed on Jun. 11, 2021.

(30) Foreign Application Priority Data

Jun. 30, 2020   (CN) .......................... 202010614849.3

(51) Int. Cl.
*H04W 72/1263*   (2023.01)
*H04L 27/26*      (2006.01)

(52) U.S. Cl.
CPC ... *H04W 72/1263* (2013.01); *H04L 27/26025* (2021.01); *H04L 27/2605* (2013.01)

(58) Field of Classification Search
CPC ......... H04W 72/1263; H04W 72/0453; H04W 72/23; H04L 27/26025; H04L 27/2605; H04L 5/001; H04L 5/0094
See application file for complete search history.

(56) References Cited

U.S. PATENT DOCUMENTS

2018/0343089 A1* 11/2018 Park ....................... H04L 5/001
2020/0221463 A1    7/2020 Wang et al.
(Continued)

FOREIGN PATENT DOCUMENTS

CN    110831163 A    2/2020
CN    110832931 A    2/2020
(Continued)

OTHER PUBLICATIONS

Office Action issued in CN202010614849.3, dated Aug. 21, 2024, 7 pages.
(Continued)

*Primary Examiner* — Chae S Lee

(57) ABSTRACT

A communication method is disclosed. According to the communication method, a terminal device receives configuration information from a network device. The configuration information is used to configure at least two frequency bands for the terminal device, and the at least two frequency bands include a first frequency band and a second frequency band. The terminal device receives first scheduling information from the network device. The first scheduling information indicates a target resource block (RB) for data transmission. The terminal device performs data transmission with the network device on a same symbol by using a first RB on the first frequency band and a second RB on the second frequency band. There is a common resource block (CRB) deviation between the first RB and the second RB, and the target RB includes the first RB or the second RB.

20 Claims, 22 Drawing Sheets

(56) References Cited

U.S. PATENT DOCUMENTS

| | | | |
|---|---|---|---|
| 2020/0344761 A1* | 10/2020 | Amuru | H04L 27/2607 |
| 2020/0351878 A1* | 11/2020 | Manolakos | H04L 5/0044 |
| 2022/0070871 A1* | 3/2022 | Tang | H04W 72/53 |
| 2022/0394741 A1* | 12/2022 | Jiang | H04L 27/26025 |

FOREIGN PATENT DOCUMENTS

| | | |
|---|---|---|
| WO | 2018203717 A1 | 11/2018 |
| WO | 2019028823 A1 | 2/2019 |

OTHER PUBLICATIONS

Vivo: "Discussion on NR resource allocation", 3GPP Draft; R1-1704501_Discussion on NR Resource Allocation, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017 Mar. 25, 2017 (Mar. 25, 2017), pp. 1-3, XP051251278.

3GPP TS 38.211 V16.1.0 (Mar. 2020), Physical channels and modulation (Release 16), 3rd Generation Partnership Project; Technical Specification Group Radio Access Network; NR; total 130 pages.

3GPP TS 38.213 V15.9.0 (Mar. 2020), Physical layer procedures for control (Release 15), 3rd Generation Partnership Project; Technical Specification Group Radio Access Network; NR; total 109 pages.

International Search Report and Written Opinion issued in PCT/CN2021/099843, dated Aug. 27, 2021, 9 pages.

Extended European Search Report issued in EP21832440.8, dated Oct. 31, 2023, 10 pages.

* cited by examiner

COMMUNICATION METHOD AND APPARATUS

CROSS-REFERENCE TO RELATED APPLICATIONS

This application is a continuation of International Application No. PCT/CN2021/099843, filed on Jun. 11, 2021, which claims priority to Chinese Patent Application No. 202010614849.3, filed on Jun. 30, 2020. The aforementioned applications are incorporated herein by reference in their entireties.

TECHNICAL FIELD

The present disclosure relates to the field of communication technologies, and in particular, to a communication method and apparatus.

BACKGROUND

Scheduling information of a physical layer indicates a time-frequency resource location of a physical downlink shared channel (PDSCH) and/or a time-frequency resource location of a physical uplink shared channel (PUSCH). One piece of scheduling information can schedule only one segment of frequency domain resource on a same time domain symbol to transmit the PDSCH and/or the PUSCH, and the segment of frequency domain resource belongs to one component carrier (CC).

When one piece of scheduling information schedules one segment of frequency domain resource, if a location of the terminal device may be covered by frequency bands of a plurality of component carriers or covered by different frequency bands of one component carrier, the network device transmits a plurality of pieces of scheduling information to the terminal device. The plurality of pieces of scheduling information occupy excessive control resources, resulting in high control resource overheads.

SUMMARY

Embodiments of the present disclosure provide a communication method and apparatus, to reduce control resource overheads and air interface resources.

To achieve the foregoing objectives, the following technical solutions are used in embodiments of the present disclosure.

According to a first aspect, an embodiment of the present disclosure provides a communication method. The method may be performed by a terminal device, or may be performed by a chip used in the terminal device. The following provides descriptions by using an example in which the method is performed by the terminal device. The method includes: A terminal device receives configuration information from a network device. The configuration information is used to configure at least two frequency bands for the terminal device, and the at least two frequency bands include a first frequency band and a second frequency band. Herein, both the first frequency band and the second frequency band may correspond to valid bandwidth parts (BWPs), or neither of them may correspond to valid BWPs. The terminal device receives first scheduling information from the network device. The first scheduling information indicates a target resource block (RB) for data transmission. The terminal device performs data transmission with the network device on a same symbol by using a first RB on the first frequency band and a second RB on the second frequency band. There is a first common resource block (CRB) deviation between the first RB and the second RB, and the target RB includes the first RB or the second RB.

According to the communication method provided in this embodiment of the present disclosure, when at least the first frequency band and the second frequency band are configured for the terminal device, the network device sends the first scheduling information to the terminal device. Even if the first scheduling information indicates that the target RB used for data transmission includes the first RB on the first frequency band, or the first scheduling information indicates that the target RB used for data transmission includes the second RB on the second frequency band, because the first CRB deviation is met between the first RB and the second RB, the terminal device can still perform data transmission with the network device on the same symbol by using the first RB and the second RB, so that one piece of first scheduling information schedules transmission resources on at least two frequency bands, thereby reducing control resource overheads.

In s possible design, a subcarrier spacing of the first frequency band is the same as a subcarrier spacing of the second frequency band, and a cyclic prefix (CP) type of the first frequency band is the same as a CP type of the second frequency band. In other words, a symbol length of the first frequency band is the same as a symbol length of the second frequency band.

In a possible design, the communication method in this embodiment further includes: The terminal device performs data transmission with the network device on the same symbol by using a third RB on the first frequency band and a fourth RB on the second frequency band. A CRB deviation between the third RB and the fourth RB is the first CRB deviation, and the target RB further includes the third RB or the fourth RB.

In this way, the terminal device may simultaneously perform data transmission with the network device by using a plurality of RBs on the first frequency band and a plurality of RBs on the second frequency band, to improve data transmission efficiency. A quantity of RBs used for data transmission on the first frequency band is the same as a quantity of RBs used for data transmission on the second frequency band.

In a possible design, the first scheduling information specifically indicates a resource sequence number on a target frequency band, and the resource sequence number indicates the first RB or the second RB. A CRB sequence number of the first RB and a CRB sequence number of the second RB each is the same as a remainder obtained after a modulo operation is performed on a nominal resource block group (RBG) size of the target frequency band. In other words, an edge of an RBG of the first frequency band is aligned with an edge of an RBG of the second frequency band. In this way, the first scheduling information indicates the first RB or the second RB by using the resource sequence number on the target frequency band.

In a possible design, the nominal RBG size of the target frequency band is determined based on a bandwidth of the target frequency band. Alternatively, the nominal RBG size of the target frequency band is a nominal RBG size of the first frequency band or a nominal RBG size of the second frequency band. The nominal RBG size of the first frequency band is an integer multiple of the nominal RBG size of the second frequency band. Herein, both the nominal RBG size of the first frequency band and the nominal RBG size of the second frequency band are positive integers greater than 1.

In a possible design, if a bandwidth of the first frequency band is the same as a bandwidth of the second frequency band, the bandwidth of the target frequency band is less than or equal to the bandwidth of the first frequency band.

In a possible design, the configuration information further indicates the bandwidth of the target frequency band. Herein, the bandwidth of the first frequency band may be the same as or different from the bandwidth of the second frequency band. The bandwidth of the target frequency band is the bandwidth indicated by the configuration information.

In a possible design, the configuration information further indicates RBs that are on the first frequency band and the second frequency band and that separately have a correspondence with a start RB on the target frequency band.

In a possible design, the resource sequence number includes a sequence number of a first virtual resource block (VRB) on the target frequency band. The communication method in this embodiment further includes: The terminal device determines, based on the sequence number of the first VRB, a first RB that is on the first frequency band and corresponds to the first VRB and a second RB that is on the second frequency band and corresponds to the first VRB.

In this way, when the first scheduling information indicates, by using the sequence number of the VRB, the RB used for data transmission on the target frequency band, the terminal device can also determine the first RB on the first frequency band and the second RB on the second frequency band based on the sequence number of the VRB, to perform data transmission by using the RBs on the two frequency bands, so that one piece of scheduling information schedules the RBs on the two frequency bands.

In a possible design, the resource sequence number includes a sequence number of a first RBG on the target frequency band. The communication method in this embodiment further includes: The terminal device determines, based on the sequence number of the first RBG, a first RB that is on the first frequency band and corresponds to a fifth RB in the first RBG and a second RB that is on the second frequency band and corresponds to the fifth RB in the first RBG.

In this way, when the first scheduling information indicates, by using the sequence number of the RBG, the RB used for data transmission on the target frequency band, the terminal device can also determine the first RB on the first frequency band and the second RB on the second frequency band based on the sequence number of the RBG, to perform data transmission by using the RBs on the two frequency bands, so that one piece of scheduling information schedules the RBs on the two frequency bands.

In a possible design, the first scheduling information further includes a sequence number of a second VRB on the target frequency band. The CRB sequence number of the first RB and the CRB sequence number of the second RB each is the same as the remainder obtained after the modulo operation is performed on the nominal resource block group (RBG) size of the target frequency band. The communication method in this embodiment further includes: The terminal device determines, based on the sequence number of the second VRB, a sixth RB that is on the first frequency band and corresponds to the second VRB, and that no RB on the second frequency band corresponds to the second VRB. The terminal device performs data transmission with the network device on the same symbol by using the sixth RB.

In this way, when both the RB on the first frequency band and the RB on the second frequency band are scheduled by using the first scheduling information, for RBs that form the target frequency band on the first frequency band, there may be a phenomenon that an RB that meets the first CRB deviation between the RB and the sixth RB does not belong to the second frequency band. If the sequence number of the second VRB indicates to perform data transmission by using the RB that has the foregoing phenomenon, the terminal device performs data transmission with the network device only by using the sixth RB on the first frequency band, to ensure data transmission efficiency.

In a possible design, the first scheduling information further includes a sequence number of a second VRB on the target frequency band. The CRB sequence number of the first RB and the CRB sequence number of the second RB each is the same as the remainder obtained after the modulo operation is performed on the nominal resource block group (RBG) size of the target frequency band. The communication method in this embodiment further includes: The terminal device determines, based on the sequence number of the second VRB, that no RB on the first frequency band corresponds to the second VRB and determines a seventh RB that is on the second frequency band and corresponds to the second VRB. The terminal device performs data transmission with the network device on the same symbol by using the seventh RB.

In this way, when both the RB on the first frequency band and the RB on the second frequency band are scheduled by using the first scheduling information, for RBs that form the target frequency band on the second frequency band, there may be a phenomenon that an RB that meets the first CRB deviation between the RB and the seventh RB does not belong to the first frequency band. If the sequence number of the second VRB indicates to perform data transmission by using the RB that has the foregoing phenomenon, the terminal device performs data transmission with the network device only by using the seventh RB on the second frequency band, to ensure data transmission efficiency.

In a possible design, the first scheduling information further includes a sequence number of a second RBG on the target frequency band. The CRB sequence number of the first RB and the CRB sequence number of the second RB each is the same as the remainder obtained after the modulo operation is performed on the nominal resource block group (RBG) size of the target frequency band. The communication method in this embodiment further includes: The terminal device determines, based on the sequence number of the second RBG, a ninth RB that is on the first frequency band and corresponds to an eighth RB in the second RBG, and that no RB on the second frequency band corresponds to the eighth RB in the second RBG. The terminal device performs data transmission with the network device on the same symbol by using the ninth RB.

In this way, when both the RB on the first frequency band and the RB on the second frequency band are scheduled by using the first scheduling information, for RBs that form the target frequency band on the first frequency band, there may be a phenomenon that an RB that meets the first CRB deviation between the RB and the ninth RB does not belong to the second frequency band. If the sequence number of the second RBG indicates to perform data transmission by using the RB that has the foregoing phenomenon, the terminal device performs data transmission with the network device only by using the ninth RB on the first frequency band, to ensure data transmission efficiency.

In a possible design, the first scheduling information further includes a sequence number of a second RBG on the target frequency band. The CRB sequence number of the first RB and the CRB sequence number of the second RB each is the same as the remainder obtained after the modulo operation is performed on the nominal resource block group (RBG) size of the target frequency band. The communication method in this embodiment further includes: The terminal device determines, based on the sequence number of the second RBG, that no RB on the first frequency band corresponds to an eighth RB in the second RBG and determines a tenth RB that is on the second frequency band and corresponds to the eighth RB in the second RBG. The terminal device performs data transmission with the network device on the same symbol by using the tenth RB.

In this way, when both the RB on the first frequency band and the RB on the second frequency band are scheduled by using the first scheduling information, for RBs that form the target frequency band on the second frequency band, there may be a phenomenon that an RB that meets the first CRB deviation between the RB and the tenth RB does not belong to the first frequency band. If the sequence number of the second RBG indicates to perform data transmission by using the RB that has the foregoing phenomenon, the terminal device performs data transmission with the network device only by using the tenth RB on the second frequency band, to ensure data transmission efficiency.

In a possible design, if a precoding granularity of a data transmission resource scheduled by using the first scheduling information is a wideband, same precoding is used for data transmitted on a plurality of RBs on the first frequency band, and same precoding is used for data transmitted on a plurality of RBs on the second frequency band. Both the plurality of RBs on the first frequency band and the plurality of RBs on the second frequency band are frequency bands formed by contiguous physical resource blocks PRBs, and precoding used on the plurality RBs on the first frequency band is the same as or different from precoding used on the plurality RBs on the second frequency band, so that data transmitted on the plurality RBs on the first frequency band and data transmitted on the plurality RBs on the second frequency band each can match a channel status, thereby ensuring effective data transmission.

According to a second aspect, an embodiment of the present disclosure provides a communication method. The method may be performed by a network device, or may be performed by a chip used in the network device. The following provides descriptions by using an example in which the method is performed by the network device. The method includes: A network device sends configuration information to a terminal device. The configuration information is used to configure at least two frequency bands for the terminal device, and the at least two frequency bands include a first frequency band and a second frequency band. The network device sends first scheduling information to the terminal device. The first scheduling information indicates a target resource block (RB) for data transmission. The network device performs data transmission with the terminal device on a same symbol by using a first RB on the first frequency band and a second RB on the second frequency band. There is a first common resource block (CRB) deviation between the first RB and the second RB, and the target RB includes the first RB or the second RB.

In s possible design, a subcarrier spacing of the first frequency band is the same as a subcarrier spacing of the second frequency band, and a cyclic prefix (CP) type of the first frequency band is the same as a CP type of the second frequency band.

In a possible design, the communication method in this embodiment further includes: The network device performs data transmission with the terminal device on the same symbol by using a third RB on the first frequency band and a fourth RB on the second frequency band. A CRB deviation between the third RB and the fourth RB is the first CRB deviation, and the target RB further comprises the third RB or the fourth RB.

In a possible design, the first scheduling information specifically indicates a resource sequence number on a target frequency band, and the resource sequence number indicates the first RB or the second RB. A CRB sequence number of the first RB and a CRB sequence number of the second RB each is the same as a remainder obtained after a modulo operation is performed on a nominal resource block group (RBG) size of the target frequency band.

In a possible design, the nominal RBG size of the target frequency band is determined based on a bandwidth of the target frequency band. Alternatively, the nominal RBG size of the target frequency band is a nominal RBG size of the first frequency band or a nominal RBG size of the second frequency band. The nominal RBG size of the first frequency band is an integer multiple of the nominal RBG size of the second frequency band.

In a possible design, if a bandwidth of the first frequency band is the same as a bandwidth of the second frequency band, the bandwidth of the target frequency band is less than or equal to the bandwidth of the first frequency band.

In a possible design, the configuration information further indicates the bandwidth of the target frequency band.

In a possible design, the configuration information further indicates RBs on the first frequency band and the second frequency band, each with a correspondence with a start RB on the target frequency band.

In a possible design, the resource sequence number includes a sequence number of a first virtual resource block (VRB) on the target frequency band. The first VRB corresponds to the first RB on the first frequency band, and the first VRB corresponds to the second RB on the second frequency band.

In a possible design, the resource sequence number includes a sequence number of a first RBG on the target frequency band. A fifth RB in the first RBG corresponds to the first RB on the first frequency band, and the fifth RB in the first RBG corresponds to the second RB on the second frequency band.

In a possible design, the first scheduling information further includes a sequence number of a second VRB on the target frequency band. The CRB sequence number of the first RB and the CRB sequence number of the second RB each are the same as the remainder obtained after the modulo operation is performed on the nominal resource block group (RBG) size of the target frequency band. The second VRB has a corresponding sixth RB on the first frequency band, and the second VRB has no corresponding RB on the second frequency band. The communication method in this embodiment further includes: The network device performs data transmission with the terminal device on the same symbol by using the sixth RB.

In a possible design, the first scheduling information further includes a sequence number of a second VRB on the target frequency band. The CRB sequence number of the first RB and the CRB sequence number of the second RB each is the same as the remainder obtained after the modulo operation is performed on the nominal resource block group (RBG) size of the target frequency band. The second VRB has no corresponding RB on the first frequency band, and the second VRB has a corresponding seventh RB on the second frequency band. The communication method in this embodiment further includes: The network device performs data transmission with the terminal device on the same symbol by using the seventh RB.

In a possible design, the first scheduling information further includes a sequence number of a second RBG on the target frequency band. The CRB sequence number of the first RB and the CRB sequence number of the second RB each is the same as the remainder obtained after the modulo operation is performed on the nominal resource block group (RBG) size of the target frequency band. An eighth RB in the second RBG has a corresponding ninth RB on the first frequency band, and the eighth RB in the second RBG has no corresponding RB on the second frequency band. The communication method in this embodiment further includes: The network device performs data transmission with the terminal device on the same symbol by using the ninth RB.

In a possible design, the first scheduling information further includes a sequence number of a second RBG on the target frequency band. The CRB sequence number of the first RB and the CRB sequence number of the second RB each is the same as the remainder obtained after the modulo operation is performed on the nominal resource block group (RBG) size of the target frequency band. An eighth RB in the second RBG has no corresponding RB on the first frequency band, and the eighth RB in the second RBG has a corresponding tenth RB on the second frequency band. The communication method in this embodiment further includes: The network device performs data transmission with the terminal device on the same symbol by using the tenth RB.

In a possible design, if a precoding granularity of a data transmission resource scheduled by using the first scheduling information is a wideband, same precoding is used for data transmitted on a plurality of RBs on the first frequency band, and same precoding is used for data transmitted on a plurality of RBs on the second frequency band. Both the plurality of RBs on the first frequency band and the plurality of RBs on the second frequency band are frequency bands formed by contiguous physical resource blocks PRBs, and precoding used on the plurality RBs on the first frequency band is the same as or different from precoding used on the plurality RBs on the second frequency band.

According to a third aspect, an embodiment of the present disclosure provides a communication method. The method may be performed by a terminal device, or may be performed by a chip used in the terminal device. The following provides descriptions by using an example in which the method is performed by the terminal device. The method includes: A terminal device receives configuration information from a network device. The configuration information is used to configure at least two frequency bands for the terminal device, and the at least two frequency bands include a first frequency band and a second frequency band. Herein, both the first frequency band and the second frequency band may correspond to valid bandwidth parts (BWPs), or neither of them may correspond to valid BWPs. The terminal device receives second scheduling information from the network device. The second scheduling information indicates a resource block group (RBG) for data transmission on a target frequency band. The target frequency band includes a first frequency band and a second frequency band. The target frequency band includes at least three RBGs, and the second RBG in the three RBGs includes a first RB and a second RB. The first RB belongs to the first frequency band, and is a contiguous PRB with an RB in the first RBG of the three RBGs. The second RB belongs to the second frequency band, and is a contiguous PRB with an RB in the last RBG of the three RBGs. The terminal device performs data transmission with the network device on a same symbol by using an RB in the RBG indicated by the second scheduling information.

According to the communication method provided in this embodiment, when at least the first frequency band and the second frequency band are configured for the terminal device, the first RB on the first frequency band and the second RB on the second frequency band can form one RBG. The network device sends the second scheduling information to the terminal device. When the second scheduling information indicates, by using the RBG, the RB used for data transmission, the second scheduling information can also schedule the RBG including the first RB and the second RB. The terminal device performs data transmission with the network device on the same symbol by using the RB indicated by the second scheduling information, so that one piece of first scheduling information can be used for scheduling transmission resources on at least two frequency bands, thereby reducing control resource overheads. Because the RBG including the first RB and the second RB can also be scheduled, that is, an RB at an edge of a frequency band can also be used for data transmission, thereby improving transmission resource utilization.

In s possible design, a subcarrier spacing of the first frequency band is the same as a subcarrier spacing of the second frequency band, and a cyclic prefix (CP) type of the first frequency band is the same as a CP type of the second frequency band. In other words, a symbol length of the first frequency band is the same as a symbol length of the second frequency band.

According to a fourth aspect, an embodiment of the present disclosure provides a communication method. The method may be performed by a network device, or may be performed by a chip used in the network device. The following provides descriptions by using an example in which the method is performed by the network device. The method includes: A network device sends configuration information to a terminal device. The configuration information is used to configure at least two frequency bands for the terminal device, and the at least two frequency bands include a first frequency band and a second frequency band. The network device sends second scheduling information to the terminal device. The second scheduling information indicates an RBG for data transmission on a target frequency band. The target frequency band includes a first frequency band and a second frequency band. The target frequency band includes at least three RBGs, and the second RBG in the three RBGs includes a first RB and a second RB. The first RB belongs to the first frequency band, and is a contiguous PRB with an RB in the first RBG of the three RBGs. The second RB belongs to the second frequency band, and is a contiguous PRB with an RB in the last RBG of the three RBGs. The network device performs data transmission with the terminal device on a same symbol by using an RB in the RBG indicated by the "econ' scheduling information.

In s possible design, a subcarrier spacing of the first frequency band is the same as a subcarrier spacing of the second frequency band, and a cyclic prefix (CP) type of the first frequency band is the same as a CP type of the second frequency band.

According to a fifth aspect, an embodiment of the present disclosure provides a communication method. The method may be performed by a terminal device, or may be performed by a chip used in the terminal device. The following provides descriptions by using an example in which the method is performed by the terminal device. The method includes: A terminal device obtains statuses of a plurality of BWPs. The plurality of BWPs are BWPs configured by a network device for the terminal device. The terminal device determines a status of a target frequency band based on statuses of the plurality of BWPs. The target frequency band indicates a frequency domain resource that can be used for data transmission, and the target frequency band has an association relationship with the plurality of BWPs.

According to the communication method provided in this embodiment, when the target frequency band has the association relationship with the plurality of BWPs, the terminal device may determine the status of the target frequency band based on statuses of the plurality of BWPs. In this way, when the statuses of the plurality of BWPs are switched, the terminal device can still determine the status of the target frequency band, and a corresponding switching instruction does not need to be transmitted to indicate the status of the target frequency band, thereby reducing switching signaling overheads.

In a possible design, if the plurality of BWPs are all in an active state, the target frequency band is in an active state. Alternatively, if at least one of the plurality of BWPs is in an inactive state, the target frequency band is in an inactive state.

In this way, the terminal device can determine the status of the target frequency band based on the statuses of the plurality of BWPs, and the network device does not need to transmit a BWP switching instruction, thereby reducing signaling overheads.

In a possible design, the association relationship between the target frequency band and the plurality of BWPs is indicated by configuration information, and the configuration information is transmitted by the network device to the terminal device.

According to a sixth aspect, an embodiment of the present disclosure provides a communication method. The method may be performed by a network device, or may be performed by a chip used in the network device. The following provides descriptions by using an example in which the method is performed by the network device. The method includes: A network device obtains statuses of a plurality of BWPs. The plurality of BWPs are BWPs configured by the network device for a terminal device. The network device determines a status of a target frequency band based on statuses of the plurality of BWPs. The target frequency band indicates a frequency domain resource that can be used for data transmission, and the target frequency band has an association relationship with the plurality of BWPs.

In a possible design, if the plurality of BWPs is all in an active state, the target frequency band is in an active state. Alternatively, if at least one of the plurality of BWPs is in an inactive state, the target frequency band is in an inactive state.

In a possible design, the association relationship between the target frequency band and the plurality of BWPs is indicated by configuration information, and the configuration information is transmitted by the network device to the terminal device.

According to a seventh aspect, an embodiment of the present disclosure provides a communication method. The method may be performed by a terminal device, or may be performed by a chip used in the terminal device. The following provides descriptions by using an example in which the method is performed by the terminal device. The method includes: A terminal device obtains a status of a target frequency band. The target frequency band indicates a frequency domain resource that can be used for data transmission, and the target frequency band has an association relationship with a plurality of bandwidth parts (BWPs). The plurality of BWPs are BWPs configured by a network device for the terminal device. The terminal device determines statuses of the plurality of BWPs based on the status of the target frequency band.

According to the communication method provided in this embodiment, when the target frequency band has the association relationship with the plurality of BWPs, the terminal device may determine the statuses of the plurality of BWPs based on the status of the target frequency band. In this way, when the status of the target frequency band is switched, the terminal device can still determine the statuses of the BWPs that have the association relationship with the target frequency band, and a corresponding switching instruction does not need to be transmitted to indicate the statuses of the BWPs that have the association relationship with the target frequency band, thereby reducing switching signaling overheads.

In a possible design, if the target frequency band is in an active state, the plurality of BWPs are all in an active state. Alternatively, if the target frequency band is in an inactive state, at least one of the plurality of BWPs is in an inactive state.

In this way, the terminal device can determine the statuses of the plurality of BWPs based on the status of the target frequency band, and the network device does not need to transmit a BWP switching instruction, thereby reducing signaling overheads.

In a possible design, the association relationship between the target frequency band and the plurality of BWPs is indicated by configuration information, and the configuration information is transmitted by the network device to the terminal device.

According to an eighth aspect, an embodiment of the present disclosure provides a communication method. The method may be performed by a network device, or may be performed by a chip used in the network device. The following provides descriptions by using an example in which the method is performed by the network device. The method includes: A network device obtains a status of a target frequency band. The target frequency band indicates a frequency domain resource that can be used for data transmission, and the target frequency band has an association relationship with a plurality of bandwidth parts (BWPs). The plurality of BWPs are BWPs configured by the network device for the terminal device. The network device determines statuses of the plurality of BWPs based on the status of the target frequency band.

According to the communication method provided in this embodiment, when the target frequency band has the association relationship with the plurality of BWPs, the network device may determine the statuses of the plurality of BWPs based on the status of the target frequency band. In this way, when the status of the target frequency band is switched, the network device can still determine the statuses of the BWPs that have the association relationship with the target frequency band, and a corresponding switching instruction does not need to be transmitted to indicate the statuses of the BWPs that have the association relationship with the target frequency band, thereby reducing switching signaling overheads.

In a possible design, if the target frequency band is in an active state, the plurality of BWPs are all in an active state. Alternatively, if the target frequency band is in an inactive state, at least one of the plurality of BWPs is in an inactive state.

In a possible design, the association relationship between the target frequency band and the plurality of BWPs is indicated by configuration information, and the configuration information is transmitted by the network device to the terminal device.

According to a ninth aspect, an embodiment of the present disclosure provides a communication apparatus. The communication apparatus includes units configured to perform the steps in any one of the foregoing aspects. The communication apparatus may be the terminal device in any one of the first aspect or the possible designs of the first aspect, or a chip that implements a function of the terminal device; the communication apparatus may be the terminal device in any one of the third aspect or the possible designs of the third aspect, or a chip that implements a function of the terminal device; the communication apparatus may be the terminal device in any one of the fifth aspect or the possible designs of the fifth aspect, or a chip that implements a function of the terminal device; or the communication apparatus may be the terminal device in any one of the seventh aspect or the possible designs of the seventh aspect, or a chip that implements a function of the terminal device. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

According to a tenth aspect, an embodiment of the present disclosure provides a communication apparatus, including a processor and an interface circuit. The processor is configured to: communicate with another apparatus by using the interface circuit, and perform the communication method provided in any one of the foregoing aspects. There are one or more processors. The communication apparatus may be the terminal device in any one of the first aspect or the possible designs of the first aspect, or a chip that implements a function of the terminal device; the communication apparatus may be the terminal device in any one of the third aspect or the possible designs of the third aspect, or a chip that implements a function of the terminal device; the communication apparatus may be the terminal device in any one of the fifth aspect or the possible designs of the fifth aspect, or a chip that implements a function of the terminal device; or the communication apparatus may be the terminal device in any one of the seventh aspect or the possible designs of the seventh aspect, or a chip that implements a function of the terminal device.

According to an eleventh aspect, an embodiment of the present disclosure provides a communication apparatus. The communication apparatus includes a processor and a memory. The memory is configured to store computer instructions. When the processor executes the instructions, the communication apparatus is enabled to perform the method in any one of the foregoing aspects. The communication apparatus may be the terminal device in any one of the first aspect or the possible designs of the first aspect, or a chip that implements a function of the terminal device; the communication apparatus may be the terminal device in any one of the third aspect or the possible designs of the third aspect, or a chip that implements a function of the terminal device; the communication apparatus may be the terminal device in any one of the fifth aspect or the possible designs of the fifth aspect, or a chip that implements a function of the terminal device; or the communication apparatus may be the terminal device in any one of the seventh aspect or the possible designs of the seventh aspect, or a chip that implements a function of the terminal device.

According to a twelfth aspect, an embodiment of the present disclosure provides a communication apparatus, including a processor. The processor is configured to: after being coupled to a memory and reading instructions in the memory, perform the method in any one of the foregoing aspects according to the instructions. The communication apparatus may be the terminal device in any one of the first aspect or the possible designs of the first aspect, or a chip that implements a function of the terminal device; the communication apparatus may be the terminal device in any one of the third aspect or the possible designs of the third aspect, or a chip that implements a function of the terminal device; the communication apparatus may be the terminal device in any one of the fifth aspect or the possible designs of the fifth aspect, or a chip that implements a function of the terminal device; or the communication apparatus may be the terminal device in any one of the seventh aspect or the possible designs of the seventh aspect, or a chip that implements a function of the terminal device.

According to a thirteenth aspect, an embodiment of the present disclosure provides a communication apparatus. The communication apparatus includes units configured to perform the steps in any one of the foregoing aspects. The communication apparatus may be the network device in any one of the second aspect or the possible designs of the second aspect, or a chip that implements a function of the network device; the communication apparatus may be the network device in any one of the fourth aspect or the possible designs of the fourth aspect, or a chip that implements a function of the network device; the communication apparatus may be the network device in any one of the sixth aspect or the possible designs of the sixth aspect, or a chip that implements a function of the network device; or the communication apparatus may be the network device in any one of the eighth aspect or the possible designs of the eighth aspect, or a chip that implements a function of the network device. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

According to a fourteenth aspect, an embodiment of the present disclosure provides a communication apparatus, including a processor and an interface circuit. The processor is configured to: communicate with another apparatus by using the interface circuit, and perform the communication method provided in any one of the foregoing aspects. There are one or more processors. The communication apparatus may be the network device in any one of the second aspect or the possible designs of the second aspect, or a chip that implements a function of the network device; the communication apparatus may be the network device in any one of the fourth aspect or the possible designs of the fourth aspect, or a chip that implements a function of the network device; the communication apparatus may be the network device in any one of the sixth aspect or the possible designs of the sixth aspect, or a chip that implements a function of the network device; or the communication apparatus may be the network device in any one of the eighth aspect or the possible designs of the eighth aspect, or a chip that implements a function of the network device.

According to a fifteenth aspect, an embodiment of the present disclosure provides a communication apparatus. The communication apparatus includes a processor and a memory. The memory is configured to store computer instructions. When the processor executes the instructions, the communication apparatus is enabled to perform the method in any one of the foregoing aspects. The communication apparatus may be the network device in any one of the second aspect or the possible designs of the second aspect, or a chip that implements a function of the network device; the communication apparatus may be the network device in any one of the fourth aspect or the possible designs of the fourth aspect, or a chip that implements a function of the network device; the communication apparatus may be the network device in any one of the sixth aspect or the possible designs of the sixth aspect, or a chip that implements a function of the network device; or the communication apparatus may be the network device in any one of the eighth aspect or the possible designs of the eighth aspect, or a chip that implements a function of the network device.

According to a sixteenth aspect, an embodiment of the present disclosure provides a communication apparatus, including a processor. The processor is configured to: after being coupled to a memory and reading instructions in the memory, perform the method in any one of the foregoing aspects according to the instructions. The communication apparatus may be the network device in any one of the second aspect or the possible designs of the second aspect, or a chip that implements a function of the network device; the communication apparatus may be the network device in any one of the fourth aspect or the possible designs of the fourth aspect, or a chip that implements a function of the network device; the communication apparatus may be the network device in any one of the sixth aspect or the possible designs of the sixth aspect, or a chip that implements a function of the network device; or the communication apparatus may be the network device in any one of the eighth aspect or the possible designs of the eighth aspect, or a chip that implements a function of the network device.

According to a seventeenth aspect, an embodiment of the present disclosure provides a computer-readable storage medium. The computer-readable storage medium stores instructions, and when the instructions are run on a computer, the computer is enabled to perform the communication method in any one of the foregoing aspects.

According to an eighteenth aspect, an embodiment of the present disclosure provides a computer program product including instructions. When the computer program product is run on a computer, the computer is enabled to perform the communication method in any one of the foregoing aspects.

According to a nineteenth aspect, an embodiment of the present disclosure provides a circuit system. The circuit system includes a processing circuit, and the processing circuit is configured to perform the communication method in any one of the foregoing aspects.

According to a twentieth aspect, an embodiment of the present disclosure provides a chip. The chip includes a processor, the processor is coupled to a memory, the memory stores program instructions, and when the program instructions stored in the memory are executed by the processor, the communication method in any one of the foregoing aspects is implemented.

According to a twenty-first aspect, an embodiment of the present disclosure provides a communication system. The communication system includes the terminal device and the network device in any one of the foregoing aspects.

For technical effects brought by any design of the ninth aspect to the twenty-first aspect, refer to beneficial effects in the corresponding methods provided above. Details are not described herein again.

DESCRIPTION OF EMBODIMENTS

Figure 1:
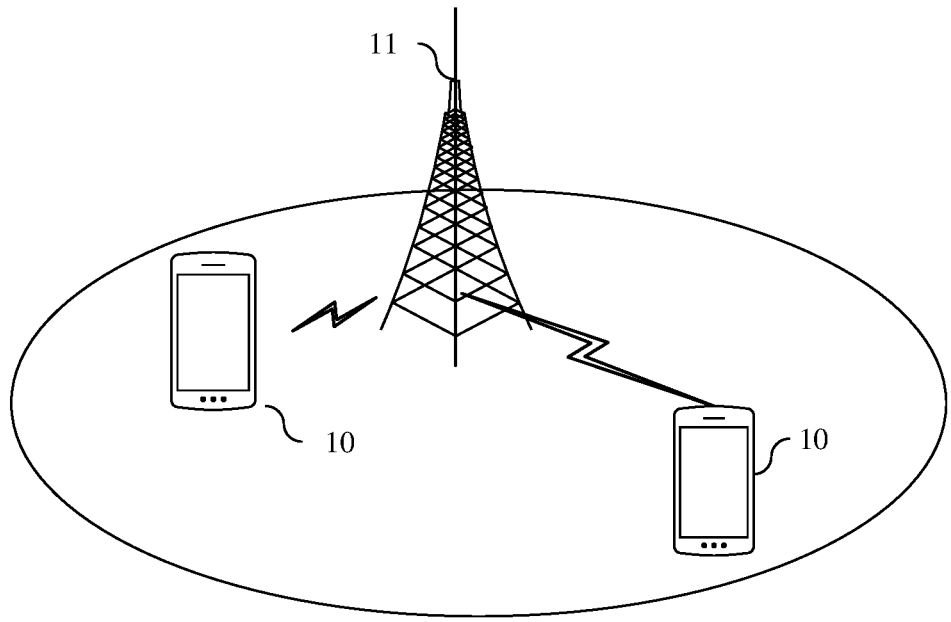
FIG. 1 is a schematic diagram of a network architecture according to an embodiment of the present disclosure.

In the specification and accompanying drawings of the present disclosure, the terms "first", "second", and the like are intended to distinguish between different objects or distinguish between different processing of a same object, but do not indicate a particular order of the objects. In addition, the terms "including", "having", or any other variant thereof in descriptions of the present disclosure are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. In embodiments of the present disclosure, "a plurality of" includes two or more. In embodiments of the present disclosure, the word "an example", "for example" or the like is used to represent giving an example, an illustration, or a description. Any embodiment or design scheme described as "an example" or "for example" in embodiments of the present disclosure should not be explained as being more preferred or having more advantages than another embodiment or design scheme. Exactly, use of the word "an example" or "for example" or the like is intended to present a relative concept in a specific manner.

Technical terms used in the present disclosure are first described.

1. Numerology

The numerology includes one or more of parameters such as a subcarrier spacing (SCS), a symbol length, a slot length, and a cyclic prefix (CP) length. For example, the numerology is defined by the SCS and the CP. In new radio (NR), a plurality of numerologies is supported, for example, as shown in Table 1.

TABLE 1

| μ | Δf = $2^\mu \cdot 15$[KHz] | Cyclic prefix |
|---|---|---|
| 0 | 15 | Normal cyclic prefix |
| 1 | 30 | Normal cyclic prefix |
| 2 | 60 | Normal cyclic prefix and extended cyclic prefix |
| 3 | 120 | Normal cyclic prefix |
| 4 | 240 | Normal cyclic prefix |

μ represents a sequence number of the subcarrier spacing, and Δf represents a value of the subcarrier spacing. It can be learned from Table 1 that there are two CP types for the 60 kHz subcarrier spacing: a normal cyclic prefix (NCP) and an extended cyclic prefix (ECP). Other subcarrier spacings each have only one CP type, that is, an NCP.

2. Resource Block (RB)

The RB is used to describe a mapping from a physical channel to a resource element (RE). In a long term evolution (LTE) system, in frequency domain, one RB includes 12 consecutive subcarriers, and a subcarrier spacing is 15 kHz. In time domain, one RB includes a preset quantity of consecutive orthogonal frequency division multiplexing (OFDM) symbols, occupies one slot, and is 0.5 ms. When a CP of the OFDM symbol is an NCP, one RB includes seven OFDM symbols. When a CP of the OFDM symbol is an ECP, one RB includes six OFDM symbols. In NR, one RB includes 12 consecutive subcarriers in frequency domain, and time domain of the RB is not defined.

3. Point A

The point A is a common reference point of an RB. In NR, a frequency band width is greatly increased, and flexibility of frequency domain resource allocation is improved. The point A is used as a reference point in frequency domain to allocate another resource.

4. Common Resource Block (CRB)

For a subcarrier spacing μ, the CRB is numbered from 0 in frequency domain, and a center of a subcarrier 0 of the CRB 0 is aligned with the point A.

5. Physical Resource Block (PRB)

The PRB is used when an RE is actually mapped at a physical layer, and belongs to a concept in an actual physical sense. The PRB is defined in a bandwidth part (BWP). For a subcarrier spacing μ, the PRB is numbered from 0 to $N_{BWP,i}^{size,\mu}-1$ in frequency domain. Herein, i is a number of the BWP. The number of the PRB and a sequence number of a CRB meet the following formula:

$$n_{CRB}^\mu = n_{PRB}^\mu + N_{BWP,i}^{start,\mu} \qquad \text{Formula (1)}$$

$n_{CRB}^\mu$ represents a sequence number of a CRB when a subcarrier spacing is μ. $n_{PRB}^\mu$ represents a number of a PRB when the subcarrier spacing is μ. $N_{BWP,i}^{start,\mu}$ represents a CRB sequence number at a start location of a BWP numbered i when the subcarrier spacing is A.

6. Virtual Resource Block (VRB)

The VRB is a logical concept, and may be used when scheduling is performed at a higher layer (for example, medium access control (MAC)) or a physical layer. One VRB has a structure and a size that are the same as those of a PRB. The VRB has two modes. In the mode 1, a location of the VRB is the same as a location of the PRB, and the VRB and the PRB are in a one-to-one correspondence. In the mode 2, a location of the VRB and a location of the PRB is not in a one-to-one correspondence, and the location of the PRB may be clearly deduced by using the location of the VRB and a mapping relationship between the VRB and the PRB.

7. Resource Block Group (RBG)

The RBG is a group of contiguous VRBs. A nominal RBG size is usually denoted as P. For a specific frequency band, a nominal RBG size of the frequency band is determined by a bandwidth of the frequency band and a higher-layer configuration parameter (for example, a configuration parameter of a physical downlink shared channel (PDSCH)). The higher-layer configuration parameter indicates a configuration status of the frequency band, for example, whether the frequency band uses a configuration 1 or a configuration 2. An example in which the frequency band is a BWP is used. "A correspondence between a BWP size and the nominal RBG size" is shown in Table 2.

TABLE 2

| BWP size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

Refer to Table 2, in a case of the configuration 1, if the BWP size is between 1 RB and 36 RBs, the nominal RBG size is 2. If the BWP size is between 37 RBs and 72 RBs, the nominal RBG size is 4. If the BWP size is between 73 RBs and 144 RBs, the nominal RBG size is 8. If the BWP size is between 145 RBs and 275 RBs, the nominal RBG size is 16. In a case of the configuration 2, if the BWP size is between 1 RB and 36 RBs, the nominal RBG size is 4. If the BWP size is between 37 RBs and 72 RBs, the nominal RBG size is 8. If the BWP size is between 73 RBs and 275 RBs, the nominal RBG size is 16.

8. Carrier Bandwidth

The carrier bandwidth is a bandwidth supported by a carrier, and may also be referred to as a system bandwidth, a carrier, or the like. For example, the carrier bandwidth in NR may be one of 10 MHz, 15 MHZ, 20 MHz, 50 MHz, 100 MHZ, 400 MHz, and the like.

9. BWP

NR supports a concept of the BWP, that is, supports data transmission between a network device and a terminal device by occupying some of system bandwidths (for example, 20 MHz). One system bandwidth (or one carrier) has at most one common BWP and four dedicated BWPs.

Parameters of the BWP include parameters such as a subcarrier spacing, and a symbol length and a CP type that are corresponding to the subcarrier spacing. One BWP corresponds to several contiguous CRBs in frequency domain. A maximum BWP size may be as large as the system bandwidth (or the carrier) in which the BWP is located, that is, 275 RBs.

A BWP status includes an active state and an inactive state. The active state refers to a working state. That the BWP is in the active state means that the BWP is in a working state, or the BWP may be described as "an active BWP". For example, the BWP may implement signal sending or receiving. The inactive state is opposite to the active state, and may be a non-working state. That the BWP is in the inactive state means that the BWP is in non-working state, or the BWP may be described as "an inactive BWP" or "a deactivated BWP". For example, the BWP may not implement signal sending or receiving. A process of switching the BWP from the inactive state to the active state or a process of switching the BWP in the non-working state to the working state is to activate the BWP. Correspondingly, a process of switching the BWP from the active state to the inactive state or a process of switching the BWP in the working state to the BWP in the non-working state is to deactivate the BWP, or may be described as performing deactivation on the BWP.

BWP switching refers to switching the active BWP. In an existing standard, when the terminal device works in a cell, there is only one active downlink BWP (DL BWP) and one active uplink BWP (UL BWP). However, the active BWP can be changed, which is called "BWP switching". For example, the network device configures two DL BWPs for the terminal device: a DL BWP 1 and a DL BWP 2. A DL BWP activated by the terminal device is the DL BWP 1. In this case, the network device may send a BWP switching indication (the switching indication is carried on a physical downlink control channel (PDCCH), and is transmitted by using the PDCCH), so that the DL BWP of the terminal device is switched to the DL BWP 2. Likewise, the network device may also indicate, by using the PDCCH, to switch an UL BWP activated by the terminal device.

A frequency division duplexing (FDD) system or a time division duplexing (TDD) system supports the BWP. The BWP can be classified into a downlink BWP and an uplink BWP. The network device may configure a plurality of DL BWPs and a plurality of UL BWPs for the terminal device, and activate at least one DL BWP and at least one UL BWP. The terminal device receives, on the active DL BWP (that is, the active DL BWP), downlink transmission sent by the network device. The downlink transmission includes but is not limited to downlink control signaling transmission and downlink data transmission. The terminal device sends uplink transmission on the active UL BWP. The uplink transmission includes but is not limited to uplink control signaling transmission, uplink data transmission, and uplink reference signal transmission. The uplink control signaling includes: correct acknowledgment (ACK)/negative acknowledgment, scheduling request (SR), and channel state information (CSI). The uplink reference signal includes a demodulation reference signal (DMRS), a phase tracking reference channel (PTRS), a sounding reference signal (SRS), and the like. In addition, in the TDD system, the DL BWP and the UL BWP of the terminal device are always switched in pairs. To be specific, once the DL BWP of the terminal device is switched, the UL BWP of the terminal device is also automatically switched to a pre-paired UL BWP. However, in the FDD system, DL BWP switching of the UE is decoupled from UL BWP switching of the UE. In other words, when the DL BWP of the terminal device is switched, the UL BWP of the terminal device may be switched or may not be switched. Alternatively, when the UL BWP of the terminal device is switched, the DL BWP of the terminal device may be switched, or may not be switched.

10. Cell

The cell is described by a higher-layer protocol layer from a perspective of resource management, mobility management, or a service unit. The higher-layer protocol layer is a protocol layer above a physical layer, for example, a radio resource control (RRC) layer and a media access control (MAC) layer. Coverage of each network device may be divided into one or more cells. One cell may be considered as being formed by specific frequency domain resources, that is, one cell may include a downlink component carrier (CC) and at least one uplink CC. Therefore, one BWP may also be understood as some of bandwidths of the cell. The cell is a general name. For a terminal device, a cell that provides a service for the terminal device is referred to as a serving cell. The cell in the present disclosure may alternatively be a serving cell. A configuration parameter of one cell includes a distance between a lowest subcarrier center of a lowest RB of the cell and a point A.

Scheduling information of the physical layer indicates a time-frequency resource location of the PDSCH and/or a time-frequency resource location of the PUSCH. One piece of scheduling information can schedule only one segment of frequency domain resource on a same time domain symbol to transmit the PDSCH and/or the PUSCH, and the segment of frequency domain resource belongs to one CC.

When one piece of scheduling information schedules one segment of frequency domain resource, if a location of the terminal device may be covered by frequency bands of a plurality of component carriers or covered by different frequency bands of one component carrier, the network device transmits a plurality of pieces of scheduling information to the terminal device. The plurality of pieces of scheduling information occupy excessive control resources, resulting in high control resource overheads.

In view of this, embodiments of the present disclosure provide a communication method. The communication method in the embodiments of the present disclosure is applicable to various communication systems. The communication method provided in embodiments of the present disclosure may be applied to a long term evolution (LTE) system, a fifth-generation (5G) communication network, another similar network, or another future network. FIG. 1 is a schematic diagram of an architecture of a communication system to which the communication method according to embodiments of the present disclosure is applicable. The communication system may include a terminal device 10 and a network device 11. The terminal device 10 is wirelessly connected to the network device 11. There may be one or more terminal devices 10, and there may be one or more network devices 11. FIG. 1 shows only one network device and two terminal devices. In FIG. 1, one ellipse represents one cell. FIG. 1 is merely a schematic diagram, and does not constitute any limitation on an application scenario of the communication method in embodiments of the present disclosure.

The terminal device 10, also referred to as user equipment (UE), a mobile station (MS), a mobile terminal (MT), or the like, is a device that provides a voice/data connectivity for a user, for example, a handheld device or a vehicle-mounted device having a wireless connection function. The terminal device may be a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a terminal device in a 5G communication network or a communication network after 5G, or the like. This is not limited in embodiments of the present disclosure.

The network device 11 is a device in a wireless communication network, for example, a radio access network (RAN) node that connects the terminal device 10 to the wireless communication network. Currently, some RAN nodes are, for example, a gNB, a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless fidelity (Wi-Fi) access point (AP), a network side device in a 5G communication network or a communication network after 5G, or the like.

The communication system and a service scenario described in embodiments of the present disclosure are intended to describe the technical solutions in embodiments of the present disclosure more clearly, but constitute no limitation on the technical solutions provided in embodiments of the present disclosure. A person of ordinary skill in the art may learn that the technical solutions provided in embodiments of the present disclosure are also applicable to a similar technical problem as a network architecture evolves and a new service scenario emerges.

The following describes in detail a communication method provided in embodiments of the present disclosure.

It should be noted that in the following embodiments of the present disclosure, names of messages between network elements, names of parameters in messages, or the like are merely examples, and may be other names during specific implementation. This is uniformly described herein, and details are not described below again.

Figure 2A:
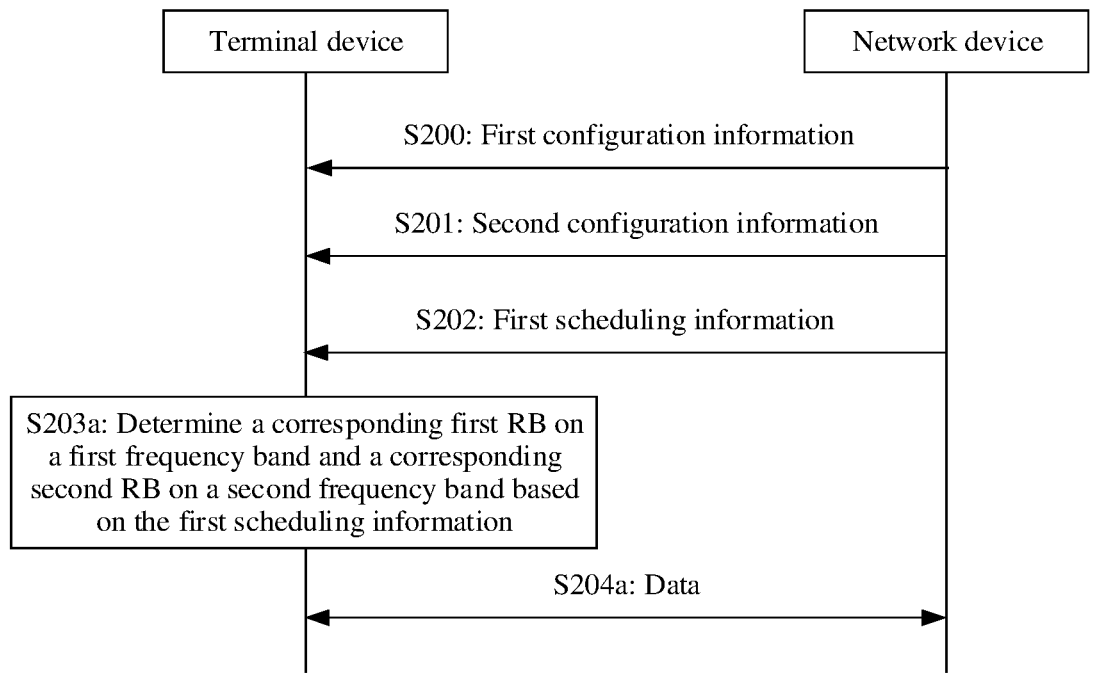
FIG. 2(a) is a schematic flowchart of a communication method according to an embodiment of the present disclosure.

An embodiment of the present disclosure provides a communication method, and the communication method is applied to a resource scheduling process. As shown in FIG. 2(a), the communication method includes the following steps.

S200: A network device sends first configuration information to a terminal device. Accordingly, the terminal device receives the first configuration information from the network device.

The first configuration information is used to configure at least two frequency bands for the terminal device. The at least two frequency bands include a first frequency band and a second frequency band. The first frequency band and the second frequency band are described as follows:

Both the first frequency band and the second frequency band are BWPs. Both the first frequency band and the second frequency band each include at least one RB.

A subcarrier spacing of the first frequency band is the same as a subcarrier spacing of the second frequency band, and a CP type of the first frequency band is the same as a CP type of the second frequency band. For example, both the subcarrier spacing of the first frequency band and the subcarrier spacing of the second frequency band are 60 kHz, and both the CP type of the first frequency band and the CP type of the second frequency band are NCPs. In this way, a symbol length of the first frequency band is the same as a symbol length of the second frequency band.

Herein, a bandwidth of the first frequency band may be the same as or different from a bandwidth of the second frequency band. Herein, both the bandwidth of the first frequency band and the bandwidth of the second frequency band are configured by the network device. In this case, the first configuration information separately indicates the bandwidth of the first frequency band and the bandwidth of the second frequency band. The bandwidth of the first frequency band is a bandwidth indicated by the first configuration information, and the bandwidth of the second frequency band is also the bandwidth indicated by the first configuration information.

The first frequency band and the second frequency band may be two frequency bands on a same component carrier, or may be frequency bands on different component carriers. This is not limited in this embodiment.

Herein, when both the first frequency band and the second frequency band are BWPs, for a specific implementation process in which the network device configures at least two BWPs for the terminal device, refer to the conventional technology. Details are not described herein again.

S201: The network device sends second configuration information to the terminal device. Accordingly, the terminal device receives the second configuration information from the network device.

The second configuration information is used to configure an association relationship between a target frequency band and the first frequency band and an association relationship between the target frequency band and the second frequency band. Herein, the first frequency band and the second frequency band meet the following condition: There is a correspondence between an RB 1 determined based on the first frequency band and an RB 2 determined based on the second frequency band. For the RB 1 and the RB 2, when both the RB 1 and the RB 2 can be used for data transmission, if the RB 1 is used for data transmission, the RB 2 is also used for data transmission; or if the RB 2 is used for data transmission, the RB 1 is also used for data transmission. Herein, the RB 1 may be "a start RB" on the first frequency band, the RB 1 may be "the second RB" on the first frequency band, or the RB 1 may be an RB before the first frequency band (that is, the RB 1 and the first frequency band are located on a same component carrier, and a CRB sequence number of the RB 1 is less than a CRB sequence number of the start RB on the first frequency band). This is not limited in this embodiment. Similarly, the RB 2 may be "a start RB" on the second frequency band, the RB 2 may be "the second RB" on the second frequency band, or the RB 2 may be an RB before the second frequency band (that is, the RB 2 and the second frequency band are located on a same component carrier, and a CRB sequence number of the RB 2 is less than a CRB sequence number of the start RB on the second frequency band). This is not limited in this embodiment. The following uses two possible implementations for description.

Figure 3:
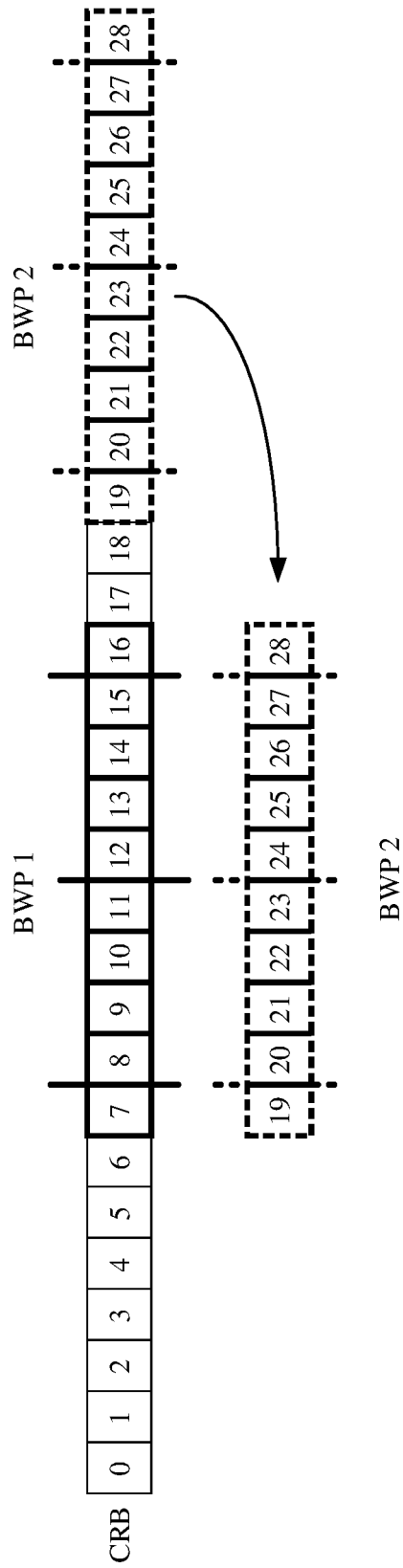
FIG. 3 is a schematic diagram of resource block distribution according to an embodiment of the present disclosure.
Figure 4:
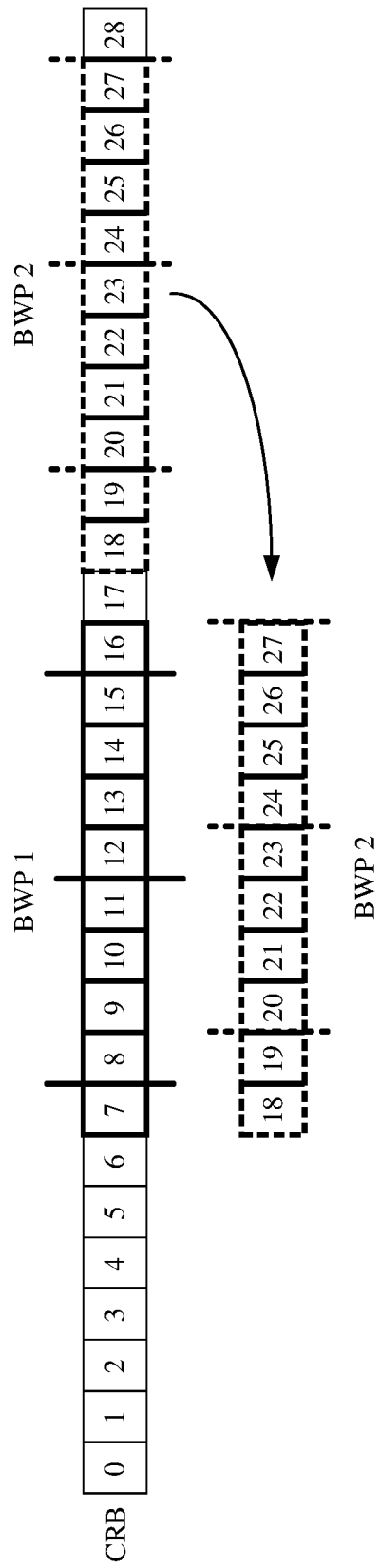
FIG. 4 is another schematic diagram of resource block distribution according to an embodiment of the present disclosure.

In a possible implementation, the second configuration information may directly indicate that "there is a correspondence between the RB 1 determined based on the first frequency band and the RB 2 determined based on the second frequency band". For example, a scenario in FIG. 3 is used as an example. The RB 1 is an RB whose CRB sequence number is 7, and the RB 2 is an RB whose CRB sequence number is 19. The second configuration information indicates that "there is a correspondence between the RB whose CRB sequence number is 7 and the RB whose CRB sequence number is 19". For another example, a scenario in FIG. 4 is used as an example. The RB 1 is an RB whose CRB sequence number is 6, and the RB 2 is an RB whose CRB sequence number is 18. The second configuration information indicates that "there is a correspondence between the RB whose CRB sequence number is 6 and the RB whose CRB sequence number is 18".

In another possible implementation, the second configuration information may alternatively indicate "RBs on the first frequency band and the second frequency band, each with one corresponding RB on the target frequency band". Herein, "one RB on the target frequency band" may be "a start RB" on the target frequency band, may be "the second RB" on the target frequency band, or may be "the third RB" on the target frequency band. This is not limited in this embodiment. For example, the scenario in FIG. 3 is still used as an example, the RB 1 is an RB whose CRB sequence number is 7, and the RB 2 is an RB whose CRB sequence number is 19. The second configuration information indicates that "the RB whose CRB sequence number is 7 and the RB whose CRB sequence number is 19, each has a correspondence with the start RB of the target frequency band". For another example, the scenario in FIG. 4 is used as an example. The RB 1 is an RB whose CRB sequence number is 6, and the RB 2 is an RB whose CRB sequence number is 18. The second configuration information indicates that "the RB whose CRB sequence number is 6 and the RB whose CRB sequence number is 18, each has a correspondence with the start RB of the target frequency band".

When there is a correspondence between the RB 1 determined based on the first frequency band and the RB 2 determined based on the second frequency band, an edge of an RBG on the first frequency band is aligned with an edge of an RBG on the second frequency band. In other words, a CRB sequence number of the RB 1 and a CRB sequence number of the RB 2 each is the same as a remainder obtained after a modulo operation is performed on a nominal resource block group (RBG) size of the target frequency band.

For example, refer to FIG. 3. That the first frequency band and the second frequency band are two frequency bands on a same component carrier is used as an example. The first frequency band is denoted as a BWP 1, and sequence numbers of corresponding CRBs are 7 to 16, as shown by bold line blocks in FIG. 3. The second frequency band is denoted as a BWP 2, and sequence numbers of corresponding CRBs are 19 to 28, as shown by dashed-line blocks in FIG. 3. A nominal RBG size of the first frequency band is 4. An RBG distribution status of the first frequency band is as follows: The first frequency band includes four RBGs. The first RBG includes one RB, that is, an RB whose CRB sequence number is 7. The second RBG includes four RBs, that is, RBs whose CRB sequence numbers are 8 to 11. The third RBG includes four RBs, that is, RBs whose CRB sequence numbers are 12 to 15. The fourth RBG includes one RB, that is, an RB whose CRB sequence number is 16. Details are shown in FIG. 3. A nominal RBG size of the second frequency band is also 4. An RBG distribution status of the second frequency band is as follows: The second frequency band also includes four RBGs. The first RBG includes one RB, that is, an RB whose CRB sequence number is 19. The second RBG includes four RBs, that is, RBs whose CRB sequence numbers are 20 to 23. The third RBG includes four RBs, that is, RBs whose CRB sequence numbers are 24 to 27. The fourth RBG includes one RB, that is, an RB whose CRB sequence number is 28. Details are shown in FIG. 3. When a value of the nominal RBG size of the target frequency band is equal to the nominal RBG size of the first frequency band or equal to the nominal RBG size of the second frequency band, the edge (shown by bold lines in FIG. 3) of the RBG on the first frequency band is aligned with the edge (shown by dashed lines in FIG. 3) of the RBG on the second frequency band. In this way, the first frequency band and the second frequency band may form the target frequency band.

For example, refer to FIG. 4. That the first frequency band and the second frequency band are two frequency bands on a same component carrier is still used as an example. The first frequency band is denoted as a BWP 1, and sequence numbers of corresponding CRBs are 7 to 16, as shown by bold line blocks in FIG. 4. The second frequency band is denoted as a BWP 2, and sequence numbers of corresponding CRBs are 18 to 27, as shown by dashed-line blocks in FIG. 4. A nominal RBG size of the first frequency band is 4. An RBG distribution status of the first frequency band in FIG. 4 is the same as the RBG distribution status of the first frequency band in FIG. 3. For details, refer to the description of the RBG distribution status of the first frequency band in FIG. 3. Details are not described herein again. A nominal RBG size of the second frequency band is also 4. An RBG distribution status of the second frequency band is as follows: The second frequency band includes three RBGs. The first RBG includes two RBs, that is, RBs whose CRB sequence numbers are 18 and 19. The second RBG includes four RBs, that is, RBs whose CRB sequence numbers are 20 to 23. The third RBG includes four RBs, that is, RBs whose CRB sequence numbers are 24 to 27. When a value of the nominal RBG size of the target frequency band is equal to the nominal RBG size of the first frequency band or equal to the nominal RBG size of the second frequency band, the edge (shown by bold lines in FIG. 4) of the RBG on the first frequency band is not aligned with the edge (shown by dashed lines in FIG. 4) on the RBG of the second frequency band. In this way, the first frequency band and the second frequency band may not form the target frequency band.

Figure 5:
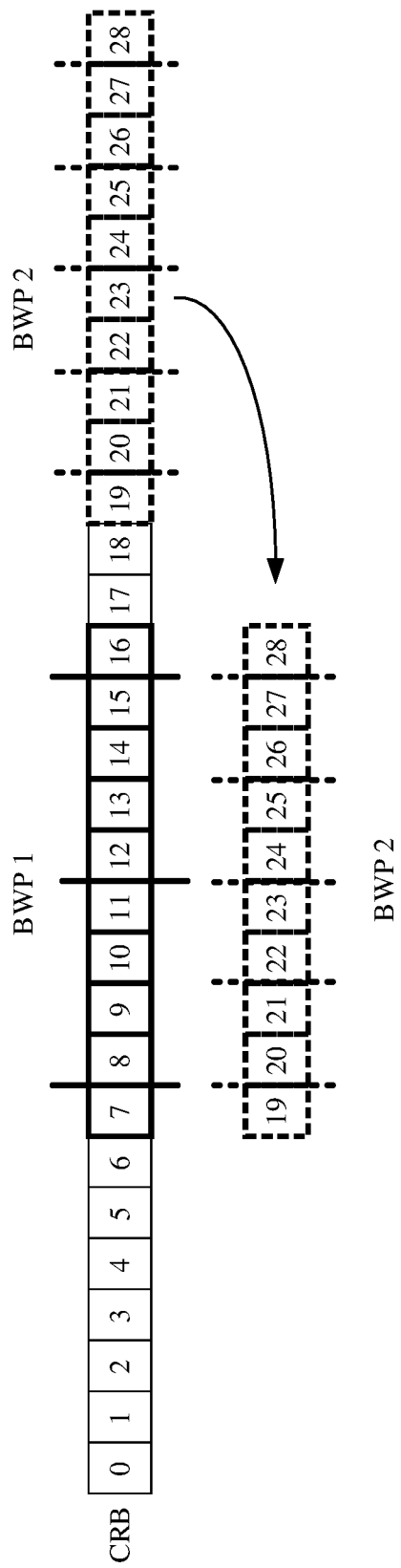
FIG. 5 is still another schematic diagram of resource block distribution according to an embodiment of the present disclosure.

For example, refer to FIG. 5. That the first frequency band and the second frequency band are two frequency bands on a same component carrier is still used as an example in FIG. 5. The first frequency band is denoted as a BWP 1, and sequence numbers of corresponding CRBs are 7 to 16, as shown by bold line blocks in FIG. 5. The second frequency band is denoted as a BWP 2, and sequence numbers of corresponding CRBs are 19 to 28, as shown by dashed-line blocks in FIG. 5. A nominal RBG size of the first frequency band is 4. An RBG distribution status of the first frequency band in FIG. 5 is the same as the RBG distribution status of the first frequency band in FIG. 3. For details, refer to the description of the RBG distribution status of the first frequency band in FIG. 3. Details are not described herein again. A nominal RBG size of the second frequency band is 2. An RBG distribution status of the second frequency band is as follows: The second frequency band includes six RBGs. The first RBG includes one RB, that is, an RB whose CRB sequence number is 19. The second RBG includes two RBs, that is, RBs whose CRB sequence numbers are 20 and 21. The third RBG includes two RBs, that is, RBs whose CRB sequence numbers are 22 and 23. The fourth RBG includes two RBs, that is, RBs whose CRB sequence numbers are 24 and 25. The fifth RBG includes two RBs, that is, RBs whose CRB sequence numbers are 26 and 27. The sixth RBG includes one RB, that is, an RB whose CRB sequence number is 28. Details are shown in FIG. 5. Herein, the nominal RBG size of the first frequency band is twice the nominal RBG size of the second frequency band. In this case, the nominal RBG size of the target frequency band may be equal to the nominal RBG size (that is, 4) of the first frequency band, or may be equal to the nominal RBG size (that is, 2) of the second frequency band. Regardless of whether the nominal RBG size of the target frequency band is equal to the nominal RBG size of the first frequency band or equal to the nominal RBG size of the second frequency band, the edge (shown by bold lines in FIG. 5) of the RBG on the first frequency band is aligned with the edge (shown by dashed lines in FIG. 5) of the RBG on the second frequency band in three places. In this way, the first frequency band and the second frequency band may also form the target frequency band.

In the foregoing constraint, the nominal RBG size of the target frequency band may be determined by the terminal device in the following two manners:

Manner 1: When the nominal RBG size of the first frequency band is an integer multiple of the nominal RBG size of the second frequency band, the nominal RBG size of the target frequency band is the nominal RBG size of the first frequency band or the nominal RBG size of the second frequency band.

Herein, both the nominal RBG size of the first frequency band and the nominal RBG size of the second frequency band are positive integers greater than 1.

For example, the first frequency band and the second frequency band shown in FIG. 3 or FIG. 4 are still used as an example. Both the nominal RBG size of the first frequency band and the nominal RBG size of the second frequency band are 4, that is, the nominal RBG size of the first frequency band is equal to the nominal RBG size of the second frequency band. In this case, the nominal RBG size of the target frequency band is also 4.

For example, the first frequency band and the second frequency band shown in FIG. 5 are still used as an example. The nominal RBG size of the first frequency band is 4, and the nominal RBG size of the second frequency band is 2, that is, the nominal RBG size of the first frequency band is twice the nominal RBG size of the second frequency band. In this case, the nominal RBG size of the target frequency band may be 4 or 2.

Manner 2: The nominal RBG size of the target frequency band is determined by the terminal device based on a bandwidth of the target frequency band.

In this manner, the second configuration information further includes a configuration parameter of a physical downlink shared channel (PDSCH). The configuration parameter of the PDSCH indicates a configuration status of the target frequency band, to indicate whether the target frequency band uses the configuration 1 or the configuration 2. After the terminal device determines the bandwidth of the target frequency band, the terminal device may determine the nominal RBG size of the target frequency band by querying Table 2.

A specific implementation process of "the terminal device determines the bandwidth of the target frequency band" is described in the following three cases:

Case 1: If the bandwidth of the first frequency band is the same as the bandwidth of the second frequency band, when the second configuration information does not indicate the bandwidth of the target frequency band, the bandwidth of the target frequency band is less than or equal to the bandwidth of the first frequency band.

For example, when the second configuration information does not indicate the RBs on the first frequency band and the second frequency band, each of which has the correspondence with the start RB of the target frequency band, and does not indicate the bandwidth of the target frequency band, the bandwidth of the target frequency band is equal to the bandwidth of the first frequency band. For example, as shown in FIG. 3, both the bandwidth of the first frequency band and the bandwidth of the second frequency band are 10 RBs, and the second configuration information does not indicate the RBs on the first frequency band and the second frequency band, each of which has the correspondence with the start RB of the target frequency band, and does not indicate the bandwidth of the target frequency band. In this case, the bandwidth of the target frequency band is 10 RBs.

For another example, when the second configuration information indicates that the RBs that separately have the correspondence with the start RB of the target frequency band are respectively the first RB on the first frequency band and the first RB on the second frequency band, the second configuration information may still not indicate the bandwidth of the target frequency band, and the bandwidth of the target frequency band is still equal to the bandwidth of the first frequency band. For example, in FIG. 3, both the bandwidth of the first frequency band and the bandwidth of the second frequency band are 10 RBs, and the RBs that separately have the correspondence with the start RB of the target frequency band are respectively the first RB (that is, the RB whose CRB sequence number is 7) on the first frequency band and the first RB (that is, the RB whose CRB sequence number is 19) on the second frequency band, and do not indicate the bandwidth of the target frequency band. In this case, the bandwidth of the target frequency band is 10 RBs.

For another example, the RBs that are indicated by the second configuration information and that separately have the correspondence with the start RB of the target frequency band are respectively a non-first RB on the first frequency band and a non-first RB on the second frequency band. For example, the RBs that are indicated by the second configuration information and that separately have the correspondence with the start RB of the target frequency band are respectively the second RB on the first frequency band and the second RB on the second frequency band. In this case, the second configuration information may still not indicate the bandwidth of the target frequency band, and the bandwidth of the target frequency band is less than the bandwidth of the first frequency band. For example, FIG. 3 is still used as an example. Both the bandwidth of the first frequency band and the bandwidth of the second frequency band are 10 RBs, and the RBs that separately have the correspondence with the start RB of the target frequency band are respectively the second RB (that is, the RB whose CRB sequence number is 8) on the first frequency band and the second RB (that is, the RB whose CRB sequence number is 20) on the second frequency band. In this case, the bandwidth of the target frequency band is 9 RBs, and is less than the bandwidth of the first frequency band (10 RBs).

Case 2: If the bandwidth of the first frequency band is different from the bandwidth of the second frequency band, the second configuration information indicates the bandwidth of the target frequency band. In this case, the bandwidth of the target frequency band is the bandwidth indicated by the second configuration information.

Case 3: Regardless of whether the bandwidth of the first frequency band is the same as the bandwidth of the second frequency band, the second configuration information indicates the bandwidth of the target frequency band. In this case, the bandwidth of the target frequency band is the bandwidth indicated by the second configuration information.

In scenarios of Case 2 and Case 3, the second configuration information further indicates the RBs that are in the first frequency band and the second frequency band and separately have the correspondence with the start RB on the target frequency band, so that the terminal device learns of a correspondence between the RB on the first frequency band and the RB on the target frequency band and a correspondence between the RB on the second frequency band and the RB on the target frequency band.

Figure 6:
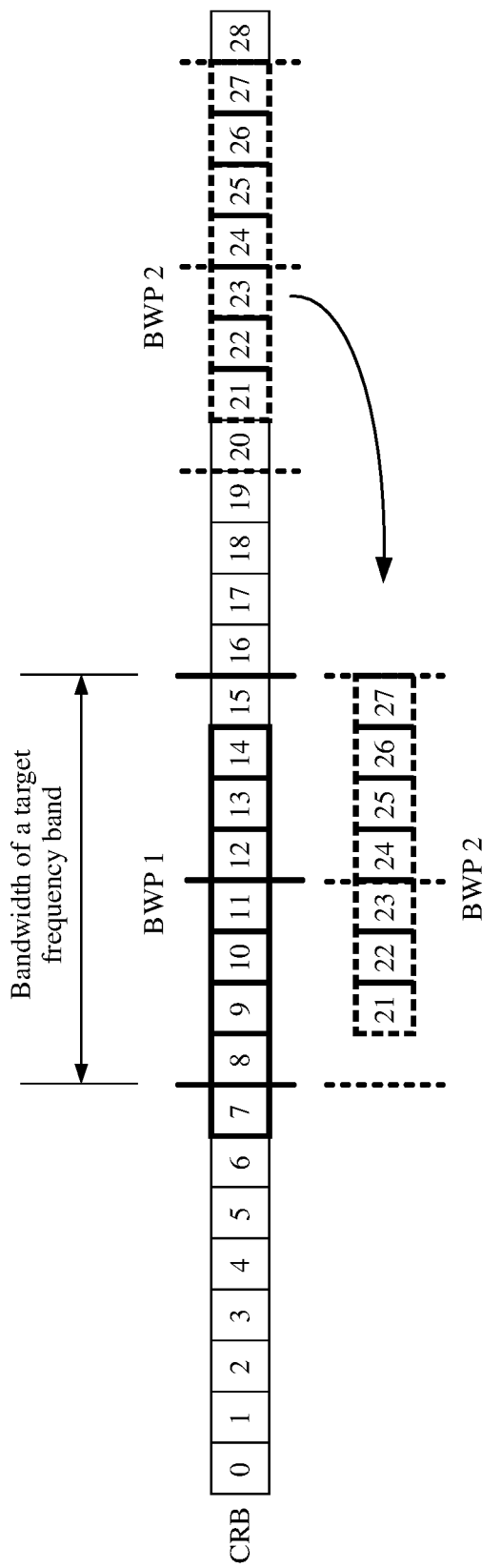
FIG. 6 is still another schematic diagram of resource block distribution according to an embodiment of the present disclosure.

For example, refer to FIG. 6. That the first frequency band and the second frequency band are two frequency bands on a same component carrier is still used as an example in FIG. 6. The first frequency band is denoted as a BWP 1, and sequence numbers of corresponding CRBs are 7 to 14, as shown by bold line blocks in FIG. 6. The second frequency band is denoted as a BWP 2, and sequence numbers of corresponding CRBs are 21 to 27, as shown by dashed-line blocks in FIG. 6. Both a nominal RBG size of the first frequency band and a nominal RBG size of the second frequency band are 4. A bandwidth of the target frequency band is eight RBs. The RBs that separately have the correspondence with the start RB of the target frequency band are respectively the second RB (that is, the RB whose CRB sequence number is 8) on the first frequency band and an RB (that is, the RB whose CRB sequence number is 20) first adjacent before the second frequency band, and do not indicate the bandwidth of the target frequency band. In other words, there is a correspondence between the first RB (that is, the RB whose CRB sequence number is 21) on the second frequency band and the third RB (that is, the RB whose CRB sequence number is 9) on the first frequency band.

Further, in a scenario shown in FIG. 6, the nominal RBG size of the first frequency band is 4. An RBG distribution status of the first frequency band is as follows: The first frequency band includes three RBGs. The first RBG includes one RB, that is, an RB whose CRB sequence number is 7. The second RBG includes four RBs, that is, RBs whose CRB sequence numbers are 8 to 11. The third RBG includes three RBs, that is, RBs whose CRB sequence numbers are 12 to 14. Details are shown in FIG. 6. The nominal RBG size of the second frequency band is also 4. An RBG distribution status of the second frequency band is as follows: The second frequency band includes two RBGs. The first RBG includes three RBs, that is, RBs whose CRB sequence numbers are 21 to 23. The second RBG includes four RBs, that is, RBs whose CRB sequence numbers are 24 to 27. Details are shown in FIG. 6. When a nominal RBG size of the target frequency band is equal to the nominal RBG size of the first frequency band, an edge (shown by bold lines in FIG. 6) of an RBG on the first frequency band is aligned with an edge (shown by dashed lines in FIG. 6) of an RBG on the second frequency band in one place. In this way, the first frequency band and the second frequency band may also form the target frequency band. In this case, the target frequency band includes some RBs (that is, RBs whose CRB sequence numbers are 8 to 14) on the first frequency band and RBs (that is, RBs whose CRB sequence numbers are 21 to 27) on the second frequency band.

Figure 7:
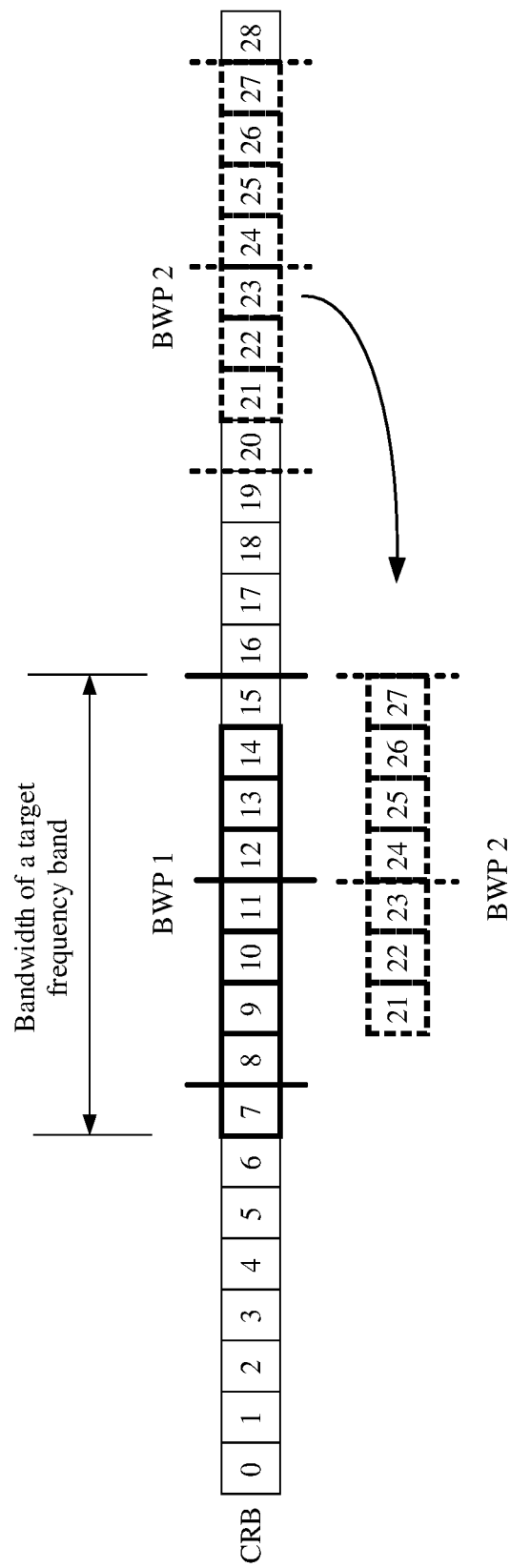
FIG. 7 is still another schematic diagram of resource block distribution according to an embodiment of the present disclosure.

For example, refer to FIG. 7. FIG. 7 still uses an example in which the first frequency band and the second frequency band are two frequency bands on a same component carrier, and the first frequency band and the second frequency band are the same as those in the scenario shown in FIG. 6. If a bandwidth of the target frequency band is nine RBs, the RBs that separately have the correspondence with the start RB of the target frequency band are respectively the first RB (that is, the RB whose CRB sequence number is 7) on the first frequency band and an RB (that is, the RB whose CRB sequence number is 19) second adjacent before the second frequency band, and do not indicate the bandwidth of the target frequency band. In other words, there is a correspondence between the first RB (that is, the RB whose CRB sequence number is 21) on the second frequency band and the third RB (that is, the RB whose CRB sequence number is 9) on the first frequency band.

Further, in a scenario shown in FIG. 7, a nominal RBG size of the first frequency band is 4. An RBG distribution status of the first frequency band in FIG. 7 is the same as the distribution status of the first frequency band in FIG. 6. For details, refer to the related description of the distribution status of the first frequency band in FIG. 6. Details are not described herein again. A nominal RBG size of the second frequency band is also 4. An RBG distribution status of the second frequency band in FIG. 7 is the same as the distribution status of the second frequency band in FIG. 6. For details, refer to the related description of the distribution status of the second frequency band in FIG. 6. Details are not described herein again. When a nominal RBG size of the target frequency band is equal to the nominal RBG size of the first frequency band, an edge (shown by bold lines in FIG. 7) of an RBG on the first frequency band is aligned with an edge (shown by dashed lines in FIG. 7) of an RBG on the second frequency band in one place. In this way, the first frequency band and the second frequency band may also form the target frequency band. In this case, the target frequency band includes RBs (that is, RBs whose CRB sequence numbers are 7 to 14) on the first frequency band and RBs (that is, RBs whose CRB sequence numbers are 21 to 27) on the second frequency band.

It should be noted that, when neither the first frequency band nor the second frequency band corresponds to a valid BWP, S200 is not performed. The second configuration information further indicates a subcarrier spacing, a CP type, and a bandwidth of the target frequency band. In this way, the terminal device determines the first frequency band and the second frequency band based on the subcarrier spacing, the CP type, and the bandwidth of the target frequency band. A subcarrier spacing of the first frequency band and a subcarrier spacing of the second frequency band each is the same as the subcarrier spacing of the target frequency band. A CP type of the first frequency band and a CP type of the second frequency band each is the same as the CP type of the target frequency band. Both a bandwidth of the first frequency band and a bandwidth of the second frequency band may be indicated by the network device. In this case, the second configuration information further indicates the bandwidth of the first frequency band and the bandwidth of the second frequency band. Herein, the bandwidth of the first frequency band may be the same as or different from the bandwidth of the second frequency band. If the network device does not indicate the bandwidth of the first frequency band and the bandwidth of the second frequency band, the bandwidth of the first frequency band and the bandwidth of the second frequency band each is the same as the bandwidth of the target frequency band. In addition, the second configuration information further indicates "the RBs on the first frequency band and the second frequency band have the correspondence (that is, there is a correspondence between the RB 1 determined based on the first frequency band and the RB 2 determined based on the second frequency band). For details, refer to related descriptions of "two possible implementations" in S201. Details are not described herein again. In this way, when the terminal device determines the RGB distribution status of the first frequency band and the RBG distribution status of the second frequency band based on the nominal RBG size of the target frequency band, an edge of an RBG on the first frequency band is aligned with an edge of an RBG on the second frequency band. Herein, the first frequency band and the second frequency band may still be two frequency bands on a same component carrier, or may be frequency bands on different component carriers. This is not limited in this embodiment.

S202: The network device sends first scheduling information to the terminal device. Accordingly, the terminal device receives the first scheduling information from the network device.

The first scheduling information may be physical layer signaling, for example, downlink control information (DCI) in different formats. Alternatively, the first scheduling information may be higher layer signaling, for example, a configured grant configuration information element (IE). The first scheduling information indicates a target RB for data transmission. The target RB includes a first RB or a second RB. The first RB is an RB on the first frequency band, and the second RB is an RB on the second frequency band. Herein, there are a plurality of manners of "the first scheduling information indicates the target RB", which may be, for example, but is not limited to the following manners:

The first scheduling information indicates a resource sequence number on the target frequency band. The resource sequence number indicates the first RB or the second RB In other words, the first scheduling information indicates the resource sequence number on the target frequency band, and the first RB on the first frequency band is indicated by using the resource sequence number on the target frequency band, or the second RB on the second frequency band is indicated by using the resource sequence number on the target frequency band.

For example, downlink frequency domain resource allocation is used as an example for description. Downlink frequency domain resource allocation supports two types, that is, a type 0 and a type 1. The following uses two examples for description:

Example 1: The type of the downlink frequency domain resource allocation is the type 0. In this case, if the first scheduling information is DCI, a format of the DCI may be 1_1 or 1_2. The first scheduling information indicates, by using a bitmap, an RBG allocated to the terminal device. A quantity of bits included in the bitmap is equal to a quantity of RBGs. To be specific, a bit location of one bit corresponds to one RBG, and different bits correspond to different RBGs. When a specific bit state is "1", it indicates that an RBG corresponding to the bit is used for data transmission. On the contrary, when a specific bit state is "0", it indicates that an RBG corresponding to the bit is not used for data transmission. Alternatively, when a specific bit state is "0", it indicates that an RBG corresponding to the bit is used for data transmission. On the contrary, when a specific bit state is "1", it indicates that an RBG corresponding to the bit is not used for data transmission. In this case, the sequence number that is of the RBG used for data transmission and that is indicated by the first scheduling information by using the bitmap is the resource sequence number on the target frequency band.

Example 2: The type of the downlink frequency domain resource allocation is the type 1. In this case, if the first scheduling information is DCI, a format of the DCI may be 1_0, 1_1, or 1_2. When the DCI format may be 1_0, the type of downlink frequency domain resource allocation is the type 1 by default. The first scheduling information indicates a segment of contiguous VRBs for the terminal device. If interleaving is performed on these "contiguous VRBs", these "contiguous VRBs" correspond to incontiguous PRBs. If interleaving is not performed on these "contiguous VRBs", these "contiguous VRBs" correspond to contiguous PRBs. In this case, the sequence number that is of the VRB used for data transmission and that is indicated by the first scheduling information is the resource sequence number on the target frequency band.

S203a: The terminal device determines, based on the first scheduling information, a corresponding first RB on the first frequency band and a corresponding second RB on the second frequency band.

There is a plurality of specific implementation forms of the first scheduling information. Herein, a specific implementation process of S203a is described by using an example in which the first scheduling information indicates the resource sequence number on the target frequency band and the first RB and the second RB are determined by using the resource sequence number. The specific implementation process of S203a varies with an implementation form of the resource sequence number. Specifically, there are the following two cases:

Case 1: The resource sequence number includes a sequence number of a VRB 1 on the target frequency band.

In this case, that the terminal device performs S203a is specifically implemented as follows: The terminal device determines, based on the sequence number of the VRB 1, a first RB that is on the first frequency band and corresponds to the VRB 1 and a second RB that is on the second frequency band and corresponds to the VRB 1.

Herein, both the first RB and the second RB are PRBs.

Figure 8A:
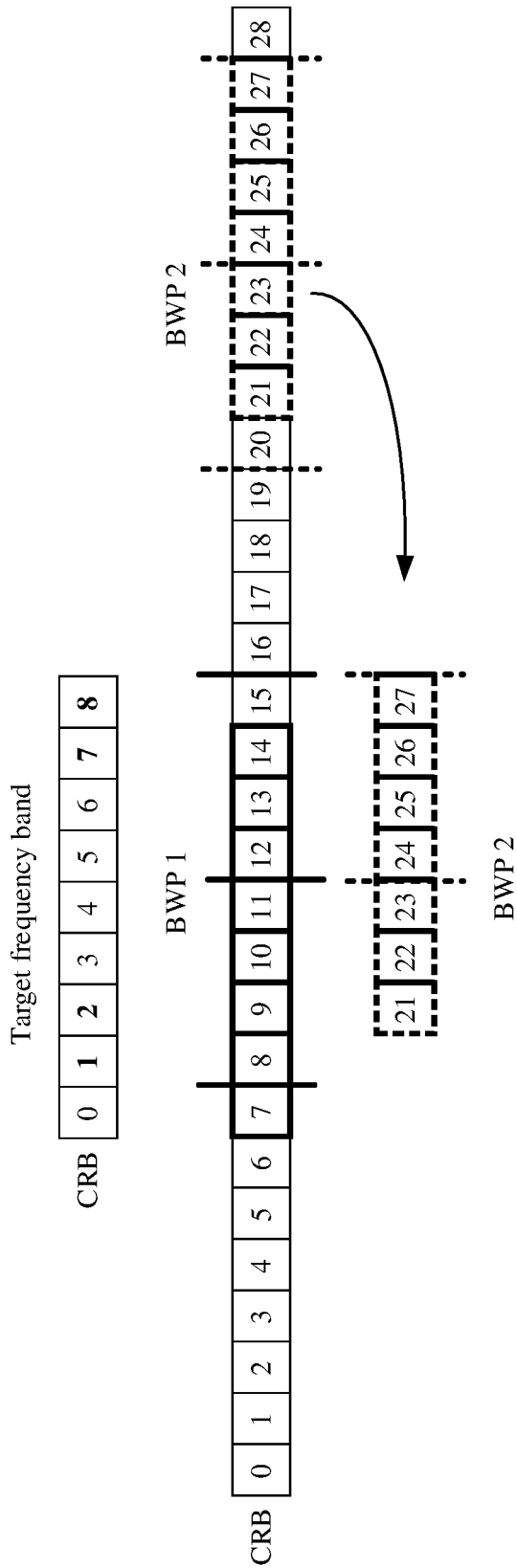
FIG. 8(a) is still another schematic diagram of resource block distribution according to an embodiment of the present disclosure.
Figure 8B:
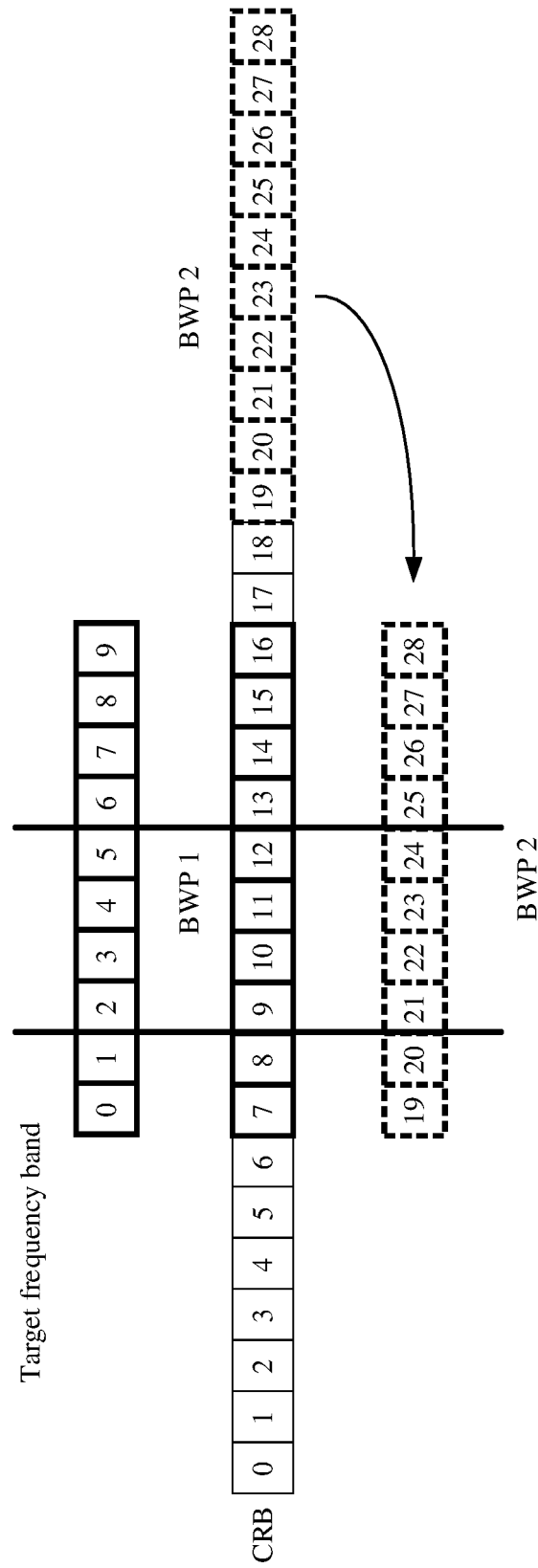
FIG. 8(b) is still another schematic diagram of resource block distribution according to an embodiment of the present disclosure.
Figure 8C:
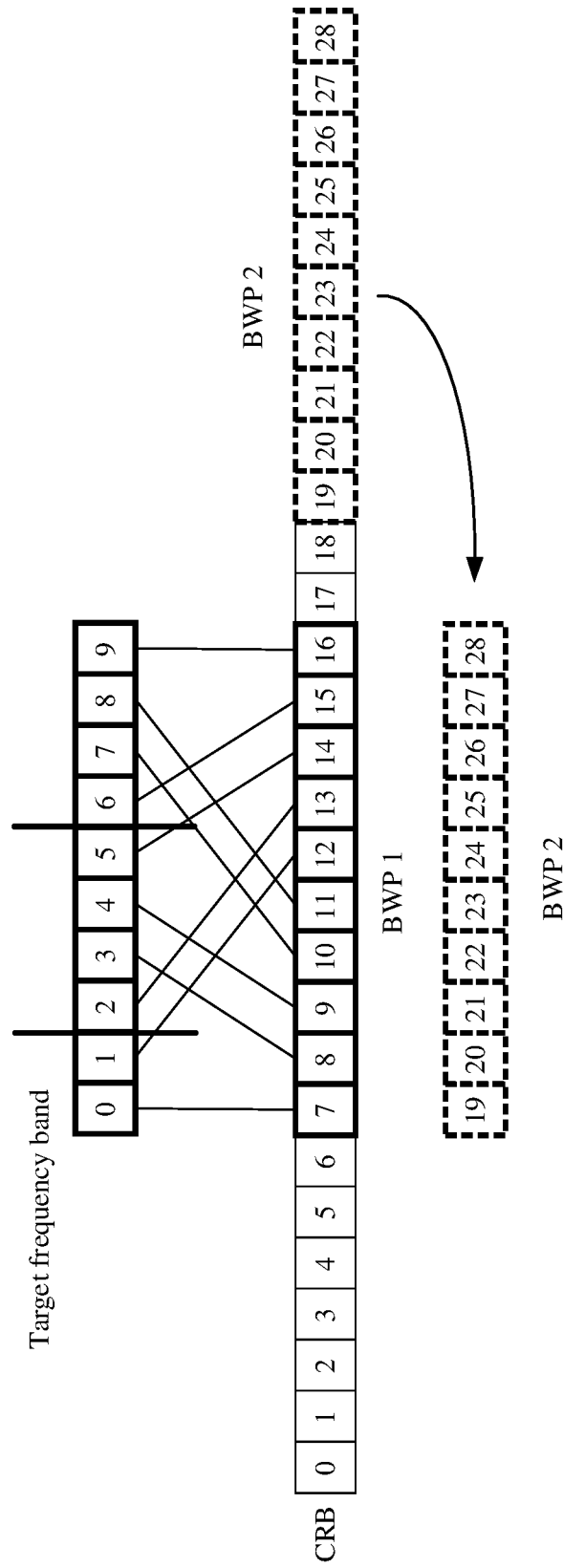
FIG. 8(c) is still another schematic diagram of resource block distribution according to an embodiment of the present disclosure.

For example, when the type of the downlink frequency domain resource allocation is the type 1, if the first scheduling information is DCI, and a scenario shown in FIG. 8(b) is used as an example, the target frequency band includes 10 RBs, and sequence numbers of the 10 RBs are shown by numbers in blocks, that is, sequence numbers of the 10 RBs are 0 to 9. The first scheduling information indicates that "the third VRB to the sixth VRB (that is, VRBs whose sequence numbers are 2 to 5)" are used for data transmission, that is, the VRB 1 is "the VRBs whose sequence numbers are 2 to 5". If interleaving is not performed on "the third VRB to the sixth VRB", a corresponding PRB (RBs whose CRB sequence numbers are 9 to 12) in the BWP 1 and a corresponding PRB (RBs whose CRB sequence numbers are 21 to 24) in the BWP 2 are used for data transmission. A scenario shown in FIG. 8(c) is used as an example. The first scheduling information still indicates that "the third VRB to the sixth VRB" are used for data transmission, that is, the VRB 1 is still "the VRBs whose sequence numbers are 2 to 5". If interleaving is performed on "the third VRB to the sixth VRB", a corresponding PRB (RBs whose CRB sequence numbers are 8, 9, 13, and 14) in the BWP 1 and a corresponding PRB (RBs whose CRB sequence numbers are 20, 21, 25, and 26) in the BWP 2 are used for data transmission. Herein, for a specific process of determining the first RB and the second RB based on the VRB 1, refer to the conventional technology. Details are not described herein again.

In this way, when the first scheduling information indicates, by using the VRB 1, a resource block used for data transmission on the target frequency band, the terminal device can also determine one RB (that is, the first RB) on the first frequency band and one RB (that is, the second RB) on the second frequency band based on the VRB 1, to schedule the RBs on the two frequency bands.

Case 2: The resource sequence number includes a sequence number of an RBG 1 on the target frequency band.

In this case, that the terminal device performs S203a is implemented as follows: The terminal device determines, based on the sequence number of the RBG 1, a first RB that is on the first frequency band and corresponds to a fifth RB in the RBG 1 and a second RB that is on the second frequency band and corresponds to the fifth RB in the RBG 1.

For example, when the type of the downlink frequency domain resource allocation is the type 0, if the first scheduling information is DCI, the sequence number that is of the RBG for data transmission and that is indicated by the first scheduling information by using the bitmap is the resource sequence number of the RBG 1. The scenario shown in FIG. 3 is used as an example. The target frequency band includes four RBGs, a quantity of bits of the bitmap is 4, and a value status of the four bits is "0010". When "a specific bit state being 1 represents that an RBG corresponding to the bit is used for data transmission", the first RBG (an RB whose CRB sequence number is 7), the second RBG (an RB whose CRB sequence number is 8 to 11), and the fourth RBG (an RB whose CRB sequence number is 16) in the BWP 1 are not used for data transmission, and the third RBG (RBs whose CRB sequence numbers are 12 to 15) in the BWP 1 is used for data transmission. The first RBG (an RB whose CRB sequence number is 19), the second RBG (RBs whose CRB sequence numbers are 20 to 23), and the fourth RBG (an RB whose CRB sequence number is 28) in the BWP 2 are not used for data transmission. The third RBG (RBs whose CRB sequence numbers are 24 to 27) in the BWP 2 is used for data transmission.

For example, as shown in FIG. 8(a), the bandwidth of the target frequency band is nine RBs, and the RBs that separately have the correspondence with the start RB of the target frequency band are respectively the first RB (that is, the RB whose CRB sequence number is 7) on the first frequency band and a second RB adjacent before the second frequency band. The first scheduling information indicates that RBs whose CRB sequence numbers are 1, 2, 7, and 8 on the target frequency band are used for data transmission. The fifth RB may be an RB whose CRB sequence number is 2 on the target frequency band. Correspondingly, the sequence number of the RBG 1 on the target frequency band is a sequence number of an RBG in which the RB whose CRB sequence number is 2 is located. The first RB that is on the first frequency band and corresponds to the RB whose CRB sequence number is 2 (that is, the fifth RB in the RBG 1) on the target frequency band is an RB whose CRB sequence number is 9. The second RB that is on the second frequency band and corresponds to the RB whose CRB sequence number is 2 (that is, the fifth RB in the RBG 1) on the target frequency band is an RB whose CRB sequence number is 21, as shown in FIG. 8(a). The fifth RB may also be an RB whose CRB sequence number is 7 on the target frequency band. Correspondingly, the sequence number of the RBG 1 on the target frequency band is a sequence number of an RBG in which the RB whose CRB sequence number is 7 is located. The first RB that is on the first frequency band and corresponds to the RB whose CRB sequence number is 7 (that is, the fifth RB in the RBG 1) on the target frequency band is an RB whose CRB sequence number is 14. The second RB that is on the second frequency band and corresponds to the RB whose CRB sequence number is 7 (that is, the fifth RB in the RBG 1) on the target frequency band is an RB whose CRB sequence number is 26, as shown in FIG. 8(a).

In this way, when the first scheduling information indicates, by using the RBG 1, a resource block used for data transmission on the target frequency band, the terminal device can also determine one RB (that is, the first RB) on the first frequency band and one RB (that is, the second RB)

on the second frequency band based on the RBG 1, to schedule the RBs on the two frequency bands.

It should be noted that there may be a plurality of specific implementation forms of the first scheduling information, but the first RB and the second RB that are determined based on the first scheduling information meet the following relationship: there is a first CRB deviation between the first RB and the second RB. The first CRB deviation is indicated by the network device. FIG. 8(*a*) is still used as an example. The first RB is an RB whose CRB sequence number is 9 on the first frequency band, and the second RB is an RB whose CRB sequence number is 21 on the second frequency band. In this case, the first CRB deviation between the first RB and the second RB is 12. The first RB is an RB whose CRB sequence number is 14 on the first frequency band, and the second RB is an RB whose CRB sequence number is 26 on the second frequency band. In this case, the first CRB deviation between the first RB and the second RB is also 12.

S204*a*: The terminal device performs data transmission with the network device on a same symbol by using the first RB on the first frequency band and the second RB on the second frequency band.

The same symbol may be one symbol, or may be two or more symbols. Herein, the two or more symbols may be described as "a plurality of symbols".

For example, a time domain resource used when the terminal device performs data transmission with the network device is one symbol, and a frequency domain resource is the first RB and the second RB.

Herein, when the target RB includes the first RB but does not include the second RB, the terminal device can also perform data transmission with the network device by using the first RB and the second RB. When the target RB does not include the first RB but includes the second RB, the terminal device can still perform data transmission with the network device by using the first RB and the second RB.

According to the communication method provided in this embodiment, when at least the first frequency band and the second frequency band are configured for the terminal device, the network device sends the first scheduling information to the terminal device. Even if the first scheduling information indicates that the target RB used for data transmission includes the first RB on the first frequency band, or the first scheduling information indicates that the target RB used for data transmission includes the second RB on the second frequency band, because the first CRB deviation is met between the first RB and the second RB, the terminal device can still perform data transmission with the network device on the same symbol by using the first RB and the second RB, so that one piece of first scheduling information schedules transmission resources on at least two frequency bands, thereby reducing control resource overheads.

In some embodiments, the target RB further includes a third RB or a fourth RB. Correspondingly, refer to FIG. 9(*a*), after performing S202, the terminal device further performs S205*a* and S206*a*.

S205*a*: The terminal device determines, based on the first scheduling information, a corresponding third RB on the first frequency band and a corresponding fourth RB on the second frequency band.

For example, a specific implementation process of S205*a* is described by still using an example in which the first scheduling information indicates the resource sequence number on the target frequency band and the third RB and the fourth RB are determined by using the resource sequence number.

Case 1: In addition to the sequence number of the VRB 1 on the target frequency band, the resource sequence number further includes a sequence number of a VRB 2 on the target frequency band.

In this case, that the terminal device performs S205*a* is implemented as follows: The terminal device determines, based on the sequence number of the VRB 2, a third RB that is on the first frequency band and corresponds to the VRB 2 and a fourth RB that is on the second frequency band and corresponds to the VRB 2.

Herein, for related descriptions of the first scheduling information, refer to related descriptions in S202. The first scheduling information may be DCI in a format of 1_0, 1_1, or 1_2. Both the third RB and the fourth RB are PRBs. For a specific process of determining the PRB based on the VRB 2, refer to the conventional technology. Details are not described herein again.

In this way, when the first scheduling information further indicates, by using the VRB 2, a resource block used for data transmission on the target frequency band, the terminal device can also determine one RB (that is, the third RB) on the first frequency band and one RB (that is, the fourth RB) on the second frequency band based on the VRB 2, to schedule the RBs on the two frequency bands.

Case 2: In addition to the sequence number of the RBG 1 on the target frequency band, the resource sequence number further includes a sequence number of an RBG 2 on the target frequency band.

In this case, that the terminal device performs S205*a* is implemented as follows: The terminal device determines, based on the sequence number of the RBG 2, a third RB that is on the first frequency band and corresponds to a fifth RB in the RBG 2 and a fourth RB that is on the second frequency band and corresponds to the fifth RB in the RBG 2.

Herein, for related descriptions of the first scheduling information, refer to related descriptions in S202. The first scheduling information may be DCI in a format of 1_1, or 1_2. For example, FIG. 8(*a*) is still used as an example. The fifth RB in the RBG 1 is an RB whose CRB sequence number is 2 on the target frequency band, and the fifth RB in the RBG 2 is an RB whose CRB sequence number is 7 on the target frequency band. In this case, the third RB that is on the first frequency band and corresponds to the RB whose CRB sequence number is 7 (that is, the fifth RB in the RBG 2) on the target frequency band is an RB whose CRB sequence number is 14. The fourth RB that is on the second frequency band and corresponds to the RB whose CRB sequence number is 7 (that is, the fifth RB in the RBG 2) on the target frequency band is an RB whose CRB sequence number is 26, as shown in FIG. 8(*a*). Alternatively, the fifth RB in the RBG 1 is an RB whose CRB sequence number is 7 on the target frequency band, and the fifth RB in the RBG 2 is an RB whose CRB sequence number is 2 on the target frequency band. In this case, the third RB that is on the first frequency band and corresponds to the RB whose CRB sequence number is 2 (that is, the fifth RB in the RBG 2) on the target frequency band is an RB whose CRB sequence number is 9. The fourth RB that is on the second frequency band and corresponds to the RB whose CRB sequence number is 2 (that is, the fifth RB in the RBG 2) on the target frequency band is an RB whose CRB sequence number is 21, as shown in FIG. 8(*a*).

It should be noted that the third RB and the fourth RB still meet the following relationship: there is also the first CRB deviation between the third RB and the fourth RB. FIG. 8(*a*) is still used as an example. The third RB is an RB whose CRB sequence number is 9 on the first frequency band, and the fourth RB is an RB whose CRB sequence number is 21 on the second frequency band. In this case, the first CRB deviation between the third RB and the fourth RB is 12. The third RB is an RB whose CRB sequence number is 14 on the first frequency band, and the fourth RB is an RB whose CRB sequence number is 26 on the second frequency band. In this case, the first CRB deviation between the third RB and the fourth RB is also 12.

In this way, when the first scheduling information further indicates, by using the RBG 2, a resource block used for data transmission on the target frequency band, the terminal device can also determine one RB (that is, the third RB) on the first frequency band and one RB (that is, the fourth RB) on the second frequency band based on the RBG 2, to schedule the RBs on the two frequency bands.

S206a: The terminal device performs data transmission with the network device on a same symbol by using the third RB on the first frequency band and the fourth RB on the second frequency band.

The same symbol means that a symbol in S206a is the same as a symbol in S204a. For example, if the terminal device performs data transmission on a symbol 0 by using the first RB on the first frequency band and the second RB on the second frequency band in S204a, the terminal device still performs data transmission on the symbol 0 by using the third RB on the first frequency band and the fourth RB on the second frequency band in S206a.

In this way, the terminal device may simultaneously perform data transmission with the network device by using a plurality of RBs on the first frequency band and a plurality of RBs on the second frequency band, to improve data transmission efficiency. Herein, a quantity of RBs used for data transmission on the first frequency band is the same as a quantity of RBs used for data transmission on the second frequency band.

In some embodiments, the first scheduling information further includes a sequence number of a VRB 3 on the target frequency band. Correspondingly, after the terminal device performs S202, there are at least the following two possible cases:

Case 1: Refer to FIG. 10(*a*), after performing S202, the terminal device further performs S207a and S208a.

S207a: The terminal device determines, based on the sequence number of the VRB 3, a sixth RB that is on the first frequency band and corresponds to the VRB 3 and that no RB on the second frequency band corresponds to the second VRB.

For example, refer to FIG. 8(*a*), in a scenario shown in FIG. 8(*a*), the first CRB deviation is 12. If the sixth RB that is on the first frequency band and corresponds to the VRB 3 is an RB whose CRB sequence number is 8 on the first frequency band, the first CRB deviation is met between an RB whose CRB sequence number is 20 and an RB whose CRB sequence number is 8, but the RB whose CRB sequence number is 20 does not belong to the second frequency band. In other words, there is no RB that is on the second frequency band and that meets the first CRB deviation between the RB and the sixth RB. Therefore, there is no RB that is on the second frequency band and corresponds to the VRB 3.

S208a: The terminal device performs data transmission with the network device on the same symbol by using the sixth RB.

The same symbol means that a symbol in S208a is the same as a symbol in S204a. For example, if the terminal device performs data transmission on a symbol 0 by using the first RB on the first frequency band and the second RB on the second frequency band in S204a, the terminal device still performs data transmission on the symbol 0 by using the sixth RB on the first frequency band in S208a.

In other words, when both the RB on the first frequency band and the RB on the second frequency band are scheduled by using the first scheduling information, for RBs that form the target frequency band on the first frequency band, there may be a phenomenon that an RB that meets the first CRB deviation between the RB and a specific RB (for example, the sixth RB) does not belong to the second frequency band. If the sequence number of the VRB 3 indicates to perform data transmission by using the RB that has the foregoing phenomenon, the terminal device performs data transmission with the network device only by using the RB on the first frequency band, to ensure data transmission efficiency.

Case 2: Refer to FIG. 11(*a*), after performing S202, the terminal device further performs S209a and S210a.

S209a: The terminal device determines, based on the sequence number of the VRB 3, that no RB on the first frequency band corresponds to the VRB 3, and determines a seventh RB that is on the second frequency band and corresponds to the second VRB.

For example, the scenario shown in FIG. 8(*a*) is still used as an example. If the seventh RB that is on the first frequency band and corresponds to the VRB 3 is an RB whose CRB sequence number is 27 on the second frequency band, the first CRB deviation between an RB whose CRB sequence number is 15 and an RB whose CRB sequence number is 27 is met, but the RB whose CRB sequence number is 15 does not belong to the second frequency band. In other words, there is no RB that is on the first frequency band and meets the first CRB deviation between the RB and the seventh RB. Therefore, there is no RB that is on the first frequency band and corresponds to the VRB 3.

S210a: The terminal device performs data transmission with the network device on the same symbol by using the seventh RB.

The same symbol means that a symbol in S210a is the same as a symbol in S204a. For example, if the terminal device performs data transmission on a symbol 0 by using the first RB on the first frequency band and the second RB on the second frequency band in S204a, the terminal device still performs data transmission on the symbol 0 by using the seventh RB on the first frequency band in S210a.

In other words, when both the RB on the first frequency band and the RB on the second frequency band are scheduled by using the first scheduling information, for RBs that form the target frequency band on the second frequency band, there may be a phenomenon that an RB that meets the first CRB deviation between the RB and a specific RB (for example, the seventh RB) does not belong to the first frequency band. If the sequence number of the VRB 3 indicates to perform data transmission by using the RB that has the foregoing phenomenon, the terminal device performs data transmission with the network device by using the RB on the second frequency band, to ensure data transmission efficiency.

In some embodiments, the first scheduling information further includes a sequence number of an RBG 3 on the target frequency band. Correspondingly, after the terminal device performs S202, there are at least the following two possible cases:

Case 1: Refer to FIG. 12(*a*), after performing S202, terminal device further performs S211a and S212a.

S211a: The terminal device determines, based on the sequence number of the RBG 3, a ninth RB that is on the first frequency band and corresponds to an eighth RB in the RBG 3, and that no RB on the second frequency band corresponds to the eighth RB in the RBG 3.

For example, refer to FIG. 8(*a*), if the ninth RB is an RB whose CRB sequence number is 8 on the first frequency band, because there is no RB meeting the first CRB deviation between the RB and the ninth RB on the second frequency band, there is no RB that is on the second frequency band and corresponds to the eighth RB in the RBG 3.

S212*a*: The terminal device performs data transmission with the network device on the same symbol by using the ninth RB.

The same symbol means that a symbol in S212*a* is the same as a symbol in S204*a*. For example, if the terminal device performs data transmission on a symbol 0 by using the first RB on the first frequency band and the second RB on the second frequency band in S204*a*, the terminal device still performs data transmission on the symbol 0 by using the ninth RB on the first frequency band in S212*a*.

In other words, for RBs that form the target frequency band on the first frequency band, there may be a phenomenon that an RB that meets the first CRB deviation between the RB and a specific RB (for example, the ninth RB) does not belong to the second frequency band. If the RB in the RBG indicates to perform data transmission by using the RB that has the foregoing phenomenon, the terminal device performs data transmission with the network device by using the RB on the first frequency band, to ensure data transmission efficiency.

Case 2: Refer to FIG. 13(*a*), after performing S202, the terminal device further performs S213*a* and S214*a*.

S213*a*: The terminal device determines, based on the sequence number of the RBG 3, that no RB on the first frequency band corresponds to an eighth RB in the RBG 3, and determines a tenth RB that is on the second frequency band and corresponds to the eighth RB in the RBG 3.

For example, the scenario shown in FIG. 8(*a*) is still used as an example. If the tenth RB is an RB whose CRB sequence number is 27 on the second frequency band, because there is no RB meeting the first CRB deviation between the RB and the tenth RB on the first frequency band, there is no RB that is on the first frequency band and corresponds to the eighth RB in the RBG 3.

S214*a*: The terminal device performs data transmission with the network device on the same symbol by using the tenth RB.

The same symbol means that a symbol in S214*a* is the same as a symbol in S204*a*. For example, if the terminal device performs data transmission on a symbol 0 by using the first RB on the first frequency band and the second RB on the second frequency band in S204*a*, the terminal device still performs data transmission on the symbol 0 by using the tenth RB on the first frequency band in S214*a*.

In other words, for RBs that form the target frequency band on the second frequency band, there may be a phenomenon that an RB that meets the first CRB deviation between the RB and a specific RB (for example, the tenth RB) does not belong to the first frequency band. If the RB in the RBG 3 indicates to perform data transmission by using the RB that has the foregoing phenomenon, the terminal device performs data transmission with the network device only by using the RB on the second frequency band, to ensure data transmission efficiency.

In some embodiments, if a precoding granularity of a data transmission resource scheduled by using the first scheduling information is a wideband, same precoding is used for data transmitted on a plurality of RBs on the first frequency band, and same precoding is used for data transmitted on a plurality of RBs on the second frequency band. Both the plurality of RBs on the first frequency band and the plurality of RBs on the second frequency band are frequency bands formed by contiguous PRBs, and precoding used on the plurality RBs on the first frequency band is the same as or different from precoding used on the plurality RBs on the second frequency band. Herein, "the contiguous PRBs" refer to PRBs with consecutive CRB sequence numbers.

Herein, for the terminal device, precoding means that when the terminal device learns of channel state information (CSI), the terminal device processes to-be-transmitted data by using a precoding matrix, so that the to-be-transmitted data matches a channel status.

For example, the scenario in FIG. 8(*a*) is used as an example. When the first scheduling information indicates that RBs whose CRB sequence numbers are 2 to 7 on the target frequency band are used for data transmission, RBs used for data transmission on the first frequency band are RBs whose CRB sequence numbers are 9 to 14, that is, "the plurality of RBs on the first frequency band". RBs used for data transmission on the second frequency band are RBs whose CRB sequence numbers are 21 to 27, that is, "the plurality of RBs on the second frequency band". A precoding matrix used on the RBs whose CRB sequence numbers are 9 to 14 may be denoted as W1, and a precoding matrix used on the RBs whose CRB sequence numbers are 21 to 27 may be denoted as W2. W1 and W2 may be a same precoding matrix, or may be different precoding matrices.

In this way, if the RB on the first frequency band and the RB on the second frequency band are scheduled by using one piece of first scheduling information, same precoding or different precoding may be used for data transmission on the two frequency bands, so that the to-be-transmitted data can match the channel status, thereby ensuring effective data transmission.

Figure 9A:
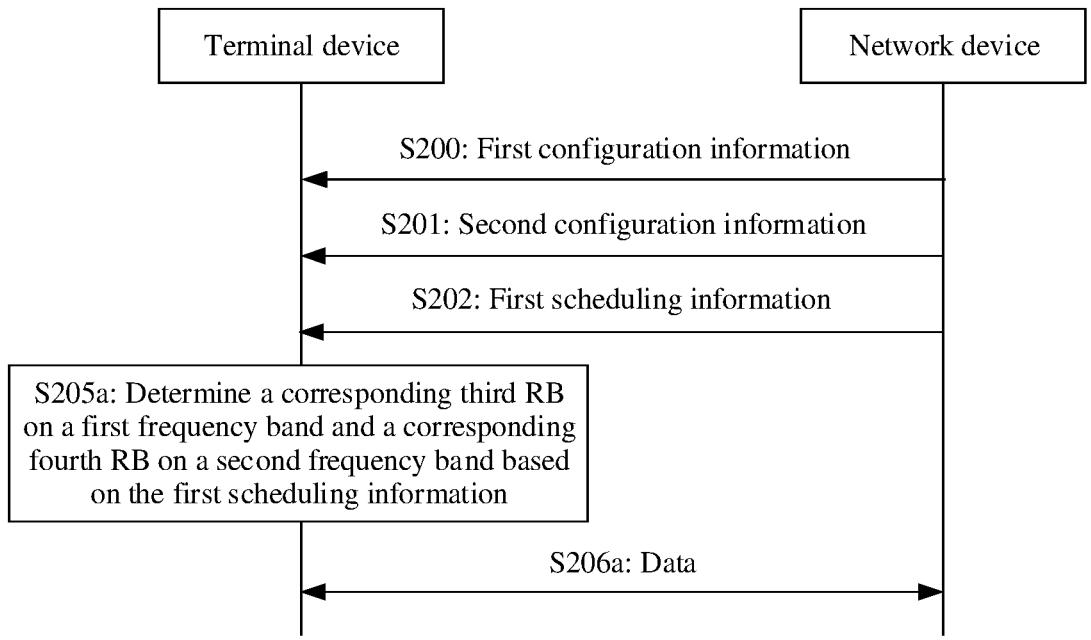
FIG. 9(a) is a schematic flowchart of still another communication method according to an embodiment of the present disclosure.
Figure 9B:
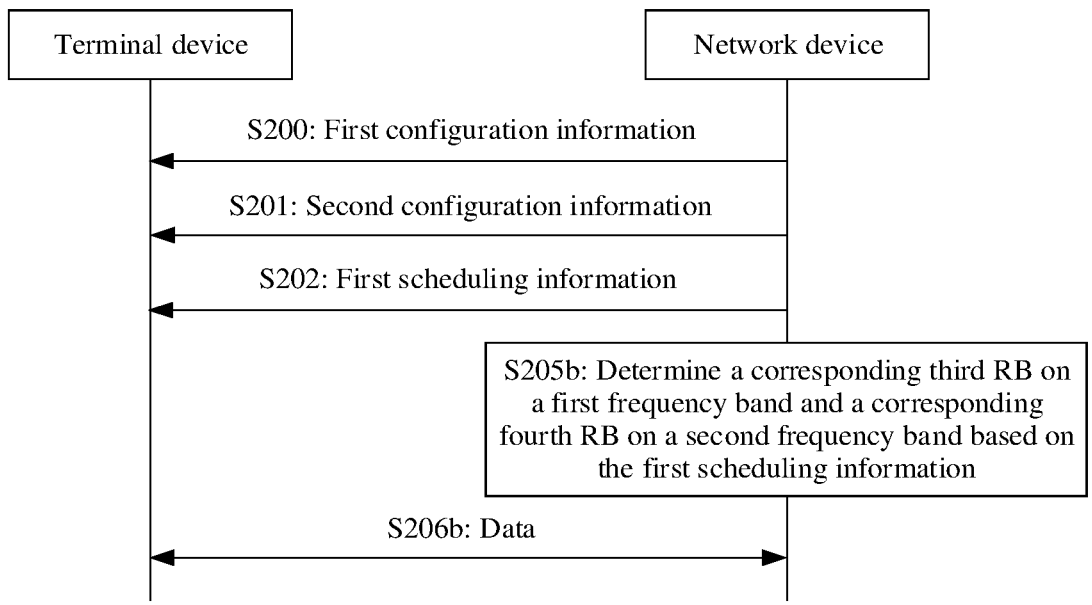
FIG. 9(b) is a schematic flowchart of still another communication method according to an embodiment of the present disclosure.

It should be noted that when the RB on the first frequency band and the RB on the second frequency band are scheduled by using one piece of first scheduling information, if the terminal device sends data to the network device by using the RB indicated by the first scheduling information, corresponding procedures of the methods described in FIG. 2(*a*), FIG. 9(*a*), FIG. 10(*a*), FIG. 11(*a*), FIG. 12(*a*), or FIG. 13(*a*) are used.

If the network device sends data to the terminal device by using the RB indicated by the first scheduling information, refer to FIG. 2(*b*), the communication method in this embodiment includes S200, S201, S202, S203*b*, and S204*b*. S203*b* and S204*b* are specifically described as follows:

S203*b*: The network device determines, based on the first scheduling information, a corresponding first RB on the first frequency band and a corresponding second RB on the second frequency band.

For related descriptions of the first scheduling information, the first frequency band, the first RB, the second frequency band, and the second RB, refer to related descriptions in S203*a*. Details are not described herein again.

S204*b*: The network device performs data transmission with the terminal device on a same symbol by using the first RB on the first frequency band and the second RB on the second frequency band.

For a specific implementation process of S204*b*, refer to related descriptions in S204*a*. Details are not described herein again.

In addition, in another possible implementation, after performing S201, the network device may further first determine the first scheduling information based on the first RB on the first frequency band and the second RB on the second frequency band, and then perform S202. In this case, the network device does not need to perform S203*b*.

In some embodiments, when the network device sends the data to the terminal device by using the RB indicated by the first scheduling information, further, if a plurality of RBs on the first frequency band and a plurality of RBs on the second frequency band are all used for data transmission, refer to FIG. 9(*b*), the communication method in this embodiment further includes S205*b* and S206*b*.

S205*b*: The network device determines, based on the first scheduling information, a corresponding third RB on the first frequency band and a corresponding fourth RB on the second frequency band.

For related descriptions of the first scheduling information, the third RB, and the fourth RB, refer to related descriptions in S205*a*. Details are not described herein again.

S206*b*: The network device performs data transmission with the terminal device on a same symbol by using the third RB on the first frequency band and the fourth RB on the second frequency band.

For a specific implementation process of S206*b*, refer to related descriptions in S206*a*. Details are not described herein again.

In addition, in another possible implementation, after performing S201, the network device first determines the first scheduling information based on the third RB on the first frequency band and the fourth RB on the second frequency band, and then performs S202. In this case, the network device does not need to perform S205*b*.

In some embodiments, when the network device sends the data to the terminal device by using the RB indicated by the first scheduling information, further, if there is no RB that is on the second frequency band and corresponds to a specific RB (for example, the sixth RB) on the first frequency band, and a target RB is indicated by using a sequence number of a VRB, refer to FIG. 10(*b*), the communication method in this embodiment further includes S207*b* and S208*b*.

S207*b*: The network device determines, based on the sequence number of the VRB 3, a sixth RB that is on the first frequency band and corresponds to the VRB 3, and that no RB on the second frequency band corresponds to the second VRB.

For related descriptions of the sequence number of the VRB 3 and the sixth RB, refer to related descriptions in S207*a*. Details are not described herein again.

S208*b*: The network device performs data transmission with the terminal device on the same symbol by using the sixth RB.

For a specific implementation process of S208*b*, refer to related descriptions in S208*a*. Details are not described herein again.

In addition, in another possible implementation, after performing S201, the network device may first determine the sequence number of the VBR3 in the first scheduling information based on the information of "no RB on the second frequency band corresponds to the sixth RB", and then perform S202. In this case, the network device does not need to perform S207*b*.

In some embodiments, when the network device sends the data to the terminal device by using the RB indicated by the first scheduling information, further, if there is no RB that is on the first frequency band and corresponds to a specific RB (for example, the seventh RB) on the second frequency band, and a target RB is indicated by using a sequence number of a VRB, refer to FIG. 11(*b*), the communication method in this embodiment further includes S209*b* and S210*b*.

S209*b*: The network device determines, based on the sequence number of the VRB 3, that no RB on the first frequency band corresponds to the VRB 3 and determines a seventh RB that is on the second frequency band and corresponds to the second VRB.

For related descriptions of the sequence number of the VRB 3 and the seventh RB, refer to related descriptions in S209*a*. Details are not described herein again.

S210*b*: The network device performs data transmission with the terminal device on the same symbol by using the seventh RB.

For a specific implementation process of S210*b*, refer to related descriptions in S210*a*. Details are not described herein again.

In addition, in another possible implementation, after performing S201, the network device may first determine the sequence number of the VBR 3 in the first scheduling information based on the information of "no RB on the first frequency band corresponds to the seventh RB", and then perform S202. In this case, the network device does not need to perform S209*b*.

In some embodiments, when the network device sends the data to the terminal device by using the RB indicated by the first scheduling information, further, if there is no RB that is on the second frequency band and corresponds to a specific RB (for example, the ninth RB) on the first frequency band, and a target RB is indicated by using a sequence number of an RBG, refer to FIG. 12(*b*), the communication method in this embodiment further includes S211*b* and S212*b*.

S211*b*: The network device determines, based on the sequence number of the RBG 3, a ninth RB that is on the first frequency band and corresponds to an eighth RB in the RBG 3, and that no RB on the second frequency band corresponds to the eighth RB in the RBG 3.

For related descriptions of the sequence number of the RBG 3, the eighth RB, and the ninth RB, refer to related descriptions in S211*a*. Details are not described herein again.

S212*b*: The network device performs data transmission with the terminal device on the same symbol by using the ninth RB.

For a specific implementation process of S212*b*, refer to related descriptions in S212*a*. Details are not described herein again.

In addition, in another possible implementation, after performing S201, the network device may first determine the sequence number of the RBG 3 in the first scheduling information based on the information of "no RB on the second frequency band corresponds to the ninth RB", and then perform S202. In this case, the network device does not need to perform S211*b*.

In some embodiments, when the network device sends the data to the terminal device by using the RB indicated by the first scheduling information, further, if there is no RB that is on the first frequency band and corresponds to a specific RB (for example, the tenth RB) on the second frequency band, and a target RB is indicated by using a sequence number of an RBG, refer to FIG. 13(*b*), the communication method in this embodiment further includes S213*b* and S214*b*.

S213*b*: The network device determines, based on the sequence number of the RBG 3, that no RB on the first frequency band corresponds to an eighth RB in the RBG 3, and determines a tenth RB that is on the second frequency band and corresponds to the eighth RB in the RBG 3.

For related descriptions of the sequence number of the RBG 3, the eighth RB, and the tenth RB, refer to related descriptions in S213a. Details are not described herein again.

S214b: The network device performs data transmission with the terminal device on the same symbol by using the tenth RB.

For a specific implementation process of S214b, refer to related descriptions in S214a. Details are not described herein again.

In addition, in another possible implementation, after performing S201, the network device may first determine the sequence number of the RBG 3 in the first scheduling information based on the information of "no RB on the first frequency band corresponds to the tenth RB", and then perform S202. In this case, the network device does not need to perform S213b.

Figure 14A:
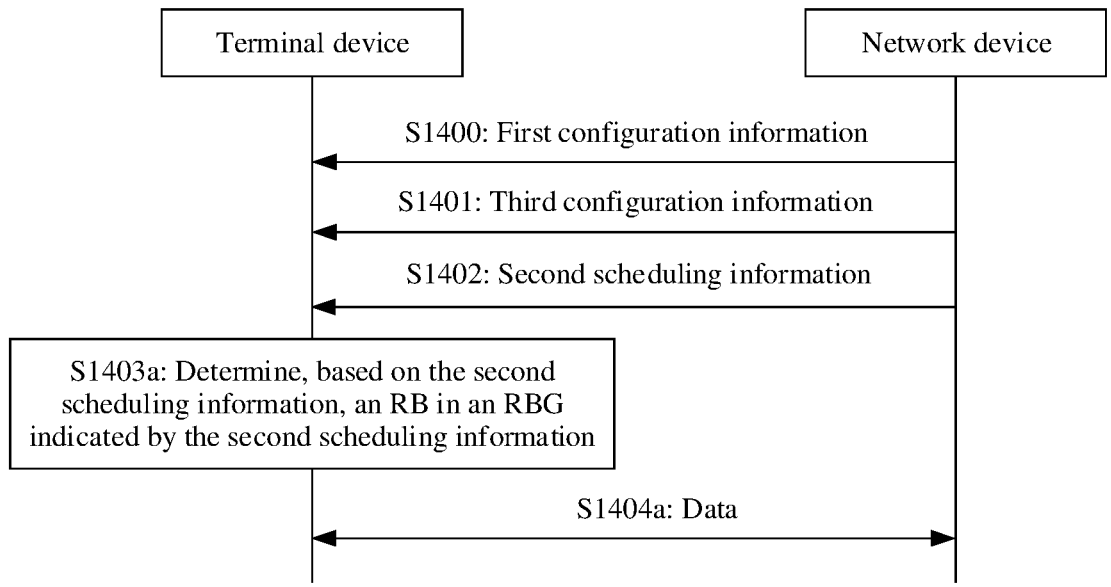
FIG. 14(a) is a schematic flowchart of still another communication method according to an embodiment of the present disclosure.

The foregoing descriptions are related to "parallel" scheduling of the RBs on the two frequency bands. To be specific, when the first scheduling information indicates that the target RB is an RB on the first frequency band, the terminal device still needs to determine an RB, on the second frequency band, used for data transmission. Alternatively, when the first scheduling information indicates that the target RB is an RB on the second frequency band, the terminal device still needs to determine an RB, on the first frequency band, used for data transmission. In an actual application process, the RB on the first frequency band and the RB on the second frequency band may also be scheduled in a "serial" manner. Refer to FIG. 14(a). The communication method in this embodiment includes the following steps.

S1400: A network device sends first configuration information to a terminal device. Accordingly, the terminal device receives the first configuration information from the network device.

For a specific implementation process of S1400, refer to related descriptions in S200. Details are not described herein again.

S1401: The network device sends third configuration information to the terminal device. Accordingly, the terminal device receives the third configuration information from the network device.

The third configuration information is used to configure an association relationship between a target frequency band and the first frequency band and an association relationship between the target frequency band and the second frequency band. The target frequency band includes at least three RBGs, and the second RBG in the three RBGs includes a first RB and a second RB. The first RB belongs to the first frequency band, and is a contiguous PRB with an RB in the first RBG of the three RBGs. The second RB belongs to the second frequency band, and is a contiguous PRB with an RB in the last RBG of the three RBGs.

Figure 15:
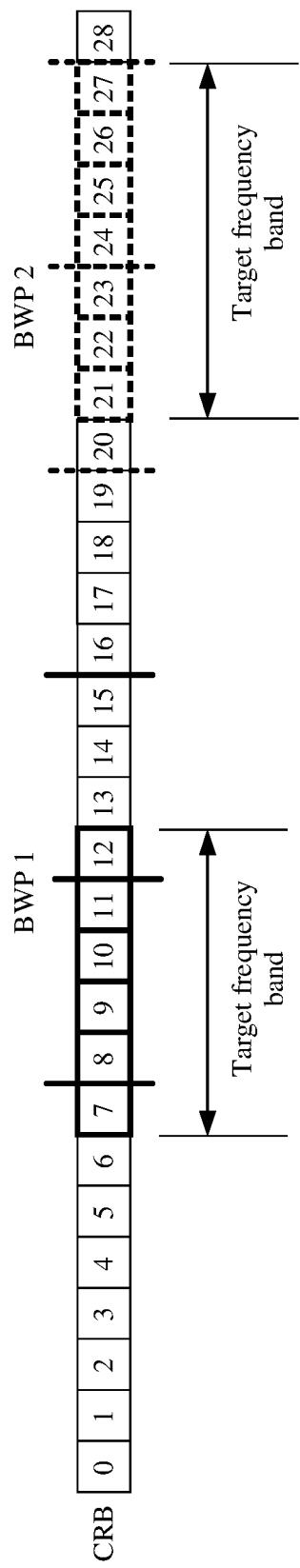
FIG. 15 is still another schematic diagram of resource block distribution according to an embodiment of the present disclosure.

For example, as shown in FIG. 15, the first frequency band and the second frequency band are two frequency bands on a same component carrier. The first frequency band is denoted as a BWP 1, and sequence numbers of corresponding CRBs are 7 to 12, as shown by bold line blocks in FIG. 15. The second frequency band is denoted as a BWP 2, and sequence numbers of corresponding CRBs are 21 to 27, as shown by dashed-line blocks in FIG. 15. Both a nominal RBG size of the first frequency band and a nominal RBG size of the second frequency band are 4. A bandwidth of the target frequency band is 13 RBs (a sum of a bandwidth of the first frequency band and a bandwidth of the second frequency band). The terminal device determines a nominal RBG size of the target frequency band by querying Table 2. When a configuration of the target frequency band is the configuration 2, the nominal RBG size of the target frequency band is 4. In this case, an RBG distribution status of the target frequency band is as follows: The target frequency band includes five RBGs. The first RBG includes one RB, that is, an RB whose CRB sequence number is 7. The second RBG includes four RBs, that is, RBs whose CRB sequence numbers are 8 to 11. The third RBG includes one RB, that is, an RB whose CRB sequence number is 12. The fourth RBG includes three RBs, that is, RBs whose CRB sequence numbers are 21 to 23. The fifth RBG includes four RBs, that is, RBs whose CRB sequence numbers are 24 to 27. Details are shown in FIG. 15. Herein, when neither the third RBG nor the fourth RBG has four RBs, if a sum of a quantity of RBs in the third RBG and a quantity of RBs in the fourth RBG is the nominal RBG size of the target frequency band, the third RBG and the fourth RBG are combined into one RBG. In this case, the RBG distribution status of the target frequency band is as follows: The target frequency band includes four RBGs. Distribution statuses of the first RBG and the second RBG remain unchanged. The third RBG includes four RBs, that is, RBs whose CRB sequence numbers are 12 and 21 to 23. The fourth RBG includes four RBs, that is, RBs whose CRB sequence numbers are 24 to 27.

Figure 16:
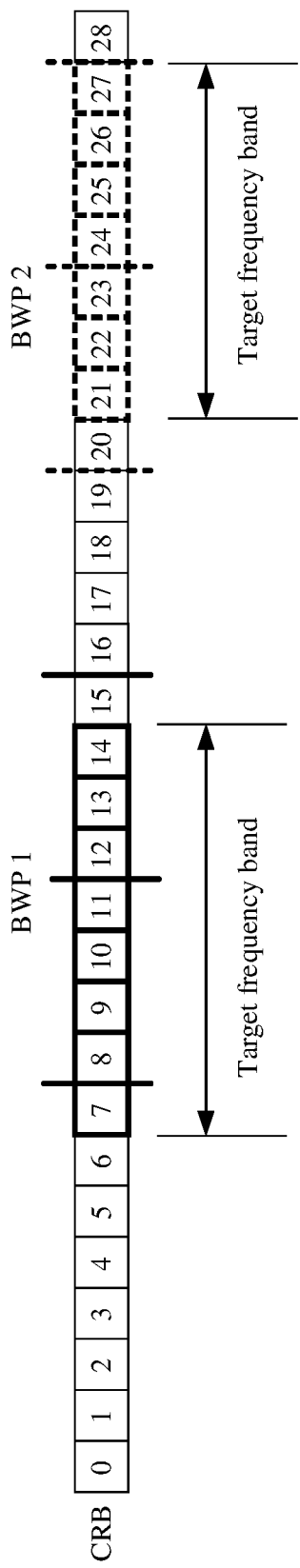
FIG. 16 is still another schematic diagram of resource block distribution according to an embodiment of the present disclosure.

For example, refer to FIG. 16. FIG. 16 still uses an example in which the first frequency band and the second frequency band are two frequency bands on a same component carrier. When the nominal RBG size of the target frequency band is 4, the RBG distribution status of the target frequency band is as follows: The target frequency band includes five RBGs. The first RBG includes one RB, that is, an RB whose CRB sequence number is 7. The second RBG includes four RBs, that is, RBs whose CRB sequence numbers are 8 to 11. The third RBG includes three RBs, that is, RBs whose CRB sequence numbers are 12 to 14. The fourth RBG includes three RBs, that is, RBs whose CRB sequence numbers are 21 to 23. The fifth RBG includes four RBs, that is, RBs whose CRB sequence numbers are 24 to 27. Details are shown in FIG. 16. In this case, if a sum of a quantity of RBs in the third RBG and a quantity of RBs in the fourth RBG is unequal to the nominal RBG size of the target frequency band, the third RBG and the fourth RBG are not combined into one RBG. In other words, the first frequency band and the second frequency band cannot constitute the target frequency band, and there is no association relationship between the target frequency band and the first frequency band and between the target frequency band and the second frequency band.

S1402: The network device sends second scheduling information to the terminal device. Accordingly, the terminal device receives the second scheduling information from the network device.

The second scheduling information indicates an RBG on the target frequency band.

For example, the second scheduling information includes a plurality of bits. A bit location of one bit corresponds to one RBG, and different bits correspond to different RBGs. When a specific bit state is "1", it indicates that an RBG corresponding to the bit is used for data transmission. On the contrary, when a specific bit state is "0", it indicates that an RBG corresponding to the bit is not used for data transmission. Alternatively, when a specific bit state is "0", it indicates that an RBG corresponding to the bit is used for data transmission. On the contrary, when a specific bit state is "1", it indicates that an RBG corresponding to the bit is not used for data transmission.

S1403a: The terminal device determines, based on the second scheduling information, an RB in the RBG indicated by the second scheduling information.

For example, a scenario shown in FIG. 15 is still used as an example. Value statuses of bits corresponding to four RBGs shown in FIG. 15 are "0010". If a bit status "1" represents that an RBG corresponding to the bit is used for data transmission, none of the first RBG (an RB whose CRB sequence number is 7), the second RBG (RBs whose CRB sequence numbers are 8 to 11), and the fourth RBG (RBs whose CRB sequence numbers are 24 to 27) is used for data transmission, the third RBG (RBs whose CRB sequence numbers are 21 to 23) is used for data transmission.

S1404a: The terminal device performs data transmission with the network device on a same symbol by using the RB in the RBG indicated by the second scheduling information.

The same symbol may be one symbol, or may be a plurality of symbols.

For example, a time domain resource used when the terminal device performs data transmission with the network device is one symbol, and a frequency domain resource is the RB in the RBG indicated by the second scheduling information.

According to the communication method provided in this embodiment, when at least the first frequency band and the second frequency band are configured for the terminal device, the first RB on the first frequency band and the second RB on the second frequency band can form one RBG. The network device sends the second scheduling information to the terminal device. When the second scheduling information indicates, by using the RBG, the RB used for data transmission, the second scheduling information can also schedule the RBG including the first RB and the second RB. The terminal device performs data transmission with the network device on the same symbol by using the RB indicated by the second scheduling information, so that one piece of first scheduling information can be used for scheduling transmission resources on at least two frequency bands, thereby reducing control resource overheads. Because the RBG including the first RB and the second RB can also be scheduled, that is, an RB at an edge of a frequency band can also be used for data transmission, thereby improving transmission resource utilization.

It should be noted that when the RB on the first frequency band and the RB on the second frequency band are scheduled by using one piece of second scheduling information, if the terminal device sends data to the network device by using the RB indicated by the second scheduling information, a corresponding procedure of the method described in FIG. 14(a) is used. If the network device sends data to the terminal device by using the RB indicated by the second scheduling information, refer to FIG. 14(b), the communication method in this embodiment includes S1400, S1401, S1402, S1403b, and S1404b. S1403b and S1404b are specifically described as follows:

S1403b: The network device determines, based on the second scheduling information, an RB in the RBG indicated by the second scheduling information.

For related descriptions of the second scheduling information and the RBG, refer to related descriptions in S1403a. Details are not described herein again.

S1404b: The network device performs data transmission with the terminal device on a same symbol by using the RB in the RBG indicated by the second scheduling information.

For a specific implementation process of S1404b, refer to related descriptions in S1404a. Details are not described herein again.

In addition, in another possible implementation, after performing S1401, the network device may first determine the second scheduling information based on "a distribution status of the RBG on the first frequency band and a distribution status of the RBG on the second frequency band", and then perform S1402. In this case, the network device does not need to perform S14031b.

Figure 17:
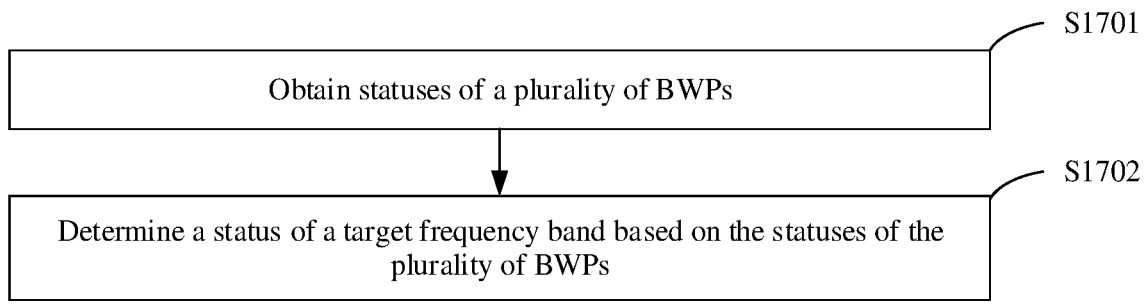
FIG. 17 is a schematic flowchart of still another communication method according to an embodiment of the present disclosure.

The foregoing is a specific description of "one piece of scheduling information schedules transmission resources on at least two frequency bands". In this scenario, when the at least two frequency bands are BWPs, a BWP switching process can be further described in the communication method in this embodiment. The communication method in this embodiment is performed by the network device or the terminal device. Refer to FIG. 17. The communication method in this embodiment includes the following steps.

S1701: Obtain statuses of a plurality of BWPs.

The plurality of BWPs are BWPs configured by a network device for a terminal device. A status of the BWP may be that the BWP is in an active state or an inactive state.

For example, the plurality of BWPs includes two BWPs on a component carrier 1, which are respectively denoted as a BWP 11 and a BWP 12. The plurality of BWPs further includes two BWPs on a component carrier 2, which are respectively denoted as a BWP 21 and a BWP 22. In this scenario, statuses of the plurality of BWPs include the following four examples:

Example 1: An active BWP on the component carrier 1 is the BWP 11, and an active BWP on the component carrier 2 is the BWP 21.

Example 2: An active BWP on the component carrier 1 is the BWP 11, and an active BWP on the component carrier 2 is the BWP 22.

Example 3: An active BWP on the component carrier 1 is the BWP 12, and an active BWP on the component carrier 2 is the BWP 21.

Example 4: An active BWP on the component carrier 1 is the BWP 12, and an active BWP on the component carrier 2 is the BWP 22.

S1702: The network device determines a status of a target frequency band based on the statuses of the plurality of BWPs.

The target frequency band is also a BWP. The target frequency band indicates a frequency domain resource that can be used for data transmission, and the target frequency band has an association relationship with the plurality of BWPs. Herein, for "an association relationship between the target frequency band and the plurality of BWPs", refer to related descriptions in S201. Details are not described herein again. The association relationship between the target frequency band and the plurality of BWPs is indicated by second configuration information, and the second configuration information is transmitted by the network device to the terminal device. Alternatively, for "an association relationship between the target frequency band and the plurality of BWPs", refer to related descriptions in S1401. Details are not described herein again. The association relationship between the target frequency band and the plurality of BWPs is indicated by third configuration information, and the third configuration information is transmitted by the network device to the terminal device.

Herein, there is the association relationship between the target frequency band and the plurality of BWPs. If the plurality of BWPs is all in the active state, the target frequency band that has the association relationship with the plurality of BWPs is in the active state. Alternatively, if at least one of the plurality of BWPs is in the inactive state, the target frequency band that has the association relationship with the plurality of BWPs is in the inactive state.

For example, the plurality of BWPs is still the BWP 11, the BWP 12, the BWP 21, and the BWP 22, and target frequency bands are respectively denoted as a BWP 31, a BWP 32, a BWP 33, and a BWP 34. There is an association relationship between the BWP 31 and two BWPs (that is, the BWP 11 and the BWP 21). There is an association relationship between the BWP 32 and two BWPs (that is, the BWP 11 and the BWP 22). There is an association relationship between the BWP 33 and two BWPs (that is, the BWP 12 and the BWP 21). There is an association relationship between the BWP 34 and two BWPs (that is, the BWP 12 and the BWP 22).

In a case of Example 1, because there is the association relationship between the BWP 31 and the two BWPs (that is, the BWP 11 and the BWP 21), and both the BWP 11 and the BWP 21 are active BWPs, the BWP 31 is also an active BWP. Because there is the association relationship between the BWP 32 and the two BWPs (that is, the BWP 11 and the BWP 22), the BWP 11 is an active BWP, and the BWP 22 is an inactive BWP, the BWP 32 is an inactive BWP. Because there is the association relationship between the BWP 33 and the two BWPs (that is, the BWP 12 and the BWP 21), the BWP 12 is an inactive BWP, and the BWP 21 is an active BWP, the BWP 33 is an inactive BWP. Because there is the association relationship between the BWP 34 and the two BWPs (that is, the BWP 12 and the BWP 22), and both the BWP 12 and the BWP 22 are inactive BWPs, the BWP 34 is an inactive BWP.

In a case of Example 2, because there is the association relationship between the BWP 31 and the two BWPs (that is, the BWP 11 and the BWP 21), the BWP 11 is an active BWP, and the BWP 21 is an inactive BWP, the BWP 31 is an inactive BWP. Because there is the association relationship between the BWP 32 and the two BWPs (that is, the BWP 11 and the BWP 22), and both the BWP 11 and the BWP 22 are active BWPs, the BWP 32 is an active BWP. Because there is the association relationship between the BWP 33 and the two BWPs (that is, the BWP 12 and the BWP 21), and both the BWP 12 and the BWP 21 are inactive BWPs, the BWP 33 is an inactive BWP. Because there is the association relationship between the BWP 34 and the two BWPs (that is, the BWP 12 and the BWP 22), the BWP 12 is an inactive BWP, and the BWP 22 is an active BWP, the BWP 34 is an inactive BWP.

In a case of Example 3, because there is the association relationship between the BWP 31 and the two BWPs (that is, the BWP 11 and the BWP 21), the BWP 11 is an inactive BWP, and the BWP 21 is an active BWP, the BWP 31 is an inactive BWP. Because there is the association relationship between the BWP 32 and the two BWPs (that is, the BWP 11 and the BWP 22), and both the BWP 11 and the BWP 22 are inactive BWPs, the BWP 32 is an inactive BWP. Because there is the association relationship between the BWP 33 and the two BWPs (that is, the BWP 12 and the BWP 21), and both the BWP 12 and the BWP 21 are active BWPs, the BWP 33 is an active BWP. Because there is the association relationship between the BWP 34 and the two BWPs (that is, the BWP 12 and the BWP 22), the BWP 12 is an active BWP, and the BWP 22 is an inactive BWP, the BWP 34 is an inactive BWP.

In a case of Example 4, because there is the association relationship between the BWP 31 and the two BWPs (that is, the BWP 11 and the BWP 21), and both the BWP 11 and the BWP 21 are inactive BWPs, the BWP 31 is also an inactive BWP. Because there is the association relationship between the BWP 32 and the two BWPs (that is, the BWP 11 and the BWP 22), the BWP 11 is an inactive BWP, and the BWP 22 is an active BWP, the BWP 32 is an inactive BWP. Because there is the association relationship between the BWP 33 and the two BWPs (that is, the BWP 12 and the BWP 21), the BWP 12 is an active BWP, and the BWP 21 is an inactive BWP, the BWP 33 is an inactive BWP. Because there is the association relationship between the BWP 34 and the two BWPs (that is, the BWP 12 and the BWP 22), and both the BWP 12 and the BWP 22 are active BWPs, the BWP 34 is an active BWP.

According to the communication method provided in this embodiment, when the target frequency band has the association relationship with the plurality of BWPs, the status of the target frequency band may be used to determine based on statuses of the plurality of BWPs. In this way, when the statuses of the plurality of BWPs are switched, the network device or the terminal device can still determine the status of the target frequency band, and a corresponding switching instruction does not need to be transmitted to indicate the status of the target frequency band, thereby reducing switching signaling overheads.

Figure 18:
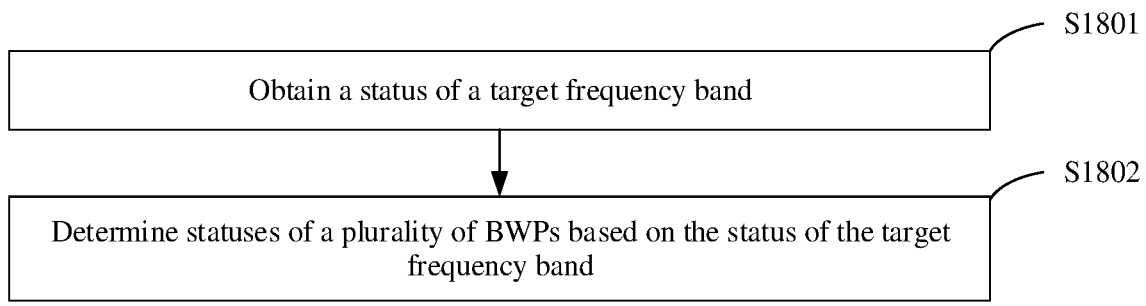
FIG. 18 is a schematic flowchart of still another communication method according to an embodiment of the present disclosure.

Refer to FIG. 18. An embodiment of the present disclosure further provides another communication method. The method is performed by a network device or a terminal device. The method includes the following steps.

S1801: Obtain a status of a target frequency band.

The target frequency band is a BWP. The target frequency band indicates a frequency domain resource that can be used for data transmission, and the target frequency band has an association relationship with a plurality of BWPs. The plurality of BWPs are BWPs configured by the network device for the terminal device. The association relationship between the target frequency band and the plurality of BWPs is indicated by second configuration information, and the second configuration information is transmitted by the network device to the terminal device. For details, refer to related descriptions in S201. Details are not described herein again. Alternatively, the association relationship between the target frequency band and the plurality of BWPs is indicated by third configuration information, and the third configuration information is transmitted by the network device to the terminal device. For details, refer to related descriptions in S1401. Details are not described herein again.

For example, the target frequency bands are respectively denoted as a BWP 31, a BWP 32, a BWP 33, and a BWP 34. There is an association relationship between the BWP 31 and two BWPs (that is, a BWP 11 and a BWP 21). There is an association relationship between the BWP 32 and two BWPs (that is, a BWP 11 and a BWP 22). There is an association relationship between the BWP 33 and two BWPs (that is, a BWP 12 and a BWP 21). There is an association relationship between the BWP 34 and two BWPs (that is, a BWP 12 and a BWP 22). The BWP 11 and the BWP 12 are two BWPs on a component carrier 1, and the BWP 21 and the BWP 22 are two BWPs on a component carrier 2.

In this scenario, the status of the target frequency band includes the following four examples:

Example 5: The BWP 31 is an active BWP, and the BWP 32, the BWP 33, and the BWP 34 are all inactive BWPs.

Example 6: The BWP 32 is an active BWP, and the BWP 31, the BWP 33, and the BWP 34 are all inactive BWPs.

Example 7: The BWP 33 is an active BWP, and the BWP 31, the BWP 32, and the BWP 34 are all inactive BWPs.

Example 8: The BWP 34 is an active BWP, and the BWP 31, the BWP 32, and the BWP 33 are all inactive BWPs.

S1802: Determine statuses of the plurality of BWPs based on the status of the target frequency band.

Herein, there is the association relationship between the target frequency band and the plurality of BWPs. If the target frequency band is in an active state, the plurality of BWPs that have the association relationship with the target frequency band are all in an active state. Alternatively, if the target frequency band is in an inactive state, at least one of the plurality of BWPs that have an association relationship with the target frequency band is in an inactive state.

In a case of the example 5, because there is the association relationship between the BWP 31 and the two BWPs (that is, the BWP 11 and the BWP 21), and the BWP 31 is an active BWP, both the BWP 11 and the BWP 21 are active BWPs. Because there is the association relationship between the BWP 32 and the two BWPs (that is, the BWP 11 and the BWP 22), and the BWP 32 is an inactive BWP, at least one of the BWP 11 and the BWP 22 is an inactive BWP. Because there is the association relationship between the BWP 33 and the two BWPs (that is, the BWP 12 and the BWP 21), and the BWP 33 is an inactive BWP, at least one of the BWP 12 and the BWP 21 is an inactive BWP. Because there is the association relationship between the BWP 34 and the two BWPs (that is, the BWP 12 and the BWP 22), and the BWP 34 is an inactive BWP, at least one of the BWP 12 and the BWP 22 is an inactive BWP. Further, based on the statuses of the BWP 31, the BWP 32, the BWP 33, and the BWP 34, it may be determined that an active BWP on the component carrier 1 is the BWP 11, and an active BWP on the component carrier 2 is the BWP 21.

In a case of the example 6, because there is the association relationship between the BWP 31 and the two BWPs (that is, the BWP 11 and the BWP 21), and the BWP 31 is an inactive BWP, at least one of the BWP 11 and the BWP 21 is an inactive BWP. Because there is the association relationship between the BWP 32 and the two BWPs (that is, the BWP 11 and the BWP 22), and the BWP 32 is an active BWP, both the BWP 11 and the BWP 22 are active BWPs. Because there is the association relationship between the BWP 33 and the two BWPs (that is, the BWP 12 and the BWP 21), and the BWP 33 is an inactive BWP, at least one of the BWP 12 and the BWP 21 is an inactive BWP. Because there is the association relationship between the BWP 34 and the two BWPs (that is, the BWP 12 and the BWP 22), and the BWP 34 is an inactive BWP, at least one of the BWP 12 and the BWP 22 is an inactive BWP. Further, based on the statuses of the BWP 31, the BWP 32, the BWP 33, and the BWP 34, it may be determined that an active BWP on the component carrier 1 is the BWP 11, and an active BWP on the component carrier 2 is the BWP 22.

In a case of the example 7, because there is the association relationship between the BWP 31 and the two BWPs (that is, the BWP 11 and the BWP 21), and the BWP 31 is an inactive BWP, at least one of the BWP 11 and the BWP 21 is an inactive BWP. Because there is the association relationship between the BWP 32 and the two BWPs (that is, the BWP 11 and the BWP 22), and the BWP 32 is an inactive BWP, at least one of the BWP 11 and the BWP 22 is an inactive BWP. Because there is the association relationship between the BWP 33 and the two BWPs (that is, the BWP 12 and the BWP 21), and the BWP 33 is an active BWP, both the BWP 12 and the BWP 21 are active BWPs. Because there is the association relationship between the BWP 34 and the two BWPs (that is, the BWP 12 and the BWP 22), and the BWP 34 is an inactive BWP, at least one of the BWP 12 and the BWP 22 is an inactive BWP. Further, based on the statuses of the BWP 31, the BWP 32, the BWP 33, and the BWP 34, it may be determined that an active BWP on the component carrier 1 is the BWP 12, and an active BWP on the component carrier 2 is the BWP 21.

In a case of the example 8, because there is the association relationship between the BWP 31 and the two BWPs (that is, the BWP 11 and the BWP 21), and the BWP 31 is an inactive BWP, at least one of the BWP 11 and the BWP 21 is an inactive BWP. Because there is the association relationship between the BWP 32 and the two BWPs (that is, the BWP 11 and the BWP 22), and the BWP 32 is an inactive BWP, at least one of the BWP 11 and the BWP 22 is an inactive BWP. Because there is the association relationship between the BWP 33 and the two BWPs (that is, the BWP 12 and the BWP 21), and the BWP 33 is an inactive BWP, at least one of the BWP 12 and the BWP 21 is an inactive BWP. Because there is the association relationship between the BWP 34 and the two BWPs (that is, the BWP 12 and the BWP 22), and the BWP 34 is an active BWP, both the BWP 12 and the BWP 22 are active BWPs. Further, based on the statuses of the BWP 31, the BWP 32, the BWP 33, and the BWP 34, it may be determined that an active BWP on the component carrier 1 is the BWP 12, and an active BWP on the component carrier 2 is the BWP 22.

According to the communication method provided in this embodiment, when the target frequency band has the association relationship with the plurality of BWPs, the status of the target frequency band may be used to determine the statuses of the plurality of BWPs. In this way, when the status of the target frequency band is switched, the network device or the terminal device can still determine the statuses of the BWPs that have the association relationship with the target frequency band, and a corresponding switching instruction does not need to be transmitted to indicate the statuses of the BWPs that have the association relationship with the target frequency band, thereby reducing switching signaling overheads.

The foregoing mainly describes the solutions provided in embodiments of the present disclosure from a perspective of interaction between network elements. Correspondingly, embodiments of the present disclosure further provide a communication apparatus. The communication apparatus may be the network element in the foregoing method embodiments, or an apparatus including the foregoing network element, or a component that can be used in the network element. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, the present disclosure may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 19:
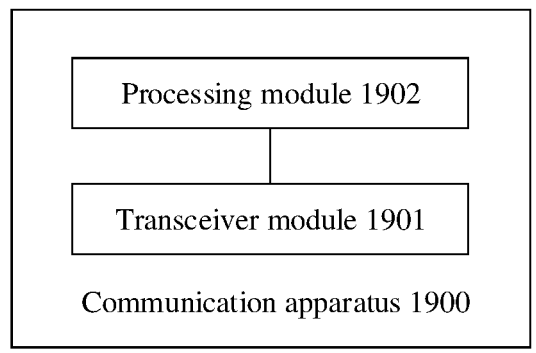
FIG. 19 is a schematic diagram of a structure of a communication apparatus according to an embodiment of the present disclosure.

FIG. 19 is a schematic diagram of a structure of a communication apparatus 1900. The communication apparatus 1900 includes a transceiver module 1901 and a processing module 1902.

For example, the communication apparatus 1900 is the terminal device in FIG. 2(*a*) in the foregoing method embodiment.

The transceiver module 1901 is configured to receive configuration information from the network device. The configuration information is used to configure at least two frequency bands for the terminal device, and the at least two frequency bands include a first frequency band and a second frequency band. The transceiver module 1901 is further configured to receive first scheduling information from the network device. The first scheduling information indicates a target resource block (RB) for data transmission. The processing module 1902 is configured to determine a first RB on the first frequency band and a second RB on the second frequency band based on the first scheduling information. There is a first common resource block (CRB) deviation between the first RB and the second RB, and the target RB includes the first RB or the second RB. The transceiver module 1901 is further configured to perform data transmission with the network device on a same symbol by using the first RB on the first frequency band and the second RB on the second frequency band.

In a possible design, the transceiver module 1901 is further configured to perform data transmission with the network device on the same symbol by using a third RB on the first frequency band and a fourth RB on the second frequency band. A CRB deviation between the third RB and the fourth RB is the first CRB deviation, and the target RB further comprises the third RB or the fourth RB.

In a possible design, the resource sequence number includes a sequence number of a first virtual resource block (VRB) on the target frequency band. The processing module 1902 is specifically configured to determine, based on the sequence number of the first VRB, a first RB that is on the first frequency band and corresponds to the first VRB and a second RB that is on the second frequency band and corresponds to the first VRB.

In a possible design, the resource sequence number includes a sequence number of a first RBG on the target frequency band. The processing module 1902 is specifically configured to determine, based on the sequence number of the first RBG, a first RB that is on the first frequency band and corresponds to a fifth RB in the first RBG and a second RB that is on the second frequency band and corresponds to the fifth RB in the first RBG.

In a possible design, the first scheduling information further includes a sequence number of a second VRB on the target frequency band. A CRB sequence number of the first RB and a CRB sequence number of the second RB each is the same as a remainder obtained after a modulo operation is performed on a nominal resource block group (RBG) size of the target frequency band. The processing module 1902 is specifically configured to determine, based on the sequence number of the second VRB, a sixth RB that is on the first frequency band and corresponds to the second VRB, and that no RB on the second frequency band corresponds to the second VRB. The transceiver module 1901 is further configured to perform data transmission with the network device on the same symbol by using the sixth RB.

In a possible design, the first scheduling information further includes a sequence number of a second VRB on the target frequency band. The CRB sequence number of the first RB and the CRB sequence number of the second RB each is the same as the remainder obtained after the modulo operation is performed on the nominal resource block group (RBG) size of the target frequency band. The processing module 1902 is configured to determine, based on the sequence number of the second VRB, that no RB on the first frequency band corresponds to the second VRB, and determines a seventh RB that is on the second frequency band and corresponds to the second VRB. The transceiver module 1901 is further configured to perform data transmission with the network device on the same symbol by using the seventh RB.

In a possible design, the first scheduling information further includes a sequence number of a second RBG on the target frequency band. The CRB sequence number of the first RB and the CRB sequence number of the second RB each is the same as the remainder obtained after the modulo operation is performed on the nominal resource block group (RBG) size of the target frequency band. The processing module 1902 is specifically configured to determine, based on the sequence number of the second RBG, a ninth RB that is on the first frequency band and corresponds to an eighth RB in the second RBG, and that no RB on the second frequency band corresponds to the eighth RB in the second RBG. The transceiver module 1901 is further configured to perform data transmission with the network device on the same symbol by using the ninth RB.

In a possible design, the first scheduling information further includes a sequence number of a second RBG on the target frequency band. The CRB sequence number of the first RB and the CRB sequence number of the second RB each is the same as the remainder obtained after the modulo operation is performed on the nominal resource block group (RBG) size of the target frequency band. The processing module 1902 is configured to determine, based on the sequence number of the second RBG, that no RB on the first frequency band corresponds to an eighth RB in the second RBG, and determine a tenth RB that is on the second frequency band and corresponds to the eighth RB in the second RBG. The transceiver module 1901 is further configured to perform data transmission with the network device on the same symbol by using the tenth RB.

For example, the communication apparatus 1900 is the terminal device in FIG. 14(*a*) in the foregoing method embodiment.

The transceiver module 1901 is configured to receive configuration information from the network device. The configuration information is used to configure at least two frequency bands for the terminal device, and the at least two frequency bands include a first frequency band and a second frequency band. The transceiver module 1901 is further configured to receive second scheduling information from the network device. The second scheduling information indicates an RBG for data transmission on a target frequency band. The target frequency band includes a first frequency band and a second frequency band. The target frequency band includes at least three RBGs, and the second RBG in the three RBGs includes a first RB and a second RB. The first RB belongs to the first frequency band, and is a contiguous PRB with an RB in the first RBG of the three RBGs. The second RB belongs to the second frequency band, and is a contiguous PRB with an RB in the last RBG of the three RBGs. The processing module 1902 is configured to determine, based on the second scheduling information, an RB in the RBG indicated by the second scheduling information. The transceiver module 1901 is further configured to perform data transmission with the network device on a same symbol by using the RB in the RBG indicated by the second scheduling information.

For example, the communication apparatus 1900 is the terminal device in FIG. 17 in the foregoing method embodiment.

The transceiver module 1901 is configured to obtain statuses of a plurality of BWPs. The plurality of BWPs are BWPs configured by a network device for the terminal device. The processing module 1902 is configured to determine a status of a target frequency band based on statuses of the plurality of BWPs. The target frequency band indicates a frequency domain resource that can be used for data transmission, and the target frequency band has an association relationship with the plurality of BWPs.

For example, the communication apparatus 1900 is the terminal device in FIG. 18 in the foregoing method embodiment.

The transceiver module 1901 is configured to obtain a status of a target frequency band. The target frequency band indicates a frequency domain resource that can be used for data transmission, and the target frequency band has an association relationship with the plurality of BWPs. The plurality of BWPs are BWPs configured by a network device for the terminal device. The processing module 1902 is configured to determine statuses of the plurality of BWPs based on the status of the target frequency band.

All related content of the steps in the foregoing method embodiments may be cited in function descriptions of the corresponding functional modules. Details are not described herein again.

It should be understood that the processing module 1902 in this embodiment may be implemented by a processor or a processor-related circuit component, and the transceiver module 1901 may be implemented by a transceiver or a transceiver-related circuit component.

Figure 2B:
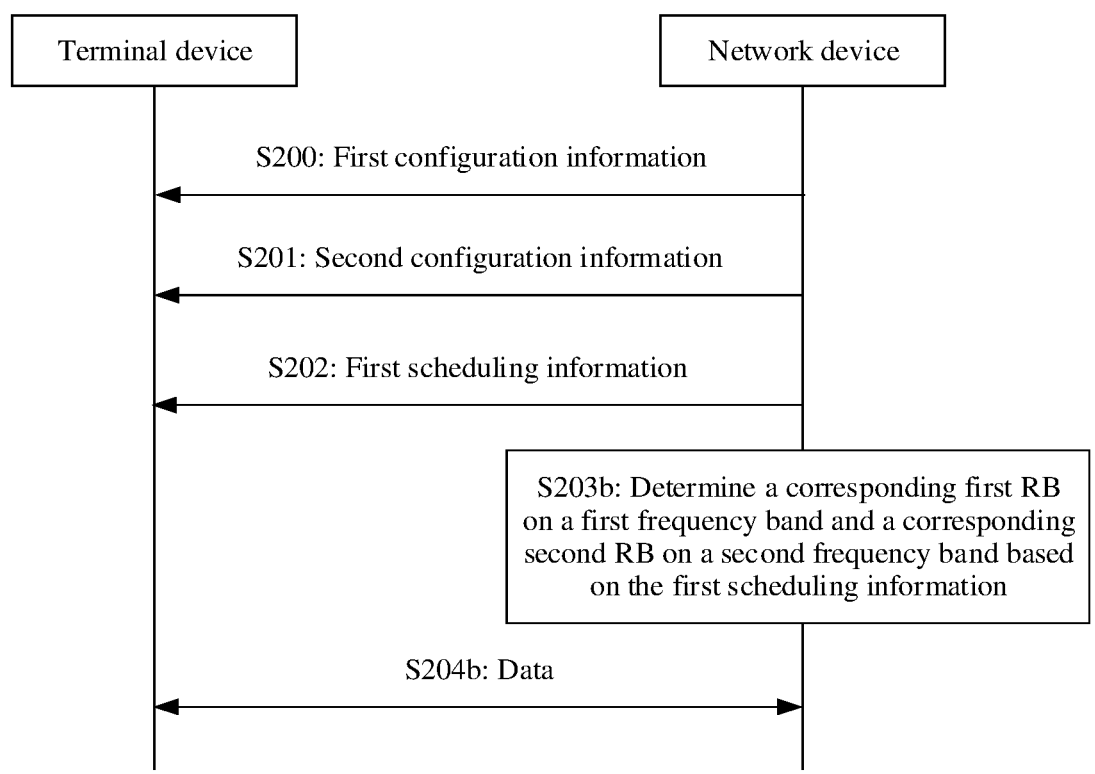
FIG. 2(b) is a schematic flowchart of another communication method according to an embodiment of the present disclosure.

For example, the communication apparatus 1900 is the network device in FIG. 2(b) in the foregoing method embodiment.

The transceiver module 1901 is configured to send configuration information to a terminal device. The configuration information is used to configure at least two frequency bands for the terminal device, and the at least two frequency bands include a first frequency band and a second frequency band. The transceiver module 1901 is further configured to send first scheduling information to the terminal device. The first scheduling information indicates a target resource block (RB) for data transmission. The processing module 1902 is configured to determine a first RB on the first frequency band and a second RB on the second frequency band based on the first scheduling information. There is a first common resource block (CRB) deviation between the first RB and the second RB, and the target RB includes the first RB or the second RB. The transceiver module 1901 is further configured to perform data transmission with the terminal device on a same symbol by using the first RB on the first frequency band and the second RB on the second frequency band.

In a possible design, the transceiver module 1901 is further configured to perform data transmission with the terminal device on the same symbol by using a third RB on the first frequency band and a fourth RB on the second frequency band. A CRB deviation between the third RB and the fourth RB is the first CRB deviation, and the target RB further comprises the third RB or the fourth RB.

In a possible design, the first scheduling information further includes a sequence number of a second VRB on the target frequency band. A CRB sequence number of the first RB and a CRB sequence number of the second RB each is the same as a remainder obtained after a modulo operation is performed on a nominal resource block group (RBG) size of the target frequency band. The second VRB has a corresponding sixth RB on the first frequency band, and the second VRB has no corresponding RB on the second frequency band. The transceiver module 1901 is further configured to perform data transmission with the terminal device on the same symbol by using the sixth RB.

In a possible design, the first scheduling information further includes a sequence number of a second VRB on the target frequency band. The CRB sequence number of the first RB and the CRB sequence number of the second RB each is the same as the remainder obtained after the modulo operation is performed on the nominal resource block group (RBG) size of the target frequency band. The second VRB has no corresponding RB on the first frequency band, and the second VRB has a corresponding seventh RB on the second frequency band. The transceiver module 1901 is further configured to perform data transmission with the terminal device on the same symbol by using the seventh RB.

In a possible design, the first scheduling information further includes a sequence number of a second RBG on the target frequency band. The CRB sequence number of the first RB and the CRB sequence number of the second RB each is the same as the remainder obtained after the modulo operation is performed on the nominal resource block group (RBG) size of the target frequency band. An eighth RB in the second RBG has a corresponding ninth RB on the first frequency band, and the eighth RB in the second RBG has no corresponding RB on the second frequency band. The transceiver module 1901 is further configured to perform data transmission with the terminal device on the same symbol by using the ninth RB.

In a possible design, the first scheduling information further includes a sequence number of a second RBG on the target frequency band. The CRB sequence number of the first RB and the CRB sequence number of the second RB each is the same as the remainder obtained after the modulo operation is performed on the nominal resource block group (RBG) size of the target frequency band. An eighth RB in the second RBG has no corresponding RB on the first frequency band, and the eighth RB in the second RBG has a corresponding tenth RB on the second frequency band. The transceiver module 1901 is further configured to perform data transmission with the terminal device on the same symbol by using the tenth RB.

Figure 14B:
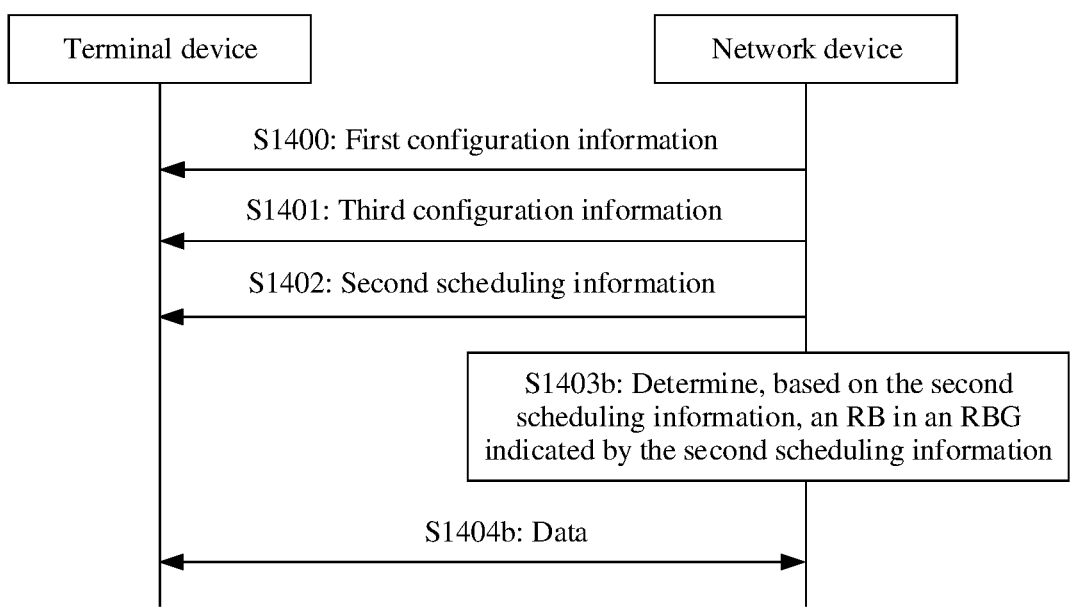
FIG. 14(b) is a schematic flowchart of still another communication method according to an embodiment of the present disclosure.

For example, the communication apparatus 1900 is the network device in FIG. 14(b) in the foregoing method embodiment.

The transceiver module 1901 is configured to send configuration information to a terminal device. The configuration information is used to configure at least two frequency bands for the terminal device, and the at least two frequency bands include a first frequency band and a second frequency band. The transceiver module 1901 is further configured to send second scheduling information to the terminal device. The second scheduling information indicates an RBG for data transmission on a target frequency band. The target frequency band includes a first frequency band and a second frequency band. The target frequency band includes at least three RBGs, and the second RBG in the three RBGs includes a first RB and a second RB. The first RB belongs to the first frequency band, and is a contiguous PRB with an RB in the first RBG of the three RBGs. The second RB belongs to the second frequency band, and is a contiguous PRB with an RB in the last RBG of the three RBGs. The processing module 1902 is configured to determine, based on the second scheduling information, an RB in the RBG indicated by the second scheduling information. The transceiver module 1901 is further configured to perform data transmission with the terminal device on a same symbol by using the RB in the RBG indicated by the second scheduling information.

For example, the communication apparatus 1900 is the network device in FIG. 17 in the foregoing method embodiment.

The transceiver module 1901 is configured to obtain statuses of a plurality of BWPs. The plurality of BWPs are BWPs configured by the network device for a terminal device. The processing module 1902 is configured to determine a status of a target frequency band based on statuses of the plurality of BWPs. The target frequency band indicates a frequency domain resource that can be used for data transmission, and the target frequency band has an association relationship with the plurality of BWPs.

For example, the communication apparatus 1900 is the network device in FIG. 18 in the foregoing method embodiment.

The transceiver module 1901 is configured to obtain a status of a target frequency band. The target frequency band indicates a frequency domain resource that can be used for data transmission, and the target frequency band has an association relationship with the plurality of BWPs. The plurality of BWPs are BWPs configured by a network device for the terminal device. The processing module 1902 is configured to determine statuses of the plurality of BWPs based on the status of the target frequency band.

All related content of the steps in the foregoing method embodiments may be cited in function descriptions of the corresponding functional modules. Details are not described herein again.

It should be understood that the processing module 1902 in this embodiment may be implemented by a processor or a processor-related circuit component, and the transceiver module 1901 may be implemented by a transceiver or a transceiver-related circuit component.

Figure 20:
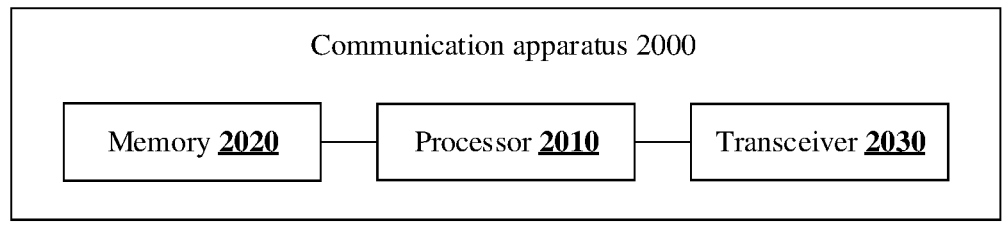
FIG. 20 is a schematic diagram of a hardware structure of a communication apparatus according to an embodiment of the present disclosure.

As shown in FIG. 20, an embodiment of the present disclosure further provides a communication apparatus 2000. When the communication apparatus is implemented as a terminal device, the communication apparatus 2000 includes a processor 2010, a memory 2020, and a transceiver 2030. The memory 2020 stores instructions or a program. The processor 2010 is configured to execute the instructions or the program stored in the memory 2020. When the instructions or the program stored in the memory 2020 is executed, the processor 2010 is configured to perform the operations performed by the processing module 1902 in the foregoing embodiment, and the transceiver 2030 is configured to perform the operations performed by the transceiver module 1901 in the foregoing embodiment.

It should be understood that the communication apparatus 1900 or the communication apparatus 2000 in embodiments of the present disclosure may correspond to the terminal device in the communication method in FIG. 2(*a*), FIG. 9(*a*) to FIG. 14(*a*), FIG. 17, or FIG. 18 in embodiments of the present disclosure, and operations and/or functions of the modules in the communication apparatus 1900 or the communication apparatus 2000 are separately used to implement corresponding procedures of the methods in the figures. For brevity, details are not described herein again.

Figure 21:
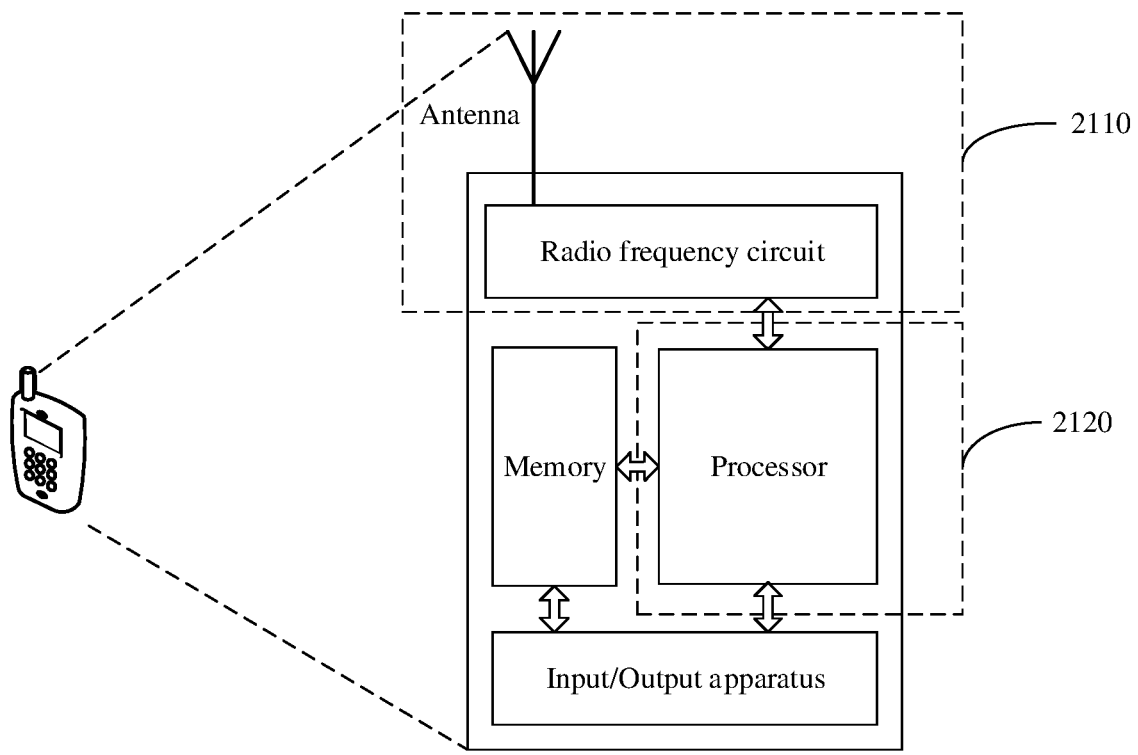
FIG. 21 is a schematic diagram of another structure of a communication apparatus according to an embodiment of the present disclosure.

When the communication apparatus is the terminal device, FIG. 21 is a simplified schematic diagram of a structure of the terminal device. For ease of understanding and illustration, an example in which the terminal device is a mobile phone is used in FIG. 21. As shown in FIG. 21, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 21 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of the present disclosure.

In this embodiment, the antenna and the radio frequency circuit that have receiving and sending functions may be considered as a transceiver unit of the terminal device, and the processor that has a processing function may be considered as a processing unit of the terminal device. As shown in FIG. 21, the terminal device includes a transceiver unit 2110 and a processing unit 2120. The transceiver unit 2110 may also be referred to as a transceiver, a transceiver machine, a transceiver apparatus, or the like. The processing unit 2120 may also be referred to as a processor, a processing board, a processing module, a processing apparatus, or the like. Optionally, a component for implementing the receiving function in the transceiver unit 2110 may be considered as a receiving unit, and a component for implementing the sending function in the transceiver unit 2110 may be considered as a sending unit. In other words, the transceiver unit 2110 includes the receiving unit and the sending unit. The transceiver unit 2110 sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 2110 is configured to perform a sending operation and a receiving operation on a side of the terminal device in the foregoing method embodiments, and the processing unit 2120 is configured to perform an operation other than the sending operation and the receiving operation of the terminal device in the foregoing method embodiments.

For example, in an implementation, the transceiver unit 2110 is configured to perform S200, S201, S202, and S204*a* in FIG. 2(a), and/or the transceiver unit 2110 is further configured to perform other receiving and sending steps on the terminal device side in embodiments of the present disclosure. The processing unit 2120 is configured to perform S203a in FIG. 2(a), and/or the processing unit 2120 is further configured to perform another processing step on the terminal device side in embodiments of the present disclosure.

For example, in another implementation, the transceiver unit 2110 is configured to perform S200, S201, S202, and S206a in FIG. 9(a), and/or the transceiver unit 2110 is further configured to perform other receiving and sending steps on the terminal device side in embodiments of the present disclosure. The processing unit 2120 is configured to perform S205a in FIG. 9(a), and/or the processing unit 2120 is further configured to perform another processing step on the terminal device side in embodiments of the present disclosure.

Figure 10A:
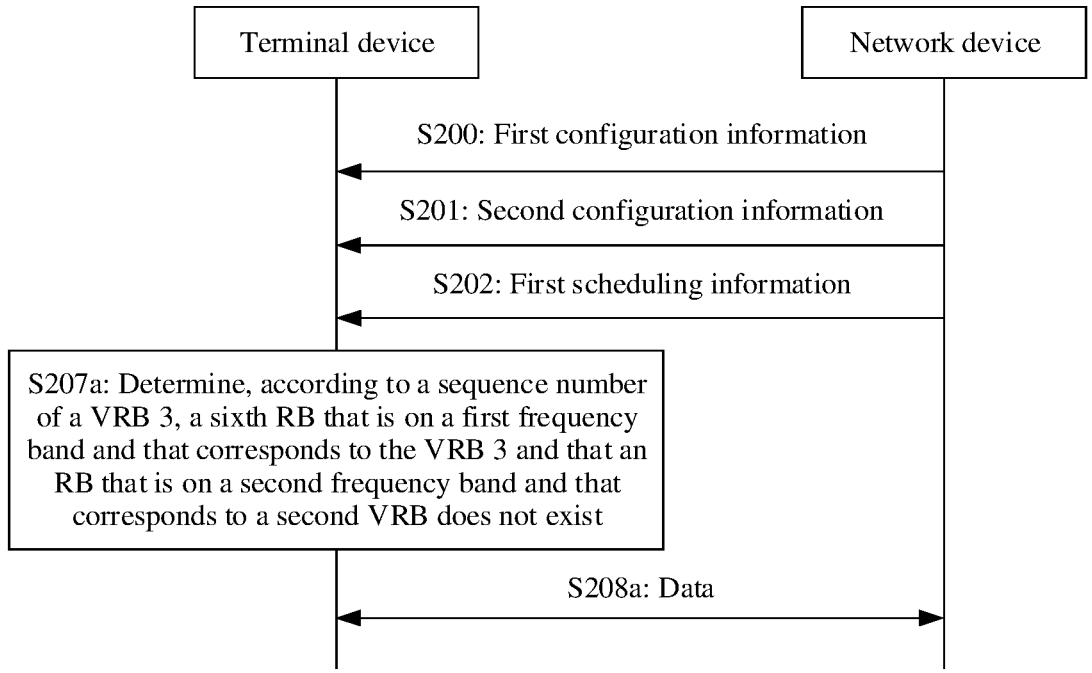
FIG. 10(a) is a schematic flowchart of still another communication method according to an embodiment of the present disclosure.
Figure 10B:
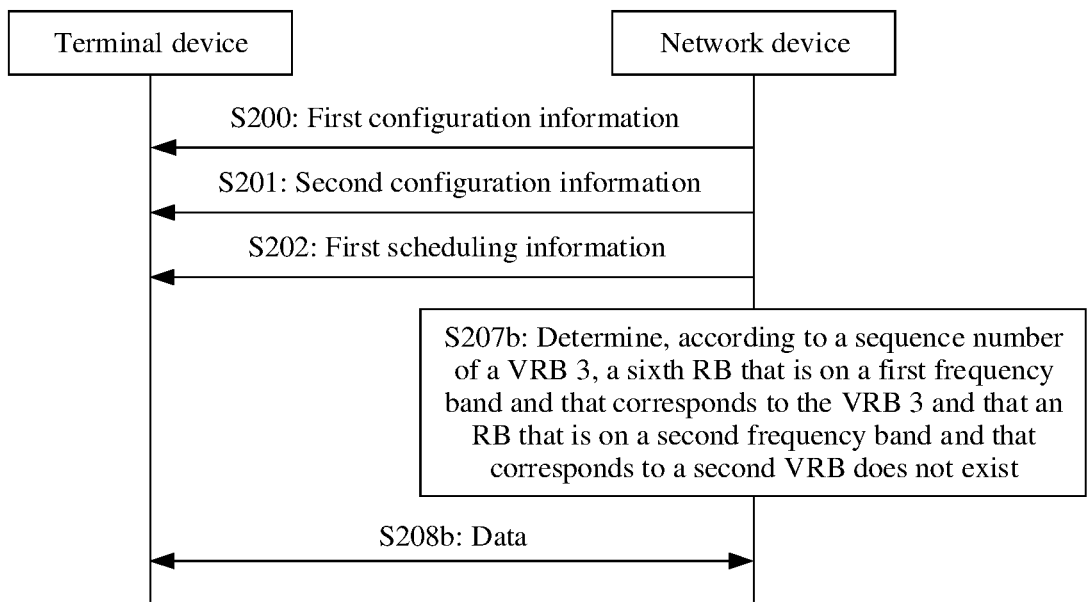
FIG. 10(b) is a schematic flowchart of still another communication method according to an embodiment of the present disclosure.

For another example, in another implementation, the transceiver unit 2110 is configured to perform S200, S201, S202, and S208a in FIG. 10(a), and/or the transceiver unit 2110 is further configured to perform other receiving and sending steps on the terminal device side in embodiments of the present disclosure. The processing unit 2120 is configured to perform S207a in FIG. 10(a), and/or the processing unit 2120 is further configured to perform another processing step on the terminal device side in embodiments of the present disclosure.

Figure 11A:
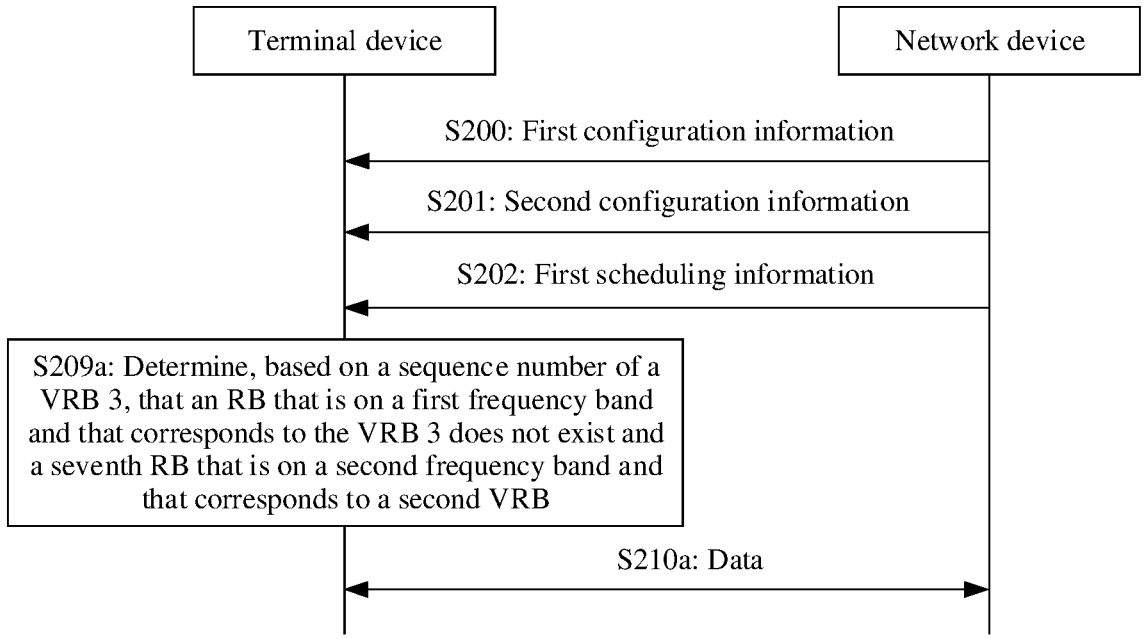
FIG. 11(a) is a schematic flowchart of still another communication method according to an embodiment of the present disclosure.
Figure 11B:
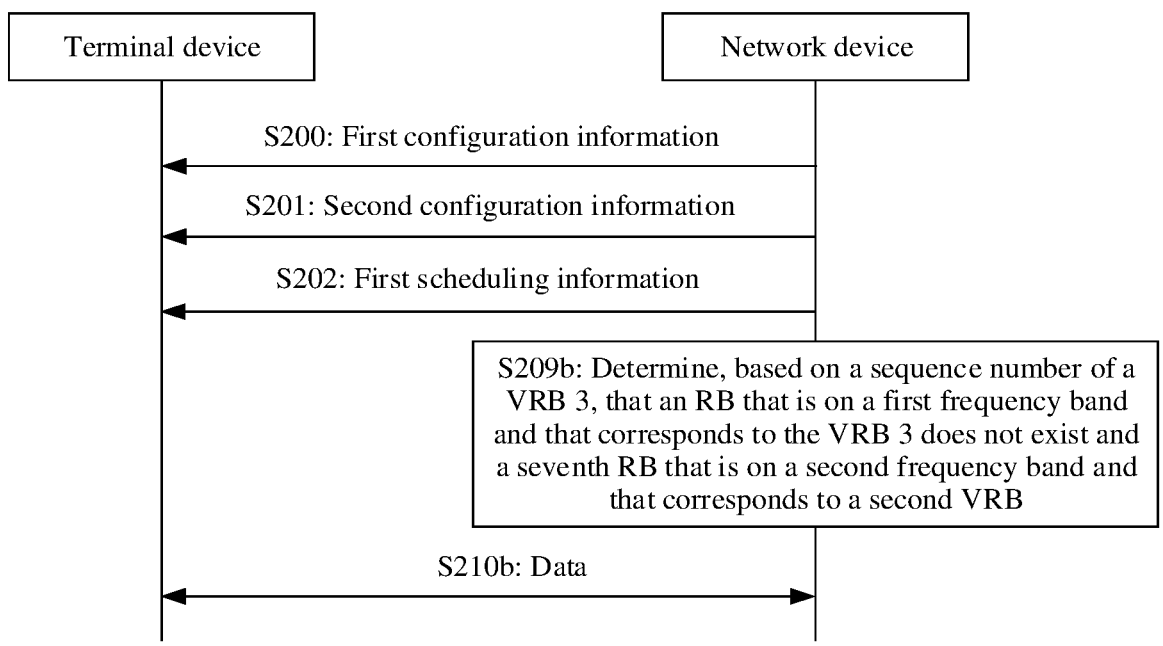
FIG. 11(b) is a schematic flowchart of still another communication method according to an embodiment of the present disclosure.

For another example, in another implementation, the transceiver unit 2110 is configured to perform S200, S201, S202, and S210a in FIG. 11(a), and/or the transceiver unit 2110 is further configured to perform other receiving and sending steps on the terminal device side in embodiments of the present disclosure. The processing unit 2120 is configured to perform S209a in FIG. 11(a), and/or the processing unit 2120 is further configured to perform another processing step on the terminal device side in embodiments of the present disclosure.

Figure 12A:
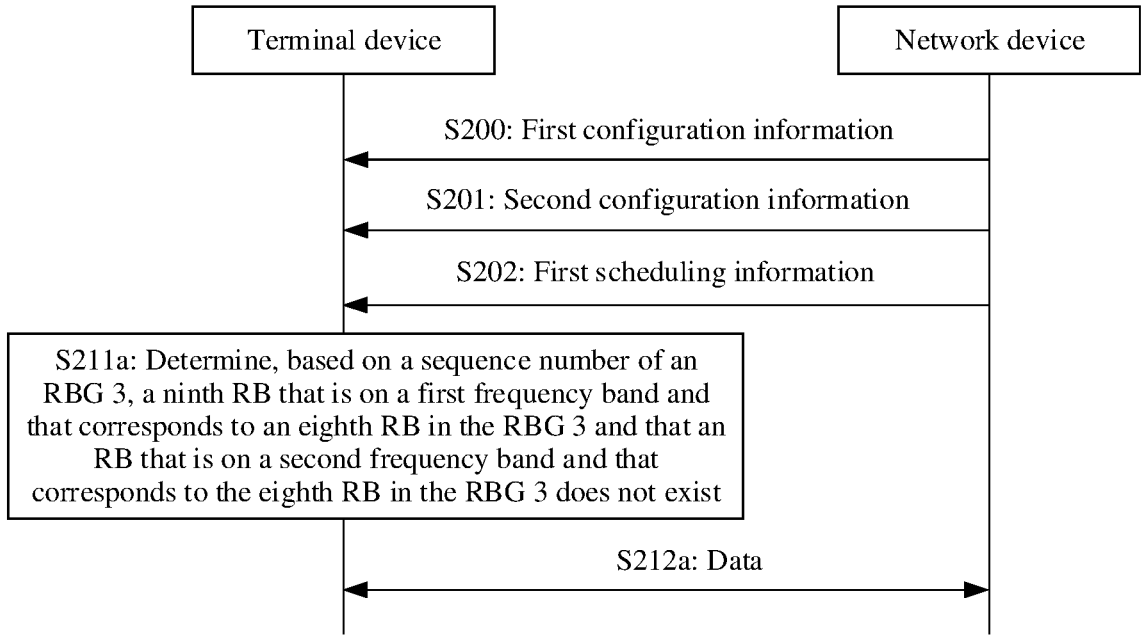
FIG. 12(a) is a schematic flowchart of still another communication method according to an embodiment of the present disclosure.
Figure 12B:
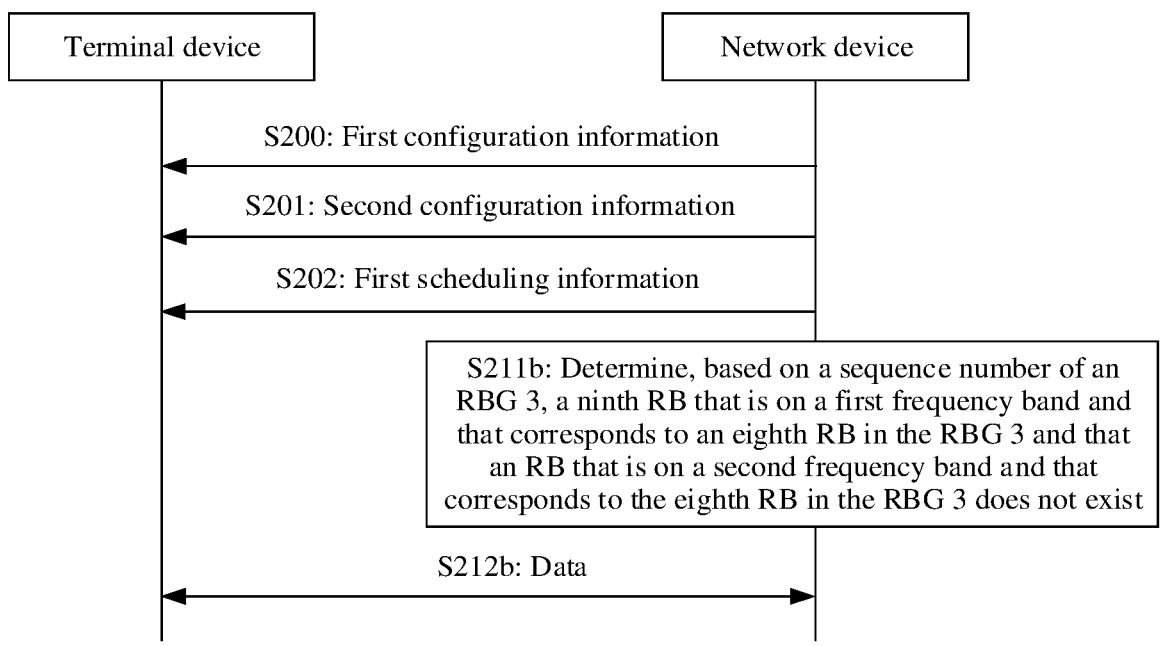
FIG. 12(b) is a schematic flowchart of still another communication method according to an embodiment of the present disclosure.

For another example, in another implementation, the transceiver unit 2110 is configured to perform S200, S201, S202, and S212a in FIG. 12(a), and/or the transceiver unit 2110 is further configured to perform other receiving and sending steps on the terminal device side in embodiments of the present disclosure. The processing unit 2120 is configured to perform S211a in FIG. 12(a), and/or the processing unit 2120 is further configured to perform another processing step on the terminal device side in embodiments of the present disclosure.

Figure 13A:
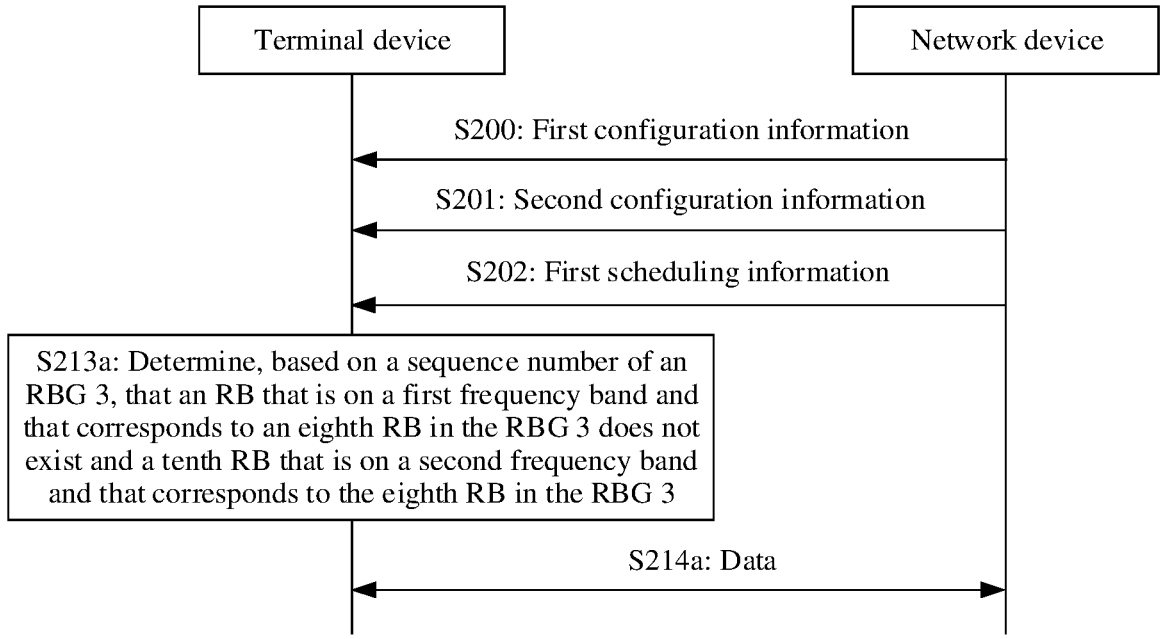
FIG. 13(a) is a schematic flowchart of still another communication method according to an embodiment of the present disclosure.
Figure 13B:
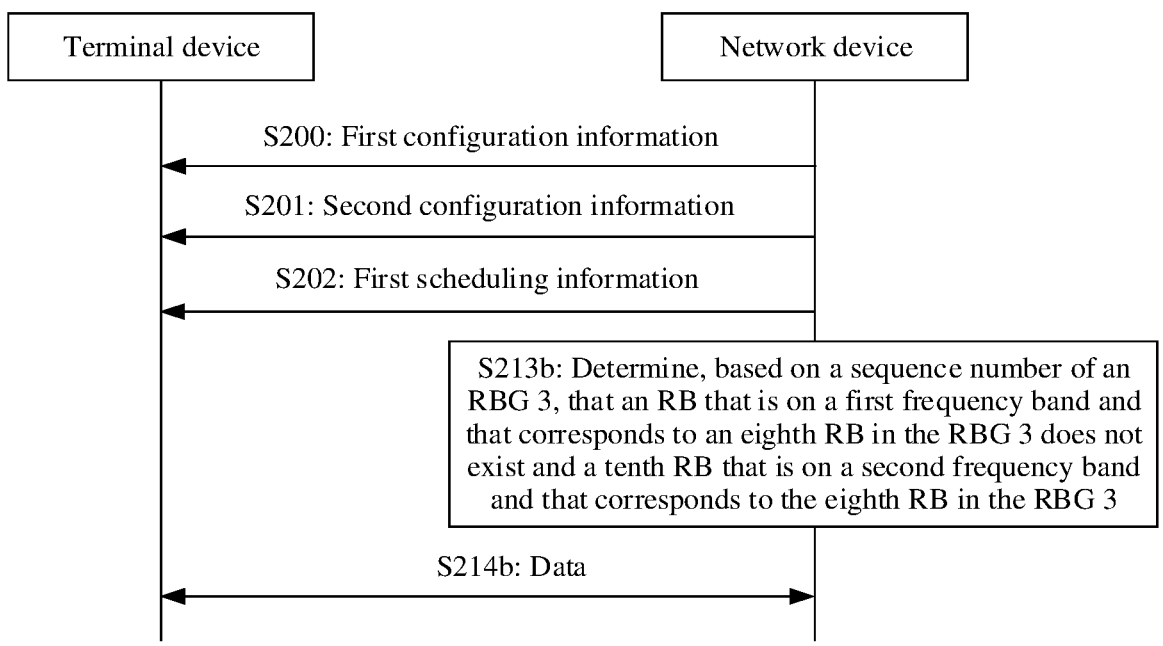
FIG. 13(b) is a schematic flowchart of still another communication method according to an embodiment of the present disclosure.

For another example, in another implementation, the transceiver unit 2110 is configured to perform S200, S201, S202, and S214a in FIG. 13(a), and/or the transceiver unit 2110 is further configured to perform other receiving and sending steps on the terminal device side in embodiments of the present disclosure. The processing unit 2120 is configured to perform S213a in FIG. 13(a), and/or the processing unit 2120 is further configured to perform another processing step on the terminal device side in embodiments of the present disclosure.

For another example, in another implementation, the transceiver unit 2110 is configured to perform S1400, S1401, S1402, and S1404a in FIG. 14(a), and/or the transceiver unit 2110 is further configured to perform other receiving and sending steps on the terminal device side in embodiments of the present disclosure. The processing unit 2120 is configured to perform S1403a in FIG. 14(a), and/or the processing unit 2120 is further configured to perform another processing step on the terminal device side in embodiments of the present disclosure.

For another example, in another implementation, the transceiver unit 2110 is configured to perform S1701 in FIG. 17, and/or the transceiver unit 2110 is further configured to perform other receiving and sending steps on the terminal device side in embodiments of the present disclosure. The processing unit 2120 is configured to perform S1702 in FIG. 17, and/or the processing unit 2120 is further configured to perform another processing step on the terminal device side in embodiments of the present disclosure.

For another example, in another implementation, the transceiver unit 2110 is configured to perform S1801 in FIG. 18, and/or the transceiver unit 2110 is further configured to perform other receiving and sending steps on the terminal device side in embodiments of the present disclosure. The processing unit 2120 is configured to perform S1802 in FIG. 18, and/or the processing unit 2120 is further configured to perform another processing step on the terminal device side in embodiments of the present disclosure.

When the communication apparatus is a chip apparatus or circuit, the communication apparatus may include a transceiver unit and a processing unit. The transceiver unit may be an input/output circuit and/or a communication interface. The processing unit is an integrated processor, a microprocessor, or an integrated circuit.

Figure 22:
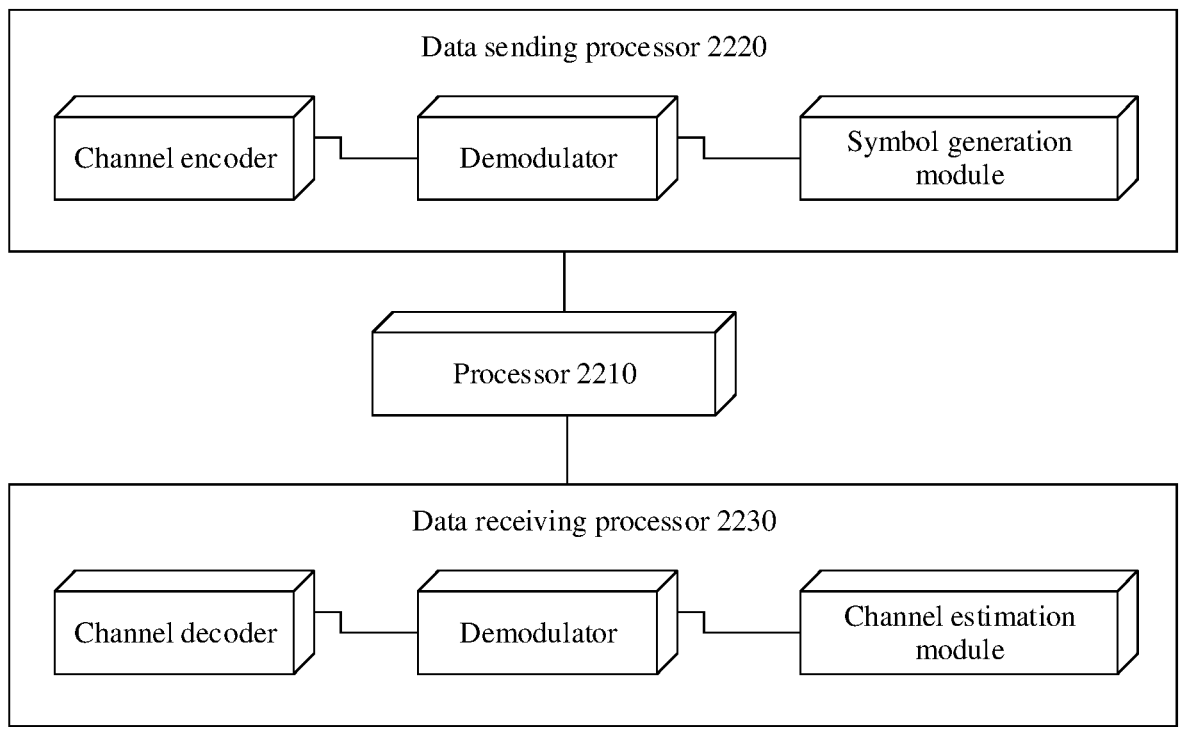
FIG. 22 is a schematic diagram of still another structure of a communication apparatus according to an embodiment of the present disclosure.

When the communication apparatus in this embodiment is a terminal device, refer to a device shown in FIG. 22. In an example, the device may implement a function similar to that of the processor 2010 in FIG. 20. In FIG. 22, the device includes a processor 2210, a data sending processor 2220, and a data receiving processor 2230. The processing module 1902 in the foregoing embodiment may be the processor 2210 in FIG. 22, and implements a corresponding function. The transceiver module 1901 in the foregoing embodiment may be the data sending processor 2220 and/or the data receiving processor 2230 in FIG. 22. Although FIG. 22 shows a channel encoder, a channel decoder, a symbol generation module, and a channel estimation module, it may be understood that these modules are merely examples, and do not constitute a limiting description of this embodiment.

Figure 23:
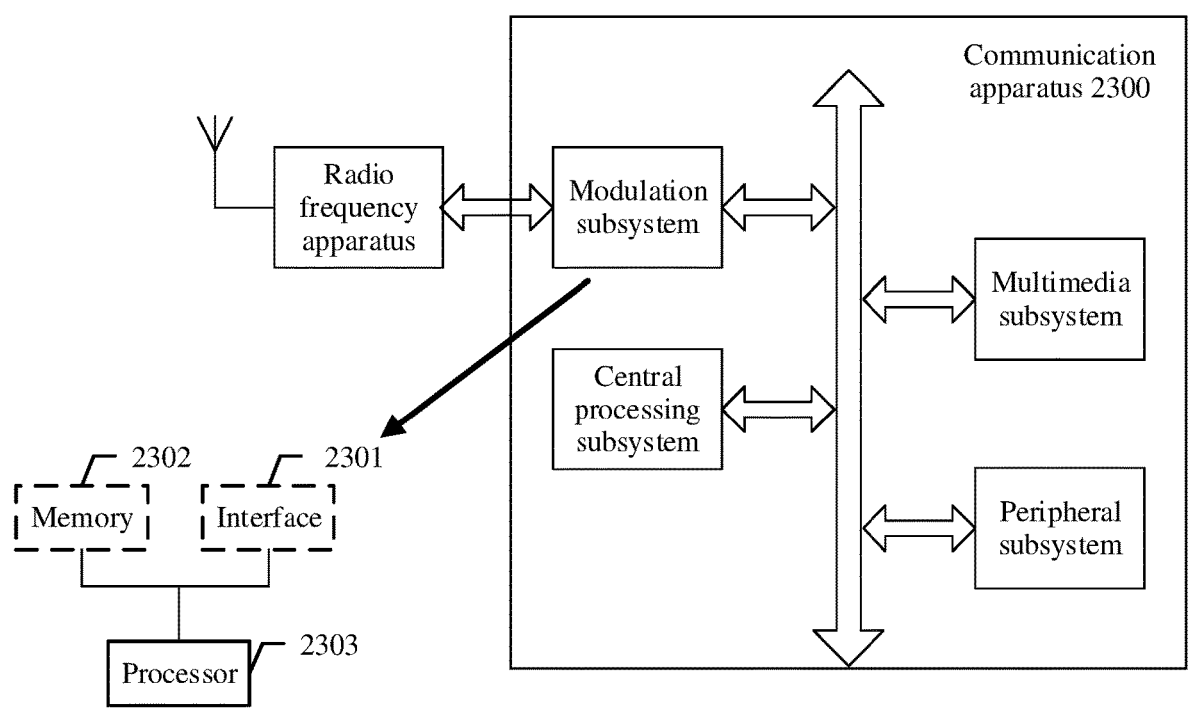
FIG. 23 is a schematic diagram of still another structure of a communication apparatus according to an embodiment of the present disclosure.

FIG. 23 shows another form of this embodiment. A communication apparatus 2300 includes modules such as a modulation subsystem, a central processing subsystem, a peripheral subsystem, and a multimedia subsystem. The communication apparatus in this embodiment may be used as the modulation subsystem in the processing apparatus. Specifically, the modulation subsystem may include a processor 2303 and an interface 2301. The processor 2303 implements a function of the processing module 1902, and the interface 2301 implements a function of the transceiver module 1901. In another variation, the modulation subsystem includes a memory 2302, a processor 2303, and a program that is stored in the memory 2302 and that can be run on the processor. When executing the program, the processor 2303 implements the method on a side of the terminal device in the foregoing method embodiment. It should be noted that the memory 2302 may be a non-volatile memory or a volatile memory. The memory 2302 may be located in the modulation subsystem, or may be located in the communication apparatus 2300, provided that the memory 2302 can be connected to the processor 2303.

In another form of this embodiment, a computer-readable storage medium is provided. The computer-readable storage medium stores instructions. When the instructions are executed, the method on the terminal device side in the foregoing method embodiments is performed.

In another form of this embodiment, a computer program product including instructions is provided. When the instructions are executed, the method on the terminal device side in the foregoing method embodiments is performed.

Figure 24:
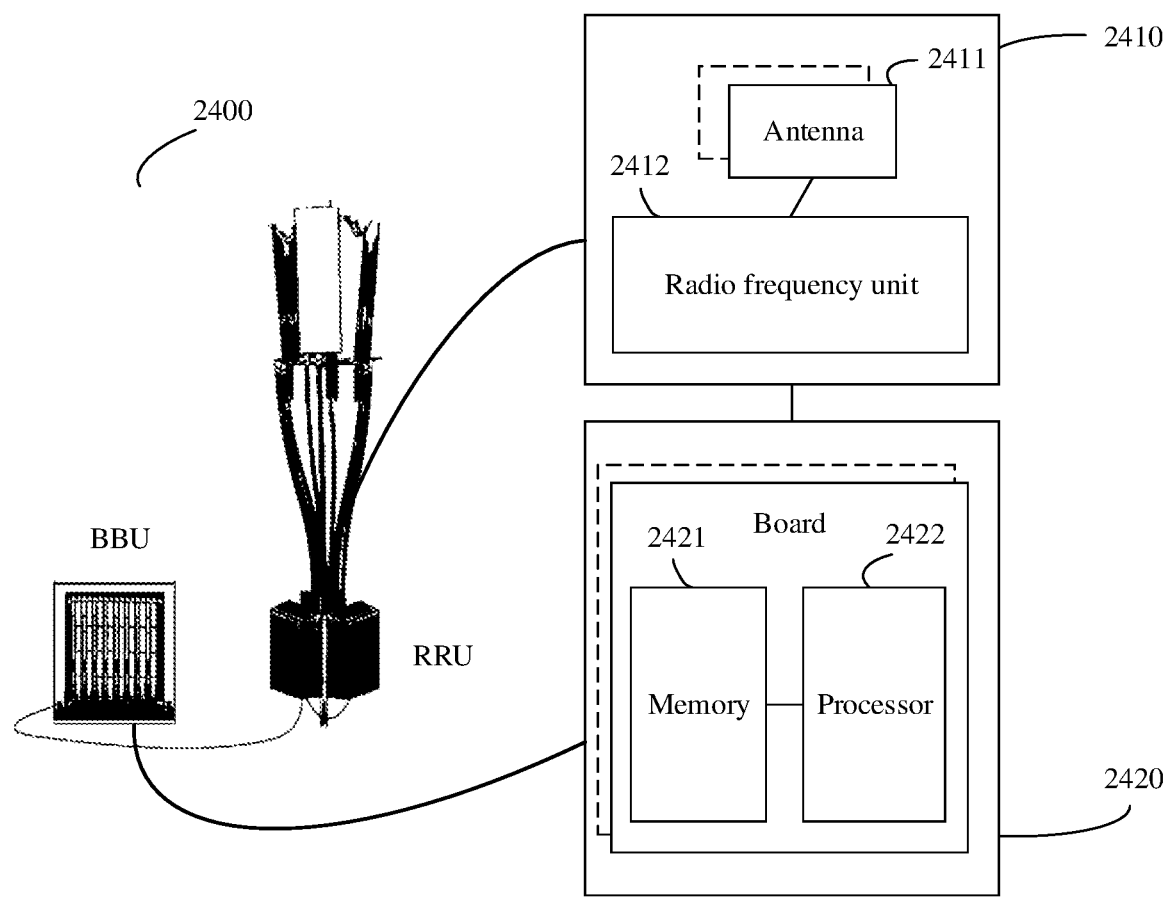
FIG. 24 is a schematic diagram of still another structure of a communication apparatus according to an embodiment of the present disclosure.

When the communication apparatus in this embodiment is a network device, the network device may be shown in FIG. 24. A communication apparatus 2400 includes one or more radio frequency units, such as a remote radio unit (RRU) 2410 and one or more baseband units (BBUs) (which may also be referred to as digital units (DUs)) 2420. The RRU 2410 may be referred to as a transceiver module, and corresponds to the transceiver module 1901 in FIG. 19. Optionally, the transceiver module may also be referred to as a transceiver machine, a transceiver circuit, a transceiver, or the like, and may include at least one antenna 2411 and a radio frequency unit 2412. The RRU 2410 part is mainly configured to receive and send a radio frequency signal and perform conversion between the radio frequency signal and a baseband signal, for example, configured to send first configuration information, second configuration information, third configuration information, first scheduling information, or second scheduling information to a terminal device. The BBU 2420 part is mainly configured to perform baseband processing, control a base station, and the like. The RRU 2410 and the BBU 2420 may be physically deployed together, or may be physically separated, that is, a distributed base station.

The BBU 2420 is a control center of the base station, and may also be referred to as a processing module. The BBU 2420 may correspond to the processing module 1902 in FIG. 19, and is mainly configured to implement a baseband processing function such as channel encoding, multiplexing, modulation, or spreading. For example, the BBU (the processing module) may be configured to control the base station to perform an operation procedure of the network device in the foregoing method embodiments, for example, generate the first configuration information, the second configuration information, the third configuration information, the first scheduling information, or the second scheduling information.

In an example, the BBU 2420 may include one or more boards. A plurality of boards may jointly support a radio access network (for example, an LTE network) of a single access standard, or may separately support radio access networks of different access standards (such as an LTE network, a 5G network, or another network). The BBU 2420 further includes a memory 2421 and a processor 2422. The memory 2421 is configured to store necessary instructions and data. The processor 2422 is configured to control the base station to perform a necessary action, for example, configured to control the base station to perform the operation procedure related to the network device in the foregoing method embodiments. The memory 2421 and the processor 2422 may serve one or more boards. In other words, a memory and a processor may be disposed on each board. Alternatively, a plurality of boards may share a same memory and a same processor. In addition, a necessary circuit may further be disposed on each board.

It should be understood that the processor mentioned in embodiments of the present disclosure may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory mentioned in embodiments of the present disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that the term "and/or" in this specification describes only an association relationship between associated objects and represents that three relationships may exist. For example, A and/or B may represent any one of the three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of embodiments of the present disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments in the present disclosure.

In addition, functional units in embodiments of the present disclosure may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of the present disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A communication method, comprising:
   receiving, by a terminal device, first configuration information from a network device, wherein at least two frequency bands for the terminal device are configured using the first configuration information, and the at least two frequency bands comprise a first frequency band and a second frequency band;
   receiving, by the terminal device, second configuration information from the network device, wherein the second configuration information configures a first association relationship between a target frequency band and the first frequency band and a second association relationship between the target frequency band and the second frequency band;
   receiving, by the terminal device, first scheduling information from the network device, wherein the first scheduling information indicates a target resource block (RB) for data transmission;
   determining, by the terminal device, based on the first scheduling information, a corresponding first RB on the first frequency band and a corresponding second RB on the second frequency band, wherein the corresponding first RB corresponds to the target RB according to the first association relationship and the corresponding second RB corresponds to the target RB according to the second association relationship; and
   performing, by the terminal device, data transmission with the network device on a same symbol by using the first RB on the first frequency band and the second RB on the second frequency band, wherein there is a common resource block (CRB) deviation between the first RB and the second RB, and the target RB comprises the first RB or the second RB.

2. The communication method according to claim 1, wherein a subcarrier spacing of the first frequency band is the same as a subcarrier spacing of the second frequency band, and a cyclic prefix (CP) type of the first frequency band is the same as a CP type of the second frequency band.

3. The communication method according to claim 1, further comprising:
   performing, by the terminal device, data transmission with the network device on the same symbol by using a third RB on the first frequency band and a fourth RB on the second frequency band, wherein a CRB deviation between the third RB and the fourth RB is equal to the CRB deviation between the first RB and the second RB, and the target RB further comprises the third RB or the fourth RB.

4. The communication method according to claim 1, wherein the first scheduling information indicates a resource sequence number on a target frequency band, and the resource sequence number indicates the first RB or the second RB; and
   a CRB sequence number of the first RB and a CRB sequence number of the second RB each is equal to a remainder obtained when a modulo operation is performed on a nominal resource block group (RBG) size of the target frequency band.

5. The communication method according to claim 4, wherein
   the nominal RBG size of the target frequency band is determined based on a bandwidth of the target frequency band; or
   the nominal RBG size of the target frequency band is a nominal RBG size of the first frequency band or a nominal RBG size of the second frequency band, wherein the nominal RBG size of the first frequency band is a whole number multiple of the nominal RBG size of the second frequency band.

6. A communication method, comprising:
   sending, by a network device, first configuration information to a terminal device, wherein at least two frequency bands are configured for the terminal device using the first configuration information, and the at least two frequency bands comprise a first frequency band and a second frequency band;
   sending, by the network device, second configuration information to the terminal device, wherein a first association relationship between a target frequency band and the first frequency band and a second association relationship between the target frequency band and the second frequency band are configured using the second configuration information;

sending, by the network device, first scheduling information to the terminal device, wherein the first scheduling information indicates a target resource block (RB) for data transmission;

determining, by the network device, based on the first scheduling information, a corresponding first RB on the first frequency band and a corresponding second RB on the second frequency band, wherein the corresponding first RB corresponds to the target RB according to the first association relationship and the corresponding second RB corresponds to the target RB according to the second association relationship; and performing, by the network device, data transmission with the terminal device on a same symbol by using the first RB on the first frequency band and the second RB on the second frequency band, wherein there is a common resource block (CRB) deviation between the first RB and the second RB, and the target RB comprises the first RB or the second RB.

7. The communication method according to claim 6, wherein a subcarrier spacing of the first frequency band is the same as a subcarrier spacing of the second frequency band, and a cyclic prefix (CP) type of the first frequency band is the same as a CP type of the second frequency band.

8. The communication method according to claim 6, further comprising:

performing, by the network device, data transmission with the terminal device on the same symbol by using a third RB on the first frequency band and a fourth RB on the second frequency band, wherein a CRB deviation between the third RB and the fourth RB is equal to the CRB deviation between the first RB and the second RB, and the target RB further comprises the third RB or the fourth RB.

9. The communication method according to claim 6, wherein the first scheduling information indicates a resource sequence number on a target frequency band, and the resource sequence number indicates the first RB or the second RB; and a CRB sequence number of the first RB and a CRB sequence number of the second RB each is equal to a remainder obtained when a modulo operation is performed on a nominal resource block group (RBG) size of the target frequency band.

10. The communication method according to claim 9, wherein the nominal RBG size of the target frequency band is determined based on a bandwidth of the target frequency band; or the nominal RBG size of the target frequency band is a nominal RBG size of the first frequency band or a nominal RBG size of the second frequency band, wherein the nominal RBG size of the first frequency band is a whole number multiple of the nominal RBG size of the second frequency band.

11. An apparatus, comprising: at least one processor and at least one memory storing instructions that, when executed by the at least one processor, cause to the apparatus to perform operations comprising:

receiving first configuration information from a network device, wherein at least two frequency bands are configured for the apparatus using the first configuration information, and the at least two frequency bands comprise a first frequency band and a second frequency band;

receiving second configuration information from the network device, wherein the second configuration information configures a first association relationship between a target frequency band and the first frequency band and a second association relationship between the target frequency band and the second frequency band;

receiving first scheduling information from the network device, wherein the first scheduling information indicates a target resource block (RB) for data transmission;

determining based on the first scheduling information, a corresponding first RB on the first frequency band and a corresponding second RB on the second frequency band, wherein the corresponding first RB corresponds to the target RB according to the first association relationship and the corresponding second RB corresponds to the target RB according to the second association relationship; and performing data transmission with the network device on a same symbol by using the first RB on the first frequency band and the second RB on the second frequency band, wherein there is a common resource block (CRB) deviation between the first RB and the second RB, and the target RB comprises the first RB or the second RB.

12. The apparatus according to claim 11, wherein a subcarrier spacing of the first frequency band is the same as a subcarrier spacing of the second frequency band, and a cyclic prefix (CP) type of the first frequency band is the same as a CP type of the second frequency band.

13. The apparatus according to claim 11, wherein the operations further comprise:

performing data transmission with the network device on the same symbol by using a third RB on the first frequency band and a fourth RB on the second frequency band, wherein a CRB deviation between the third RB and the fourth RB is equal to the CRB deviation between the first RB and the second RB, and the target RB further comprises the third RB or the fourth RB.

14. The apparatus according to claim 11, wherein the first scheduling information indicates a resource sequence number on a target frequency band, and the resource sequence number indicates the first RB or the second RB; and a CRB sequence number of the first RB and a CRB sequence number of the second RB each is equal to a remainder obtained when a modulo operation is performed on a nominal resource block group (RBG) size of the target frequency band.

15. The apparatus according to claim 14, wherein the nominal RBG size of the target frequency band is determined based on a bandwidth of the target frequency band; or the nominal RBG size of the target frequency band is a nominal RBG size of the first frequency band or a nominal RBG size of the second frequency band, wherein the nominal RBG size of the first frequency band is a whole number multiple of the nominal RBG size of the second frequency band.

16. An apparatus, comprising: at least one processor and at least one memory storing instructions that, when executed by the at least one processor, cause the apparatus to perform operations comprising:

sending first configuration information to a terminal device, wherein at least two frequency bands are configured for the terminal device using the first configuration information, and the at least two frequency bands comprise a first frequency band and a second frequency band;

sending second configurations information to the terminal device, wherein the second configuration information configures a first association relationship between a target frequency band and the first frequency band and a second association relationship between the target frequency band and the second frequency band;

sending first scheduling information to the terminal device, wherein the first scheduling information indicates a target resource block (RB) for data transmission;

determining based on the first scheduling information, a corresponding first RB on the first frequency band and a corresponding second RB on the second frequency band, wherein the corresponding first RB corresponds to the target RB according to the first association relationship and the corresponding second RB corresponds to the target RB according to the second association relationship; and performing data transmission with the terminal device on a same symbol by using the first RB on the first frequency band and the second RB on the second frequency band, wherein there is a common resource block (CRB) deviation between the first RB and the second RB, and the target RB comprises the first RB or the second RB.

17. The apparatus according to claim 16, wherein a subcarrier spacing of the first frequency band is the same as a subcarrier spacing of the second frequency band, and a cyclic prefix (CP) type of the first frequency band is the same as a CP type of the second frequency band.

18. The apparatus according to claim 16, wherein the operations further comprise:

performing data transmission with the terminal device on the same symbol by using a third RB on the first frequency band and a fourth RB on the second frequency band, wherein a CRB deviation between the third RB and the fourth RB is equal to the CRB deviation between the first RB and the second RB, and the target RB further comprises the third RB or the fourth RB.

19. The apparatus according to claim 16, wherein the first scheduling information indicates a resource sequence number on a target frequency band, and the resource sequence number indicates the first RB or the second RB; and a CRB sequence number of the first RB and a CRB sequence number of the second RB each is equal to a remainder obtained when a modulo operation is performed on a nominal resource block group (RBG) size of the target frequency band.

20. The apparatus according to claim 19, wherein the nominal RBG size of the target frequency band is determined based on a bandwidth of the target frequency band; or the nominal RBG size of the target frequency band is a nominal RBG size of the first frequency band or a nominal RBG size of the second frequency band, wherein the nominal RBG size of the first frequency band is a whole number multiple of the nominal RBG size of the second frequency band.

* * * * *

UNITED STATES PATENT AND TRADEMARK OFFICE
CERTIFICATE OF CORRECTION

PATENT NO. : 12,507,233 B2  
APPLICATION NO. : 18/147811  
DATED : December 23, 2025  
INVENTOR(S) : Meng Hua et al.

Page 1 of 1

It is certified that error appears in the above-identified patent and that said Letters Patent is hereby corrected as shown below:

In the Specification

Column 17, Line 51, change "15MHZ" to --15MHz--;

Column 17, Line 51, change "100MHZ" to --100MHz--;

Column 16, Line 15, Table 1, change "15[KHZ]" to --15[kHZ]--;

Column 39, Line 37, change "$1400" to --S1400 --; and

In the Claims

Column 61, Line 1, change "configurations" to --configuration --.

Signed and Sealed this  
Twentieth Day of January, 2026

John A. Squires  
*Director of the United States Patent and Trademark Office*